(12) United States Patent
Mori et al.

(10) Patent No.: US 7,096,233 B2
(45) Date of Patent: Aug. 22, 2006

(54) SERVER, USER TERMINAL, INFORMATION PROVIDING SERVICE SYSTEM AND INFORMATION PROVIDING SERVICE METHOD FOR PROVIDING INFORMATION IN CONJUNCTION WITH A GEOGRAPHICAL MAPPING APPLICATION

(75) Inventors: Shinichiro Mori, Kawasaki (JP); Yukio Hirokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 234 days.

(21) Appl. No.: 09/892,721

(22) Filed: Jun. 27, 2001

(65) Prior Publication Data
US 2002/0103781 A1    Aug. 1, 2002

(30) Foreign Application Priority Data
Jan. 31, 2001 (JP) ............................. 2001-024852

(51) Int. Cl.
*G06F 17/00* (2006.01)
(52) U.S. Cl. ...................................... 707/104.1; 707/10
(58) Field of Classification Search .................. 707/1, 707/3, 4, 104.1; 701/200, 201, 206, 208
See application file for complete search history.

(56) References Cited

U.S. PATENT DOCUMENTS

| | | | |
|---|---|---|---|
| 5,815,411 A | | 9/1998 | Ellenby |
| 5,839,088 A | * | 11/1998 | Hancock et al. ............ 701/213 |
| 6,012,016 A | * | 1/2000 | Bilden et al. ................ 702/12 |
| 6,023,278 A | | 2/2000 | Margolin |
| 6,148,260 A | * | 11/2000 | Musk et al. ................. 701/200 |
| 6,173,239 B1 | | 1/2001 | Ellenby |
| 6,202,023 B1 | * | 3/2001 | Hancock et al. ............ 701/201 |
| 6,243,094 B1 | * | 6/2001 | Sklar ........................... 345/853 |
| 6,263,343 B1 | * | 7/2001 | Hirono ........................ 707/104.1 |
| 6,307,573 B1 | * | 10/2001 | Barros ......................... 345/764 |
| 6,324,467 B1 | * | 11/2001 | Machii et al. ............... 701/200 |
| 6,336,073 B1 | * | 1/2002 | Ihara et al. .................. 701/202 |
| 6,381,603 B1 | * | 4/2002 | Chan et al. .................. 707/10 |
| 6,487,305 B1 | * | 11/2002 | Kambe et al. ............... 382/113 |

(Continued)

FOREIGN PATENT DOCUMENTS

WO        99/42946        8/1999

OTHER PUBLICATIONS

Imielinski et al. "GPS-Based Geographic Addressing, Routing, and Resource Discovery." Communications of the ACM. vol. 42, No. 4, pp. 86-92. Apr. 1999. ACM Press.*

(Continued)

*Primary Examiner*—Jeffrey Gaffin
*Assistant Examiner*—Brian Goddard
(74) *Attorney, Agent, or Firm*—Katten Muchin Rosenman LLP

(57) ABSTRACT

An information providing service method comprising the steps of selecting an object displayed on a map in a user terminal, transmitting coordinate information relating to an object selected in the terminal and display object attribute information representing attributes of service information to be provided by the object to a server connected to the terminal over a network, transmitting spatial range information, attribute information and a URL based on the transmitted coordinate information and display object attribute information from the server to the terminal, and displaying an information bubble along with the object at a position indicated by the transmitted spatial range information on a display unit of the terminal, whereby the service information is provided such that the service information is linked with map information of the terminal to the user, and the information bubble is displayed in an appropriate size on the map information.

46 Claims, 29 Drawing Sheets

U.S. PATENT DOCUMENTS

| | | | |
|---|---|---|---|
| 6,487,495 B1* | 11/2002 | Gale et al. | 701/209 |
| 6,532,475 B1* | 3/2003 | Nakano et al. | 707/104.1 |
| 6,577,714 B1* | 6/2003 | Darcie et al. | 379/93.17 |
| 2001/0003815 A1* | 6/2001 | Nakano | 707/1 |
| 2001/0026276 A1* | 10/2001 | Sakamoto et al. | 345/473 |
| 2001/0044802 A1* | 11/2001 | Hirono | 707/104.1 |
| 2002/0059296 A1* | 5/2002 | Hayashi et al. | 707/104.1 |
| 2002/0067353 A1* | 6/2002 | Kenyon et al. | 345/419 |

OTHER PUBLICATIONS

Leichsenring et al. "A Location-Aware Graphical BBS for Mobile Environments." Proceedings of the Eight ACM International Symposium on Advances in Geographic Information Systems. pp. 141-146. Nov. 2000. ACM Press.*

H. Tarumi, et al. "Space Tag: An Overland Virtual System and its Applications" IEEE International Conference on Multimedia Computing & Systems (ICMCS'99), vol. 1, Italy, pp. 207-212, Jun. 1999.

H. Tarumi, et al. "Communications Through Virtual Active Objects Overlaid onto the Real World" Third International Conference on Collaborative Virtual Environments (CVE 2000), ACM, USA, pp. 155-164, Sep. 2000.

* cited by examiner

FIG. 7  15(15a)

| BUBBLE NUMBER | SPATIAL OCCUPANCY INFORMATION | URL | ATTRIBUTE INFORMATION |
|---|---|---|---|
| 1 | A/X/0/3 | http://www.xxx:100 | PUB |
| 2 | A/X/3/1 | http://www.xxx:101 | HOSPITAL (SURGERY) |
| 3 | A/X/3/1 | http://www.xxx:101 | HOSPITAL (INTERNAL) |
| 4 | A/X/3/1 | http://www.xxx:101 | HOSPITAL (STOMACH AND INTESTINAL) |
| 5 | A/X/3/1 | http://www.xxx:101 | HOSPITAL (NOSE AND EAR) |
| 6 | A/X/2/1 | http://www.xxx:102 | HOTEL |
| 7 | A/X/1/1 | http://www.xxx:103 | GASOLINE STATION |
| 8 | B/X/0/2 | http://www.xxx:200 | PREPARATORY SCHOOL (TENTH-GRADE) |
| 9 | B/X/0/2 | http://www.xxx:200 | PREPARATORY SCHOOL (TWELFTH-GRADE) |
| 10 | B/X/2/1 | http://www.xxx:201 | ITALIAN RESTAURANT |
| 11 | B/X/1/1 | http://www.xxx:202 | TAX OFFICE |
| 12 | C/X/0/3 | http://www.xxx:300 | STADIUM |
| 13 | D/X/0/4 | http://www.xxx:400 | RADIO TOWER |
| 14 | A-1/X/1/0.5 | http://www.xxx:110 | RESTAURANT |
| 15 | 1/X/1/0.5 | http://www.xxx:111 | STATION |
| 16 | A+1/X/1/0.5 | http://www.xxx:112 | FIREHOUSE |
| 17 | A-1/X/2/0.5 | http://www.xxx:120 | TEMPLE |
| 18 | A/X/2/0.5 | http://www.xxx:121 | ELECTRIC APPLIANCES STORE (PERSONAL COMPUTER) |
| 19 | A/X/2/0.5 | http://www.xxx:121 | ELECTRIC APPLIANCES STORE (CELL PHONE) |
| 20 | A/X/2/0.5 | http://www.xxx:121 | ELECTRIC APPLIANCES STORE (REFRIGERATOR) |
| 21 | A/X/3/0.5 | http://www.xxx:130 | CHINESE RESTAURANT |
| 22 | D/X/4/0.5 | http://www.xxx:410 | ART MUSEUM |
| 23 | D/X/4/0.5 | http://www.xxx:411 | BOOK STORE |

FIG. 8

| BUBBLE NUMBER | SPACIAL OCCUPANCY INFORMATION (LATITUDE / LONGITUDE ALTITUDE / BUBBLE DIAMETER) | OBJECT URL | CONTENT NAME |
|---|---|---|---|
| 1 | 149° 22' 20" / 62° 11' 11" /30/5 | http://www.nifty.ne.jp/gps/user/mori/index.html | A BUILDING |
| 2 | 149° 21' 15" / 62° 09' 04" /15/20 | http://www.nifty.ne.jp/gps/user/yashi/index.html | B RESTAURANT |
| 3 | 149° 19' 12" / 62° 14' 07" /50/200 | http://www.nifty.ne.jp/gps/com/fujitsu/index.html | C STADIUM |
| 4 | | | |

FIG. 11

| BUBBLE DIAMETER | INFORMATION NOTIFICATION TIME (DAY) | CHARGE | NOTE |
|---|---|---|---|
| 5 | 1 DAY<br>2 WEEKS<br>3 MONTHS | 0 YEN<br>100 YEN<br>1000 YEN | PERSNAL USE<br>USE TO COLLECT MEMBERS OF A CIRCLE OR THE LIKE<br>MENU OF ONE-MAN SHOP |
| 20 | 1 DAY<br>2 WEEKS | 1000 YEN<br>5000 YEN | AD. OF BARGAIN SALE<br>ROAD GUIDANCE |
| 50 | 1 DAY<br>1 WEEK | 2000 YEN<br>10000 YEN | FESTIVAL GUIDANCE |
| 100 | 1 MONTH<br>6 MONTHS | 100000 YEN<br>500000 YEN | COMPANY AD.<br>(COMPANY PROFILE) |

FIG. 22

```
<bubble>
  <latitude>139, 46, 1.3</latitude>     LATITUDE 139° 46' 1.3"
  <longitude>35, 40, 45.7</longitude>   LONGITUDE 35° 40' 45.7"
  <altitude>50</altitude>               ALTITUDE 50m
  <size>dynamic50</size>                BUBBLE DIAMETER 50m
  <animation>honsya.gif</animation>     DISPLAY CHARACTER honsya.gif
  <lifedate>01/04/27</lifedate>         DISPLAYABLE DATE : UP TO 2001/04/27
</bubble>
```

CHILD ELEMENTS OF DTD INFORMATION
- LATITUDE, LONGITUDE, ALTITUDE
- BUBBLE DIAMETER
- DISPLAY ANIMATION
- ATTRIBUTE INFORMATION
- STARTUP APPLICATION
- STATE FILE NAME
- URL

FIG. 23(b)

STATE FILE
- LIFE COUNTER
- LIFE DATE
- STARTUP FILE NAME
- DYNAMIC BUBBLE DIAMETER
- ACCESS HISTORY

SERVER, USER TERMINAL, INFORMATION PROVIDING SERVICE SYSTEM AND INFORMATION PROVIDING SERVICE METHOD FOR PROVIDING INFORMATION IN CONJUNCTION WITH A GEOGRAPHICAL MAPPING APPLICATION

BACKGROUND OF THE INVENTION (1) Field of the Invention

The present invention relates to a server, a user terminal, an information providing service system and an information providing service method suitable for use in a position information service using, for example, a portable terminal.

(2) Description of Related Art

When electronic data is stored, an user (company, individual) generally uses a processing apparatus such as a keyboard, a mouse or the like. In order to express his/her intention, the user converts the data into another hardware, direct the processing apparatus to retrieve or store the data in conformity with contents to be processed.

Recent spread of portable terminals allows the mobile environment to be well prepared, small-sized GPS (Global Positioning System) modules that can measure positions of person to be widely used, and various services to be provided. A part of them is used as a guidance service to measure a position of a user and notify the user of his/her position.

However, the user needs to temporarily convert his/her intention into data in another form when retrieving or storing the data. In such method, the data needs to be digitally processed. Accordingly, the user cannot directly process the data in such a way as the user puts things that come into his/her view in a shelf. Namely, the user cannot retrieve data in so-called analog way such as "advance in the north direction", "relatively right/left", or "a little rightward/forward/backward", which does not fit to human sensation, so that the user feels difficulty in use.

For this, the user needs to digitally process data when retrieving or storing the data, although it is more convenient for the user to operate in an analog way. Additionally, the digital processing requires special knowledge and experience.

The service using the portable terminal is mainly by means of voice, which is not adapted to display a position of the user since the display of the portable terminal is of a small size.

In a guidance (navigation) service by voice, the user can grasp his/her position using a GPS module internally or externally equipped to the portable terminal. The system can guide the user in such a way as "advance in the north direction" as an absolute expression in the navigation service.

However, the system cannot grasp a direction in which the user faces, so that the system cannot guide the user in such a way as "go straight" as a relative expression in consideration of the user's position. Therefore, the service has a disadvantage that the user has a difficulty in being guided when the user does not grasp the four cardinal points.

When a moving speed is high as a vehicle, it is possible to grasp a direction in which the user moves using Doppler effect generating between the GPS satellite and the portable terminal. When a moving speed is low as when the user is walking or stopping, it is impossible to grasp a direction in which the user or vehicle moves.

It is very difficult for the system administrator to actually invest money in expensive installations in order to grasp movement of the user.

SUMMARY OF THE INVENTION

In the light of the above problems, a first object of the present invention is to provide a server, a user terminal, an information providing service system and an information providing service method, by which information on a building falling within a predetermined range from a position of a user's terminal or service information or on a shop in a specific building that comes into user's view, can be obtained, or a direction in which the user moves can be appropriately grasped, when information service is provided.

When the system administrator provides the service information, it is necessary to improve the user interface. However, it is difficult to efficiently retrieve information including service contents that the user desires among a number of pieces of service information, and transmit the information to the user.

A second object of the present invention is to provide a server, a user terminal, an information providing service system and an information providing service method, by which service information is displayed in a form that the service information is linked to map information of a user terminal to the user, and an information bubble is displayed in an optimum size on the map information on the screen, when the service information is provided to the user terminal.

A service that the user is accurately guided to the destination when the user drives a vehicle becomes popular in recent years. In order to provide this service, the service administrator needs to dispose costly vehicle detectors and the like. In order to track movement of the vehicle, it is necessary to invest a lot of money, which is practically difficult.

A third object of the present invention is to provide a server, a user terminal, an information providing service system and an information providing service method, by which movement of a vehicle can be tracked without disposing costly vehicle detectors and the like by the system administrator.

The present invention therefore provides a server in a system providing information to a user terminal being able to display a map comprising a database for holding a specific information document having index information composed of a plurality of elements out of information documents having attribute information representing attributes of service information to be provided as bubble data in which spatial range information in the three-dimensional space is associated with retrieval information for obtaining the service information, a retrieving unit for retrieving specific bubble data including coordinate information and display object attribute information in the bubble data on the basis of a mapping request, transmitted from the user terminal, having the coordinate information on an object displayed on the map and the display object attribute information representing attributes of service information to be provided by the object, and a notifying unit for notifying the user terminal of a mapping response having the spatial range information, the attribute information and the retrieval information included in the specific bubble data.

Accordingly, information on a shop or a company is registered, so that the user can obtain the latest information in an excellent visualized state.

The present invention further provides A server in a system providing information to a user terminal being able to display a map comprising a database for holding a specific information page having index information composed of a plurality of elements relating to attribute information out of information pages having attribute information representing attributes of various information relating to an object or service information relating to the various information as bubble data in which spatial range information composed of latitude, longitude, altitude and a bubble diameter of the object in the three-dimensional space is associated with address information for obtaining the service information, a retrieving unit for retrieving specific bubble data including coordinate information and display object attribute information in the bubble data on the basis of a mapping request, transmitted from the user terminal, having the coordinate information in the three-dimensional space composed of latitude, longitude and altitude of an object displayed on the map and the display object attribute information representing attributes of various information relating to the object displayed on the map or service information relating to the various information, and a notifying unit for notifying the user terminal of a mapping response having the spatial range information, the attribute information and the address information of the specific bubble data.

As above, a company, for example, can provide the latest information of its own to the users using the map application.

The present invention still further provides a server in a system providing information to a user terminal being able to display a map comprising a database for holding a specific home page having document type definition information composed of a plurality of tags relating to attribute information out of home pages having the attribute information representing attributes of facility information relating to a building or service information of the facility information as bubble data in which spatial range information composed of latitude, longitude, and altitude and a bubble diameter of the building in the three-dimensional space is associated with a uniform resource locator for obtaining the service information, a retrieving unit for retrieving specific bubble data including coordinate information and display object attribute information in the bubble data on the basis of a mapping request, transmitted from the user terminal, having the coordinate information in the three-dimensional space composed of latitude, longitude and altitude of a building displayed on the map and the display object attribute information representing attributes of facility information relating to a building displayed on the map or service information of the facility information, and a notifying unit for notifying the user terminal of a mapping response having the spatial range information, the attribute information and the uniform resource locator of the specific bubble data. Accordingly, the system administrator can provide a high-quality service to the users, and can provide a great effectiveness of advertising to a customer such as a company or the like.

The notifying unit may notify of the mapping response having spatial range information including a similar bubble diameter having a diameter according to a scale of a map displayed on the user terminal and address information.

Whereby, a position information/URL link database beforehand held is mapped on the map.

The retrieving unit may retrieve the specific bubble data in another database connected to a network on the basis of the mapping request. The user can thereby retrieve necessary information in a database created in each area or country, so that the user can receive a higher quality service.

The server may further comprise a Web information outputting unit for holding user information, and an address generating unit for generating an address at which the user information held in the Web information outputting unit is held. The service center can thereby manage a list of URLs to appropriately provide service information corresponding to an object of retrieval.

The database may hold an animation element to be displayed on the user terminal in document type definition information. The user can thereby obtain more visualized information.

The database may hold an application program element for displaying the map in document type definition information. The user can thereby obtain contents using a visualized map.

The database may hold a communication partner information element relating to a specific communication partner in document type definition information. Each user can thereby communicate with only partners whom the user desires.

The database may classify document type definition information according to a plurality of elements, and hold the document type definition information. Whereby, it becomes unnecessary to retrieve all the files in the directory in retrieval, so that desired information can be extracted efficiently and at a high speed.

The database may correlate the bubble data with a unique number by which contents of service information of the bubble data can be identified, and hold the bubble data and the unique number. It is thereby possible to specify spatial occupancy information, a URL and service information, separately and certainly.

The database may hold monitoring bubble data for detecting a moving object and a bubble diameter of the monitoring bubble data based on position information on the moving object, and record a moving object element by which the moving object can be specified in a file held in the database. The service center can thereby accurately track a vehicle, thus appropriately guide the driver.

The database may record data relating to a similar bubble diameter having a diameter according to a scale of a map displayed on the user terminal in a file. It is thereby possible to visualize information mapped on the map, so that the user can obtain an information bubble of a size according to a scale of the map displayed by him/her.

The database may hold at least either one of history information of address information caused by an access of the user terminal and identifier information by which the user terminal can be identified in a file. It is thereby possible to accurately track a moving object using a passage history, so that the user can be appropriately guided.

The database may hold data relating to a counter whose count value can be changed, or hold data relating to an accessible time in a file, thereby performing a process on the basis of data or the like transmitted from the user, and limiting an access according to a result of the process.

The database may hold data relating to an application program for displaying a map on the user terminal in a file, thereby executing the displaying process adapting to the user terminal. The user can thereby obtain visualized data.

The database may handle address information based on the spatial range information as an electronic mail address, and hold the spatial range information correspondingly to the electronic mail address. Whereby, registration becomes very simple, thus use of the service is promoted.

The present invention still further provides a user terminal in a system providing information to the user terminal being able to display a map comprising a map information outputting unit for outputting map information, a display unit for displaying an image of an object on the basis of the map information outputted from the map information outputting unit, a transmitting unit for transmitting a mapping request having coordinate information in the three-dimensional space on the object displayed on the display unit and display object attribute information representing attributes of service information to be provided by the object to a server connected to the user terminal over a network, a receiving unit for receiving a mapping response having spatial range information in the three-dimensional space corresponding to the coordinate information, attribute information representing attribute information of service information to be provided by the object, and retrieval information for obtaining the service information notified from the server in response to the mapping request, a mapping unit for displaying an image geometry along with the map at a position indicated by the spatial range information included in the mapping response on the display unit, and a mapping data holding unit for correlating the image geometry displayed by the mapping unit with the retrieval information included in the mapping response, and holding the image geometry and the retrieval information. Accordingly, the user can obtain desired service information only by clicking an information bubble displayed in an image in which a size or arrangement of a building is reproduced in order to obtain various information.

The present invention still further provides a user terminal in a system providing information to the user terminal being able to display a map comprising a map information outputting unit for outputting map information on an object in the three-dimensional space, a display unit for displaying an image of the object on a screen on the basis of the map information outputted from the map information outputting unit, a transmitting unit for transmitting a mapping request having coordinate information in the three-dimensional space composed of latitude, longitude and altitude of the object displayed on the display unit and display object attribute information representing attributes of various information relating to the object or service information relating to the various information to a server connected to the user terminal over a network, a receiving unit for receiving a mapping response having spatial range information composed of latitude, longitude, altitude and a bubble diameter of the object in the three-dimensional space corresponding to the coordinate information and address information for obtaining the service information notified from the server in response to the mapping request, a mapping unit for displaying an image geometry along with an image of the object at a position indicated by the spatial range information included in the mapping response on said display unit, and a mapping data holding unit for correlating the image geometry displayed by the mapping unit with the address information included in the mapping response, and for holding the image geometry and the address information.

Accordingly, the user can readily obtain information.

The present invention still further provides a user terminal in a system providing information to the user terminal being able to display a map comprising a map information outputting unit for outputting map information on a building in the three-dimensional space, a display unit for displaying an image of the building on a screen on the basis of the map information outputted from the map information outputting unit, a transmitting unit for transmitting a mapping request having coordinate information composed of latitude, longitude, altitude and a bubble diameter in the three-dimensional space of the building displayed on the display unit and display object attribute information representing attributes of facility information relating to the building or service information of the facility information to a server connected to the user terminal over a network, a receiving unit for receiving a mapping response having spatial range information composed of latitude, longitude, altitude and a bubble diameter of the building in the three-dimensional space corresponding to the coordinate information and a uniform resource locator for obtaining the service information notified from the server in response to the mapping request, a mapping unit for displaying an image geometry along with an image of the building at a position indicated by the spatial range information included in the mapping response on the display unit, and a mapping data holding unit for correlating the image geometry displayed by the mapping unit with the uniform resource locator included in the mapping response, and holding the image geometry and the uniform resource locator. The user can thereby appropriately display an information bubble, whereas the system administrator can prompt the user to subscribe for the communication carrier.

The receiving unit may receive the mapping response having spatial range information including a similar bubble diameter having a diameter according to a scale of the map displayed on the display unit and address information based on the coordinate information included in the mapping request. The user can thereby obtain bubble data in a visualized state.

The user terminal may further comprise a detecting unit for detecting position information having latitude, longitude, altitude, direction, and an inclination angle of an object in three dimensions. The detecting unit may comprise at least any one of a direction sensor being able to measure the direction, a satellite information receiving unit being able to receive satellite information through the use of a global positioning system, and an inclination sensor being able to measure an inclination angle of the user terminal with respect to the horizontal line. The user can thereby obtain visualized information.

The transmitting unit may transmit the mapping request using an electronic mail address generated on the basis of the coordinate information. Whereby, a quantity of transmitted/received data is decreased, which decreases the power consumption in total.

The present invention still further provides an information providing system comprising a server and a user terminal, the server including a database, a retrieving unit and a notifying unit, the user terminal including a map information outputting unit, a display unit, a transmitting unit, a receiving unit, a mapping unit and a mapping data holding unit. The user can obtain the latest information using a map application.

The present invention still further provides an information providing service system providing information to a user terminal being able to display a map comprising a database for holding a specific information page having document type definition information among information pages having attribute information representing attributes of various information relating to an object or service information relating to the various information and the document type definition information composed of a plurality of elements as bubble data in which spatial range information composed of latitude, longitude, altitude and a bubble diameter of the object in the three-dimensional space is associated with address information for obtaining the service information, a user terminal connected to the database over a network to display the various information retrieved using the bubble data, a retrieving unit for retrieving specific bubble data including coordinate information and display object attribute information in the bubble data on the basis of a mapping request having the coordinate information in the three-dimensional space composed of latitude, longitude and altitude of the object displayed on the map and the display object attribute information representing attributes of various information relating to the object or service information relating to the various information, a notifying unit for notifying the user terminal of a mapping response having the spatial range information, the attribute information and the address information of the specific bubble data, the user terminal comprising a map information outputting unit for outputting map information on an object in the three-dimensional space, a display unit for displaying an image of the object on a screen on the basis of the map information outputted from the map information outputting unit, a transmitting unit for transmitting a mapping request having coordinate information composed of latitude, longitude, altitude and a bubble diameter in the three-dimensional space of the object displayed on the display unit and attribute information representing attributes of various information relating to the object or service information relating to the various information to the server connected to the user terminal over a network, a receiving unit for receiving a mapping response having spatial range information composed of latitude, longitude, altitude and a bubble diameter of the object in the three-dimensional space corresponding to the spatial range information and address information for obtaining the service information notified from the server in response to said mapping request, a mapping unit for displaying an image geometry along with an image of the object at a position indicated by the spatial range information included in the mapping response on the display unit, and a mapping data holding unit for correlating the image geometry displayed by the mapping unit with the address information included in the mapping response, and holding the image geometry and the address information.

The user can thereby obtain information in an excellently visualized state.

The present invention still further provides an information providing service method in a system providing information to a user terminal being able to display a map comprising the steps of a selecting step of selecting an object displayed on a map by the user terminal, a user terminal transmitting step of transmitting coordinate information relating to the object selected at the selecting step and display object attribute information representing attributes of service information to be provided by the object from the user terminal to a server connected to the user terminal over a network, a server transmitting step of transmitting space range information, attribute information and address information to the user terminal from the server on the basis of the coordinate information and the display object attribute information transmitted at the user terminal transmitting step, and a mapping step of displaying an image geometry along with the object at a position indicated by the spatial range information transmitted at the server transmitting step on a display unit of the user terminal. A company, for example, can provide the latest information on itself to the users using the map application.

The present invention still further provides an information providing service method in a system providing information to a user terminal being able to display a map comprising the steps of a map displaying step of displaying a map on a display unit displaying an image in the user terminal, a selecting step of selecting an object from map information displayed at the map displaying step in the user terminal, a transmitting step of transmitting a mapping request having coordinate information in the three-dimensional space relating to the object selected at the selecting step and display object attribute information representing attributes of service information to be provided from the user terminal to a server connected to the user terminal over a network, a retrieving step of retrieving by the server specific bubble data including coordinate information and display object attribute information in bubble data in which spatial range information composed of latitude, longitude, altitude and a bubble diameter of the object in the three-dimensional space is associated with address information for obtaining service information provided by the object on the basis of the mapping request at the transmitting step, a notifying step of notifying the user terminal from the server of a mapping response having the spatial range information and the address information of the specific bubble data retrieved at the retrieving step, a mapping step of displaying an image geometry along with the object at a position indicated by the spatial range information included in the mapping response notified at the notifying step on the display unit in the user terminal, and a providing step of providing the image geometry displayed at the mapping step to the user terminal.

The administrator can provide a high-quality service to the users, besides providing a great effectiveness of advertising to a customer such as a company or the like.

The present invention still further provides an information service providing method in a system providing information to a user terminal being able to display a map comprising the steps of a map displaying step of displaying a map on a display unit displaying an image in the user terminal, a selecting step of selecting an object from map information displayed at the map displaying step in the user terminal, a transmitting step of transmitting a mapping request having coordinate information composed of latitude, longitude, altitude and a bubble diameter in the three-dimensional space relating to the object selected at the selecting step and display object attribute information representing attributes of various information relating to the object or service information relating to the various information from the user terminal to a server connected to the user terminal over a network, a retrieving step of retrieving by the server specific bubble data including the coordinate information and the display object attribute information in bubble data in which spatial range information composed of latitude, longitude, altitude and a bubble diameter of an object in the three-dimensional space is associated with address information for obtaining various information relating to the object or service information relating to the various information on the basis of the mapping request at the transmitting step, a notifying step of notifying the user terminal from the server of a mapping response having the spatial range information and the address information of the specific bubble data retrieved at the retrieving step, and a mapping step of displaying an image geometry along with the object at a position indicated by the spatial range information included in the mapping response on the display unit of the user terminal on the basis of the specific bubble data notified at the notifying step.

The service center can provide service information on an advertiser registered in a range that the user desires, so that the use of the service of the advertiser is promoted.

At the map displaying step, the user terminal may display the map on the screen on the basis of at least either one of the latitude or the longitude obtained. In any place, the user can obtain an information bubble.

The notifying step may comprise the steps of a changing step of outputting a similar bubble diameter having a diameter according to a scale of the map displayed on the display unit of the user terminal from the server on the basis of the coordinate information included in the mapping request transmitted at the transmitting step, and an inserting step of inserting the similar bubble diameter outputted at the changing step into the mapping response in the user terminal. The user can thereby obtain an information bubble of an accurate size.

At the changing step, the server may change the similar bubble diameter on the basis of at least any one of the number of accesses, an accessible time and an accessible season. The service center can thereby limit an access, thus provide various services.

At the notifying step, the server may notify of information relating to an application program for displaying a map on the user terminal. The service center can thereby limit an access, thus provide various services.

At the retrieving step, the server may retrieve using a counter whose count value can be changed by an access, or the server may nullify a predetermined file when the count is stopped, or retrieval may be performed on the basis of the number of accesses that the server can receive concurrently, or retrieval may be performed on the basis of communication partner information relating to a specific communication partner. The retrieving step may comprise the steps of a reading step of reading communication partner bubble data agreeing with information set beforehand relating to the communication partner in the server, a present position information receiving step of receiving present position information on the user terminal by the server, and an approach detecting step of detecting approach of the user terminal and the communication partner to each other by the server on the basis of the communication partner bubble data and the present position information. The service center can thereby readily provide various visualized services.

The present invention still further provides an information providing service method in a system providing information to a user terminal being able to display a map comprising the steps of an information page recording step of recording a specific information page composed of a plurality of elements relating to attribute information out of information pages having the attribute information representing attributes of various information relating to an object or service information relating to the various information in a database by the user terminal, a bubble data registering step of registering by the server bubble data in which spatial range information composed of latitude, longitude, altitude and a bubble diameter of the object in the three-dimensional space is associated with address information for obtaining the service information on the basis of the information page recorded at the information page recording step, and a providing step of providing information generated from the bubble data registered at the bubble data registering step from the server to the user terminal.

The user can thereby obtain the latest information using the map application.

The bubble data registering step may comprise the steps of a specific document type definition information extracting step of extracting by the server plural pieces of specific document type definition information having a predetermined element out of the document type definition information of the information pages recorded at the information page recording step, and a first registering step of registering by the server the plural pieces of specific document type definition information as the bubble data. Whereby, a user interface by which the user obtains service information can be improved.

The bubble data registering step may comprise the steps of a recording step of recording by the server the information page recorded at the information page recording step in another database, and a second registering step of registering by the server the information page recorded at the recording step as bubble data in which spatial range information composed of latitude, longitude, altitude and a bubble diameter of the object in the three-dimensional space is associated with address information for obtaining the service information on the database. It is thereby possible to visualize data defined by the system, and filter the data using the attribute information. Thus necessary information can be readily retrieved.

BRIEF DESCRIPTION OF THE DRAWINGS

FIG. 7 is a diagram for illustrating the bubble data according to the first embodiment;

FIG. 8 is a diagram for illustrating another bubble data according to the first embodiment of this invention;

FIG. 11 is a diagram for illustrating a charge system for bubble data according to the first embodiment of this invention;

FIG. 22 is a diagram for illustrating DTD information according to the second embodiment of this invention;

FIG. 23(a) is a diagram for illustrating the DTD information according to the second embodiment;

FIG. 23(b) is a diagram for illustrating a state file according to the second embodiment of this invention;

DESCRIPTION OF THE PREFERRED EMBODIMENTS

Hereinafter, description will be made of embodiments of this invention with reference to the accompanying drawings.

(A) Description of First Embodiment

Figure 1:
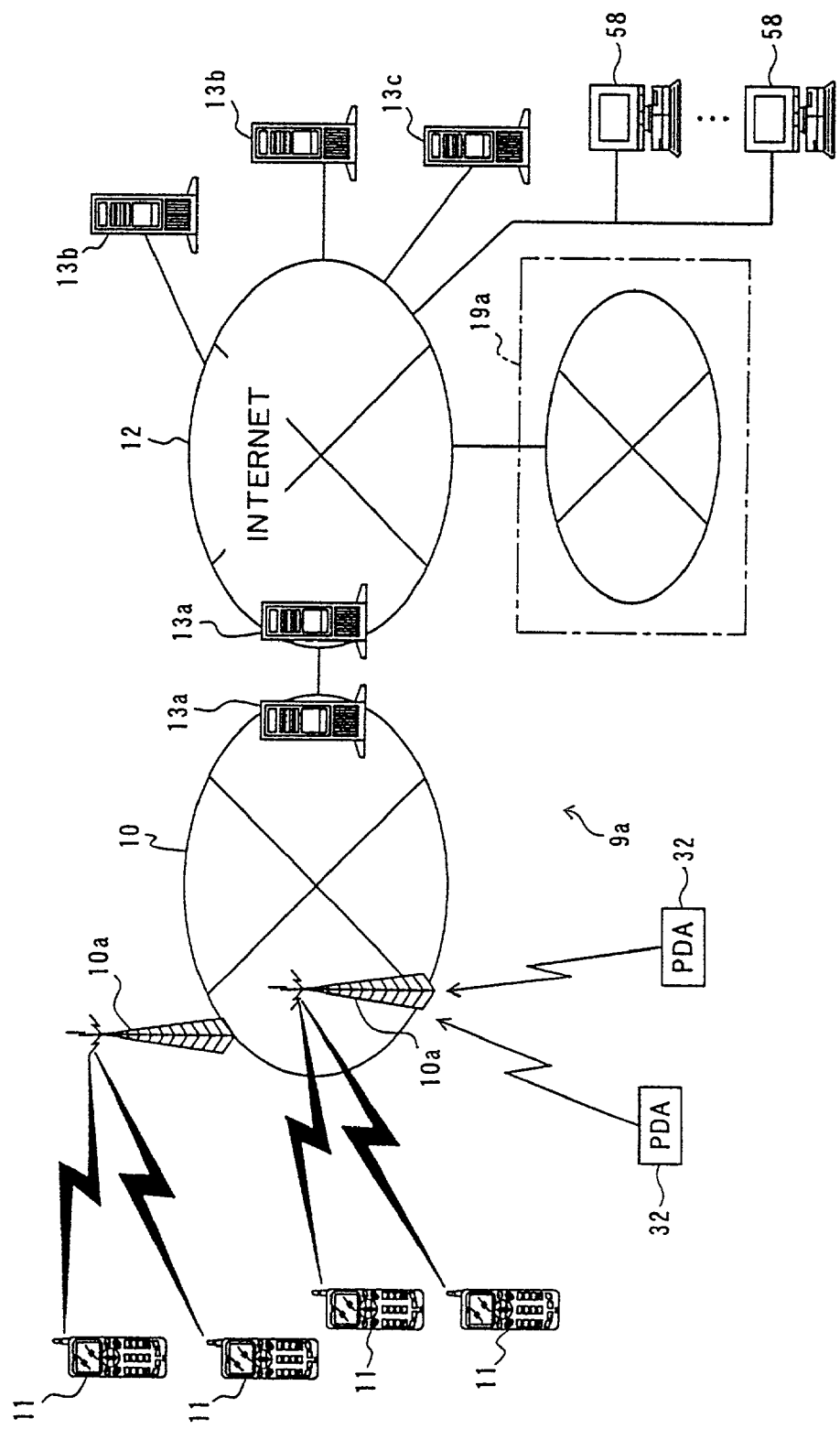
FIG. 1 is a diagram showing a structure of an information providing service system according to a first embodiment of this invention.

FIG. 1 is a diagram showing a structure of an information providing service system according to a first embodiment of this invention. The information providing service system (hereinafter, simply referred to as a system occasionally) 9 shown in FIG. 9 is a system providing information to a user terminal. The information providing service system 9 comprises a service center 19, a plurality of portable terminals 11, a plurality of personal digital assistants (PDA; hereinafter, referred to as PDAs occasionally) 32, to which a radio base station (radio tower) 10a, a radio network 10, a gateway server 13a, the Internet 12, a Web server 13a, a DNS (Domain Name System) server 13c and the like are connected.

The system 9 provides two kinds of services (1) and (2) below along with a telephone service and the like.

(1) Service that displays, on the portable terminal 11 or the PDA 32, information about a plurality of buildings falling within a predetermined distance range in a direction to which the portable telephone 11 or the PDA 32 is aimed (hereinafter, referred to as service 1 occasionally). For instance, the user can use this service by aiming the portable device 11 or the PDA 32 in a desired direction to obtain information about buildings within a 100-meter range from a position of the portable device 11 or the PDA 32.

(2) Service that displays, on the portable device 11 or the PDA 32, information about a specific building designated by the portable device 11 or the PDA 32 (hereinafter, referred to as service 2, occasionally). For instance, the user can use this service by aiming the portable device 11 or the PDA 32 toward a building in front to obtain information about, for example, goods sold in a shop in the building.

By the service 1, the user can obtain information on buildings within a 100 m range from a position of the user. By the service 2, the user can obtain information on a building that first comes into user's view.

In FIG. 1, the radio network 10 is of a mobile communication system operated by a communication carrier (hereinafter, abbreviated as a carrier occasionally). Incidentally, the administrator of this system 9 (hereinafter referred to as a system administrator) is that carrier, or an independent enterprise, for example.

The service center 19 includes a server that holds bubble data in which spatial occupancy information (spatial range information or spatial area information) composed of latitude, longitude, altitude and a bubble diameter of an object (for example, a building, each floor of the building, a signboard or the like actually existing, or an object moving in a space) in the three-dimensional space, or a desired space is associated with various information relating to the object or a URL (Uniform Resource Locator) relating to the various information. Further, this server can include bubble data in which spatial occupancy information on a desired space is associated with various information desired to be correlated with the desired space or a URL relating to the various information. The aforesaid spatial occupancy information signifies a specified space in a three-dimensional space. Bubble signifies the specified space in a three dimensional space, which is like a bubble floating in the three-dimensional space. With this, a real building is reproduced. Generally, a bubble reminds of a spherical shape, but is not limited specifically to a spherical shape, here.

The server can control a method of linking spatial occupancy information to a URL, and readiness of retrieval with a bubble diameter. This bubble diameter represents a radius when an information bubble is spherical, it represents a major axis and a minor axis when the information bubble is an ellipse, where values corresponding to the respective axes are required to be set, or representing a width or the like of a quadrangular prism when the information bubble is of a geometry of quadrangular prism in conformity with a volume of a building. The user can express spatial occupancy information configured on a server with not only a mobile terminal such as the portable terminal 11 but also a personal computer.

Meanwhile, the first embodiment is mainly in a mode where the portable terminal 11 obtains a position of itself using the portable terminal 11, and transmits data relating to the position to the service center 19. A second embodiment (described later) relates to a method of generating an image (information bubble) of spatial occupancy information of bubble data on a personal computer of the user. The second embodiment is in a mode where the user overlaps bubble data from the service center 19 on a map beforehand installed in the computer, and displays it using the personal computer.

The portable terminal 11 has a telephone and communication function. Additionally, the portable terminal 11 is connected to the service center 19 over the Internet 12 to be able to display various information retrieved using the bubble data. The portable terminal 11 is, for example, a portable telephone. As will be described later with reference to FIG. 4, the portable terminal 11 comprises a radio transmitting/receiving circuit, a modulating/demodulating circuit, a voice processing circuit, a display for display (window), etc.

The PDA 32 has a communication function. The PDA 32 is connected to the service center 19 over the Internet 12 to display various information retrieved using the bubble data. The PDA 32 is, for example, a portable information display equipment, which comprises a radio transmitting/receiving circuit, a modulating/demodulating circuit, and a display for display (referring to FIG. 17 to be described later).

The displays of the portable terminal 11 and the PDA 32 can display a map.

Both the portable terminal 11 and the PDA 32 function as user terminals, which are subscriber terminals of the radio network 10. The portable terminal 11 and the PDA 32 can freely access to the service center 19 via the radio base station 10a. The user operates a ten-key pad of the portable terminal 11 or a touch panel of the PDA 32 to access to the service center 19. Therefore, the PDA 32 can access to the service center 19, just as the portable terminal 11 accesses to the service center 19. Hereinafter, description will be made by way of the portable terminal 11. The PDA 32 is almost similar to the portable terminal 11, description of which is thus omitted.

The ratio base station 10a is connected to the portable terminal 11 and the radio network 10 to transmit/receive a radio signal. The gateway server 13a allows only a signal outputted from a server having a desired URL to pass therethrough.

The Internet 12 is a network that can use WWW (World Wide Web) protocol, to which a number of servers using Hyper Text Transfer Protocol (http) are connected. The Web server 13b holds a home page file in which contents of an individual, a company or the like are described. The DNS server 13c outputs an IP (Internet protocol) address corresponding to a host name.

Other than the Web server 13b, a number of Web servers (Web sites, not shown) are connected to the Internet 12. These Web servers holds source files (hereinafter referred to as home page files) of a number of home pages, which are accessed from all over the world. Namely, the user transfers a home page file created by himself/herself to the Web server 13b in order to hold (register) the home page file therein, whereas the user himself/herself, or the other designates a URL of the Web server 13b to see the created home page.

Instead of URL, URI (Uniform Resource identifier) or URN (Uniform Resource Name) may be used as address information. In URL, a protocol applied to a resource is described before URI representing the resource of the Internet 12. Its format is represented by "protocol: URI", which is, for example, "http://130.*", "ftp://130.*", "gopher//130.***", or the like. URI is a name uniformly given to a resource of the Internet 12 using http, which is an IP address representing a computer name that is a resource of the Internet 12. URN represents a sole address.

In many cases, the user uses a personal computer to connect it to the Internet 12. The user can also use the portable terminal 11 to connect it to the Internet 12. In the case of a personal computer, the user directly connects the personal computer to the Internet 12 over LAN (Local Area Network) from a company or the like using a communication function of the personal computer, or connects it to the Internet 12 through an Internet provider using a modem or a DSU (Digital Service Unit). In the case of the portable terminal 11, the user accesses to a carrier for which the user subscribes, and connects the portable terminal 11 to the Internet 12 through a server (not shown) for protocol conversion disposed in the carrier.

A data transmission rate of the portable terminal 11 is limited since the data is transmitted via the radio network 10. For this, contents of a home page file held in the Web server 13b is of two kinds in many cases; one for a case where the user has an access using a personal computer, and the other for a case where the user has an access using the portable terminal 11.

Meanwhile, the structure of the system 9 shown in FIG. 1 is similar in a second embodiment and a third embodiment to be described later.

Figure 2:
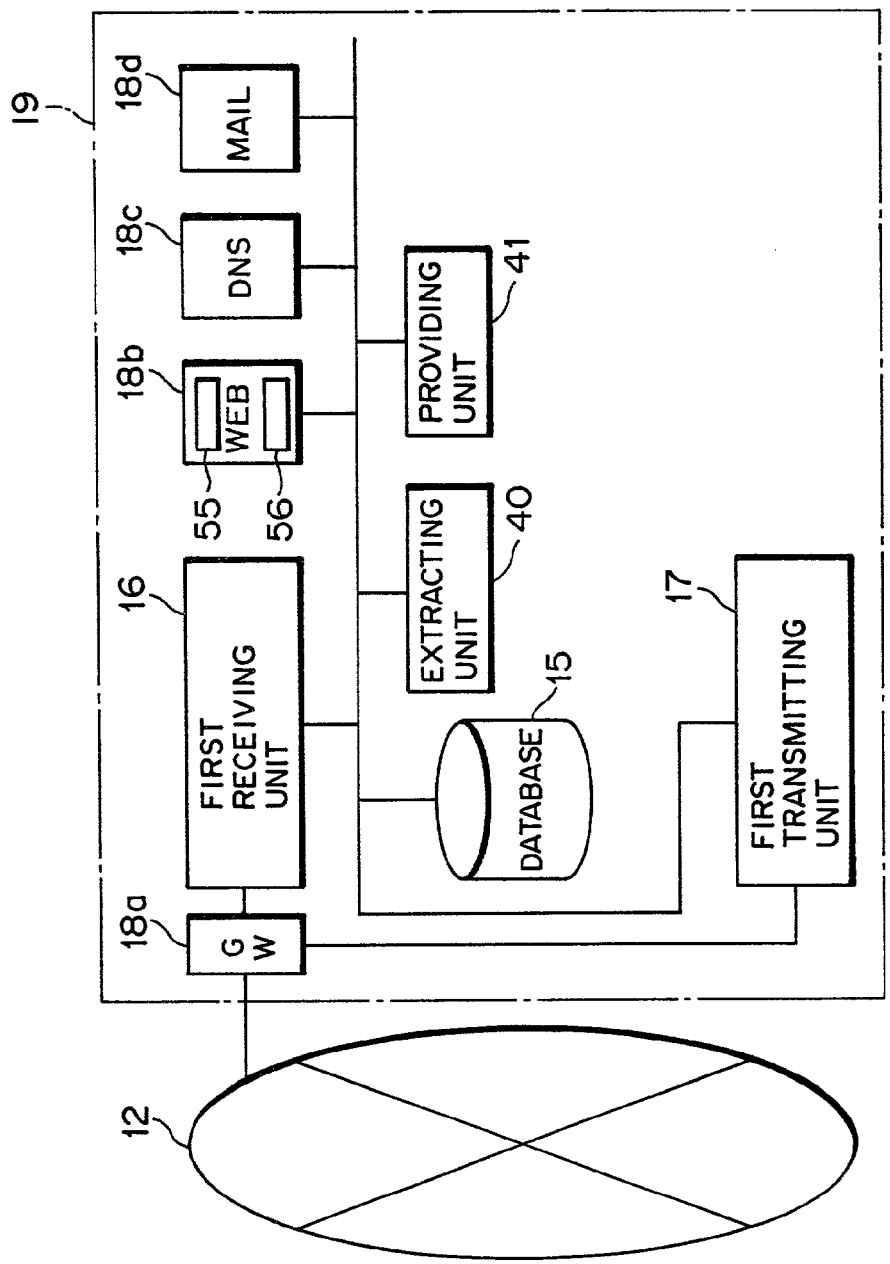
FIG. 2 is a block diagram of a service center according to the first embodiment of this invention.

FIG. 2 is a block diagram showing the service center 19 according to the first embodiment of this invention. The first embodiment will be described by way of example where one server having units described below configures the service center 19. The service center 19 shown in FIG. 2 comprises a database 15, a first receiving unit 16, a first transmitting unit 17, an extracting unit 40, a providing unit 41, a Web information outputting unit (Web) 18b, a gateway unit (GW: Gate Way) 18a, a DNS (Domain Name Server) unit 18c, and a mail transmitting/receiving unit 18d.

The database (spatial occupancy information/URL database) 15 holds bubble data in which spatial occupancy information composed of latitude, longitude, altitude and a bubble diameter of an object in a three-dimensional space is associated with various information on the object or a URL for obtaining service information relating to the various information.

The database 15 has three dimensional geographical data in order to process spatial occupancy information. Incidentally, the database 15 is not always required to be disposed in the service center 19, but may be held in a server in a different place connected to the Internet 12. The database function is accomplished by a hard disk, a ROM (Read Only Memory), a RAM (Random Access Memory), etc., although not shown.

Various information on an object represents facility information relating to a building, which is information on a building, Tokyo Tower or a shop in the building, information on a station of a public transportation system, or the like, for example. Service information relating to the various information represents service information of the facility information, which is information on products of a company in its own building, information on the opening hour (business hour) of Tokyo Tower, information on a menu of a restaurant or an eat and drink shop in the building, information on a time table of the station, etc., for example. Here, URL functions as an address for obtaining service information. In the following description, the above terms will have similar meanings unless otherwise provided. When considering readiness of configuring the database 15, it is more efficient to configure the database 15 by correlating spatial occupancy information with a URL than directly correlating spatial occupancy information with various information but not by directly associating spatial occupancy information with the various information regarding the facility.

In the second embodiment to be described later, database is created as follows. Among home pages having attribute information representing attributes of facility information relating to a building (for example, an Italian restaurant, hospital) or service information (for example, providing Italian dishes, medical treatment) of the facility in formation, a home page written in SGML (Structured Generalized Markup Language) or XML (Extensible Markup Language) having DTD information (Document Type Definition) composed of a plurality of tags with respect to the attribute information is held as bubble data in which spatial occupancy information composed of latitude, longitude, altitude and a bubble diameter of a building in the three-dimensional space is associated with a Uniform Resource Locator for obtaining service information.

FIG. 7 is a diagram for illustrating bubble data according to the first embodiment of this invention. Spatial occupancy information shown in FIG. 7 is information on an object such as a building beforehand registered by an owner of the building, a company, a restaurant or the like. In bubble data, latitude, longitude, altitude and bubble diameter are represented as A/X/0/3.

With each URL, it is possible to readily retrieve a home page in which information on a service to be provided is written. In other words, a Web site displaying service information relating to an object is held in relation with a URL.

Attribute information (attribute information element) represents information on a service to be provided, which shows a type of business of a building or the like. Bubble data relating to a specific school or a government and municipal office is beforehand registered by the system administrator, and the registered bubble data is inhibited from being written in order to prevent the bubble data from being overwritten thereafter. Namely, each piece of attribute information has an attribute representing "write permit/inhibit." Accordingly, the system administrator can inhibit the user from registering bubble data of a specific zone or building as user's private possession.

Bubble number (bubble ID: bubble Identification) shown in FIG. 7 is a unique number to identify each bubble data. For example, a hospital of bubble numbers 2 to 5 shown in FIG. 5 has the same spatial occupancy information and URLs, but has a plurality of departments. With the bubble numbers, it is possible to uniquely identify each department. In consequence, bubble data is held with a unique number that can be identified, correlated with contents of service information of the bubble data.

When the user transmits data to the service center 19 using, for example, the portable terminal 11, the user designates a bubble number to input the data. For example, when the user has an impression that dishes provided by an Italian restaurant of a bubble number 10 retrieved in the service 1 or service 2 are good, or when the user desires to teach the Italian restaurant to other person, the user can specify the bubble data. When the user again desires to know service information on the Italian restaurant, or when a third person having learned from the other desires to know service information on the Italian restaurant, the user or the third person can access to the service center 19, and input the bubble number 10 to obtain the service information (menu, opening hour), the place, etc.

In order to obtain the service information, the user inputs and transmits the bubble number 10, and the service center 19 transmits either one of spatial occupancy information (B/X/2/1) or a URL (http://www.xxx.201), or the both to the portable terminal 11, the PDA 32 or the personal computer. These pieces of information are displayed on the display. The user can thereby store specific service information with the bubble number.

On the other hand, in response to a request for the service 1 or service 2 from the user, the service center 19 retrieves using either one of spatial occupancy information or the URL, and transmits a result of the retrieval along with a plurality of bubble numbers to the portable terminal By giving a bubble number to unique service information, both the user and the service center 19 can specify spatial occupancy information, a URL and service information, separately and certainly.

In providing the above service 1, the service center 19 retrieves bubble data corresponding to a building designated by the user using position information when receiving the position information and a retrieval distance region transmitted from the portable terminal 11. The service center 19 retrieves a plurality of buildings 100 m away from the position of the portable terminal 11 in the north direction, for example, obtains a plurality of URLs corresponding to the respective plural buildings, and transmits contents held at the plural URLs to the portable terminal 11.

As this, the service center 19 can provide service information on buildings within a not-larger-than-100 m range from the user.

In more detail, the service center 19 retrieves bubble data using a retrieval vector V on the basis of the position information. The retrieval vector V is a vector from the position of the portable terminal 11 toward an object of retrieval such as a structure, a building, a shop, a temple or the like on the basis of the position information transmitted from the portable terminal 11. The retrieval vector V is generated by the service center 19 on the basis of the position information transmitted from the portable terminal 11. The service center 19 outputs a plurality of information bubbles (images of spatial occupancy information of bubble data) intersecting the retrieval vector V toward an object of retrieval as results of the retrieval. Incidentally, the service center 19 may select service information on a shop inside a building within a predetermined distance range, and transmit it to the portable terminal 11.

In providing the above the service 2, the service center 19 generates a retrieval vector V similar to the above from a position and direction of the portable terminal 11 when receiving position information transmitted from the portable terminal 11, retrieves an information bubble first intersecting the retrieval vector V, and transmits contents such as a lunch menu of a restaurant, for example, designated by the user to the portable terminal 11. The service center 19 can thereby provide service information on a shop or the like designated by the user.

A geometry of an image of spatial occupancy information is a sphere, an elliptic sphere, or a quadrangular prism in conformity with a volume of a building, as will be described later with reference to FIGS. 9(a) through 9(h) and the like. This geometry can be variously modified, and registered. The image may be set to not only a closed space (occupied space) but also a part of a predetermined range in the space or an infinite range on one side.

When bubble data is written in the database 15, an image (information bubble) of spatial occupancy information of the bubble data is generated. When the bubble data is erased from the database 15, the same effect as the information bubble disappears is provided.

Next, the service center 19 will be described with reference to FIG. 2. The first receiving unit 16 shown in FIG. 2 receives position information composed of latitude, longitude, altitude, direction and an inclination angle transmitted from the portable terminal 11. This function is accomplished by an input port, a CPU (Central Processing Unit: not shown), a ROM, a RAM, etc. of a personal computer or a workstation.

The extracting unit 40 extracts a specific URL (signifying a specific address or specific retrieval information) corresponding to specific spatial occupancy information (intersecting the above retrieval vector) including position information out of spatial occupancy information held by the database 15 on the basis of the position information composed of latitude, longitude, altitude, direction and an inclination angle of the portable terminal 11 transmitted from the portable terminal 11.

The providing unit 41 provides specific service information corresponding to the specific URL extracted by the extracting unit 40 to the portable terminal 11. The providing unit 41 can provide (transmit) a URL or a content name corresponding to the URL to the portable terminal 11. This will be described later. Whereby, the user can obtain information on a desired object of retrieval, so that complicated retrieval becomes unnecessary.

The first transmitting unit 17 selects bubble data/a URL corresponding to the position information among plural kinds of bubble data/URLs held in the database 15 on the basis of the position information from the portable terminal 11 received by the first receiving unit 16, and transmits service information displayed on the Web server (Web site) corresponding to the URL to the portable terminal 11. This function is accomplished by an output port, a CPU, a ROM, a RAM, etc. of a personal computer or a work station.

The Web information outputting unit 18b holds user information (contents of an individual, a restaurant, a company, etc.), which comprises a URL generating unit (address generating unit) 55 and a message storing unit 56. The URL generating unit 55 generates a URL for holding service information on an individual, a company, etc. held in the Web information outputting unit 18b. The service center 19 can manage a list of URLs owing to the URL generating unit 55, and appropriately provide service information corresponding to an object of retrieval.

The message storing unit 56 holds a message inputted from the user, which configured with, for example, a memory. The message is associated with spatial occupancy information of bubble data (in which spatial occupancy information is associated with a URL to obtain service information), and written in the message storing unit 56.

In associating a message with spatial occupancy information, a plurality of messages are assigned to a plurality of small information bubbles set inside the spatial occupancy information, and an individual URL is given to each of the plural small information bubbles. At each of the URLs, a message is held.

The service center 19 can thereby manage a list of URLs, and appropriately provide service information corresponding to an object of retrieval.

The DNS unit 18c has a conversion table for host names and IP addresses, and outputs an IP address corresponding to a received host name. The mail transmitting/receiving unit 18d transmits/receives an electronic mail (hereinafter abbreviated as a mail, occasionally). As will be described later, the mail transmitting/receiving unit 18d has a function of correlating four kinds of information, that is, latitude, longitude, altitude and a bubble diameter, with a mail address. The gateway unit 18a has a known gateway function.

Each of these functions is accomplished by a CPU, a ROM, a RAM, etc. in cooperation.

Each function of the service center 19 may be distributed.

Figure 3:
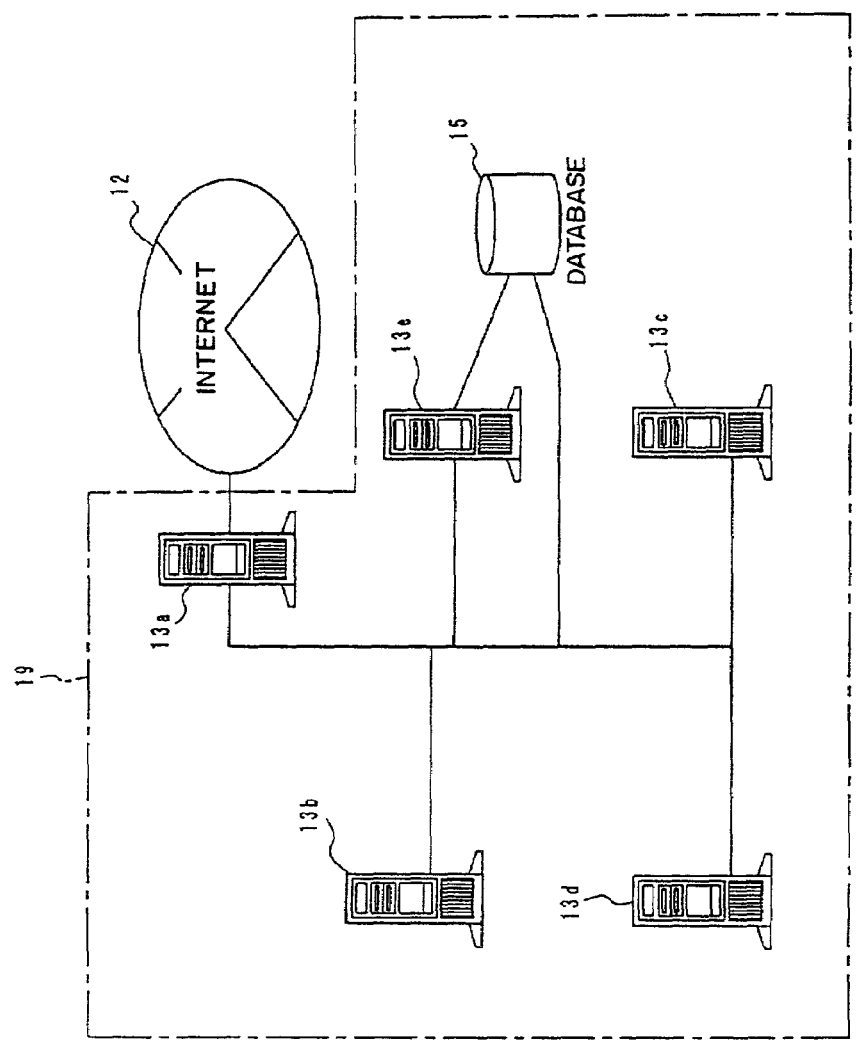
FIG. 3 is a block diagram of another service center according to the first embodiment of this invention.

FIG. 3 is another block diagram of the service center 19 according to the first embodiment of this invention. In the service center 19 shown in FIG. 3, respective functions of the service center 19 configured with one server shown in FIG. 2 are distributed to plural servers. The service center 19 shown in FIG. 3 comprises a gateway server 13a, a Web server 13b, a DNS server 13c, a mail server 13d, a retrieval server 13e and a database 15.

The gateway server 13a has a similar function to the gateway unit 18a. The Web server 13b is similar to the Web information outputting unit 18b, the DNS server 13c is similar to the DNS unit 18c, the mail server 13d is similar to the mail transmitting/receiving unit 18d, and the retrieval server 13e is similar to the providing unit 41.

Incidentally, like reference characters have the same or similar functions of those described above, duplicated descriptions of which are thus omitted. The distributed arrangement is common in the second and third embodiments.

Figure 4:
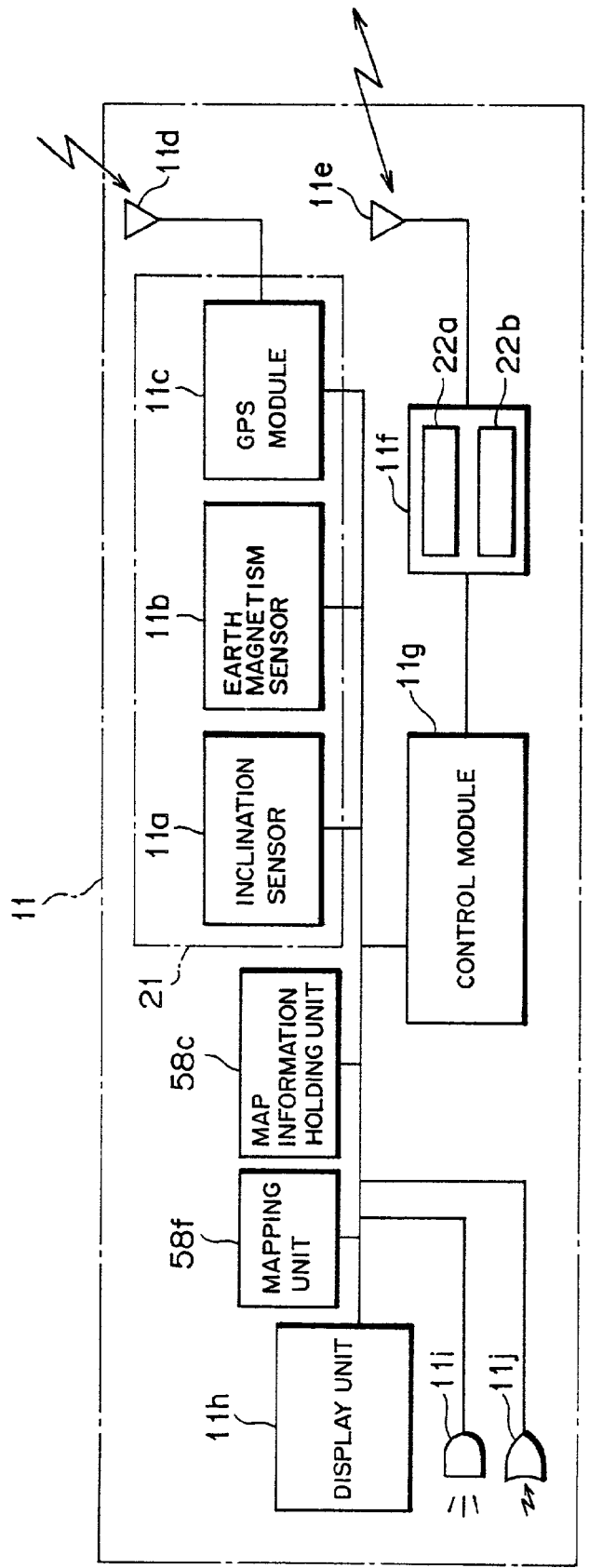
FIG. 4 is a block diagram of a portable terminal according to the first embodiment of this invention.

FIG. 4 is a block diagram of the portable terminal 11 according to the first embodiment of this invention. The portable terminal 11 shown in FIG. 4 comprises antennas 11d and 11e, a detecting unit 21, a radio module 11f, a control module 11g, a display unit 11h, a speaker 11i and a microphone 11j.

The antenna lid is a GPS antenna receiving a radio signal transmitted from a satellite. The antenna 11e transmits and receives a radio signal to and from the radio network 10.

The detecting unit 21 detects position information composed of latitude, longitude, altitude, direction and an inclination angle of the terminal, which comprises a GPS module (satellite information receiving unit) 11c, an earth magnetism sensor (a geomagnetism sensor or direction sensor or azimuth sensor) 11b, and an inclination sensor (gyro sensor) 11a.

The GPS module can receive satellite information using the global positioning system. The satellite information is information composed of latitude, longitude and altitude of the portable terminal 11. The GPS module 11c can control a direction of the antenna 11d.

The geomagnetism sensor 11b can detect the geomagnetism to measure the azimuth. Here, a reference of azimuth represents a direction in which the antenna lie is extended, for example. The geomagnetism sensor 11b has a coil (not shown) to measure the geomagnetism according to a magnitude of the magnetic flux through the coil. This measuring method is known, thus detailed description of which is omitted.

The inclination sensor 11a can measure an angle of inclination to the horizon of the portable terminal 11. The inclination sensor 11a cooperates with a gyro module to detect an attitude of the portable terminal 11.

The radio module 11f transmits and receives a radio signal, which comprises a second transmitting unit 22a and a second receiving unit 22b.

The second transmitting unit 22a transmits position information on the portable terminal 11 detected by the detecting unit 21 to the service center 19. The second receiving unit 22b receives specific service information corresponding to specific spatial occupancy information including the position information transmitted from the second transmitting unit 22a out of spatial occupancy information composed of latitude, longitude, altitude and a bubble diameter of an object in the three-dimensional space transmitted from the service center 19. Each of the second transmitting unit 22a and the second receiving unit 22b is formed with a radio frequency circuit.

The control module 11g controls operations of respective parts of the portable terminal 11, besides processing a data format for transmission/reception on the basis of a predetermined protocol. This function is accomplished by a CPU, a ROM, a RAM, etc. The display unit 11*h* displays specific service information received by the second receiving unit 22*b*. This function is accomplished by a window display. The speaker 11*i* is used to output voice. The microphone 11*j* is used to input voice. Both the outputted and inputted voices are amplified by amplifiers (not shown). The portable terminal 11 thus has a displaying function, a GPS receiving function, an azimuth detecting function, and a radio frequency signal transmitting/receiving function.

A mapping unit 58*f* and a map information holding unit 58*c* shown in FIG. 4 will be described later in the second and third embodiments.

When desiring to receive the service 1, the user aims the portable terminal 11 in a predetermined direction, and inputs, for example, "100 m" as a distance range to be retrieved. The portable terminal 11 obtains position information on the portable terminal 11, transmits the position information and the distance range to the service center 19, and receives service information from the service center 19. The user may select service information on a shop in a certain building within a predetermined-distance range, and request the service center 19 to transmit the service information on it. The user may beforehand set the distance range to, for example, 100 m in the portable terminal 11, instead of inputting a distance range. Alternatively, the service center 19 may beforehand set such as to retrieve objects within a 100 m range.

The user can thereby obtain information about three buildings, A building, B building and C building, in a direction of user's eyes and information relating thereto.

When desiring to receive the service 2, the user aims the portable terminal 11 toward the ninth floor of D building on which there is a restaurant. The portable terminal 11 transmits obtained position information to the service center 19, and obtains service information on the restaurant from the service center 19. The user can thereby obtain service information on the specific building.

Next, description will be made of a such service that the service center 19 obtains desired service information from position information on the portable terminal 11 and provides the service information to the user, with reference to FIGS. 5 through 9(*h*).

Figure 5:
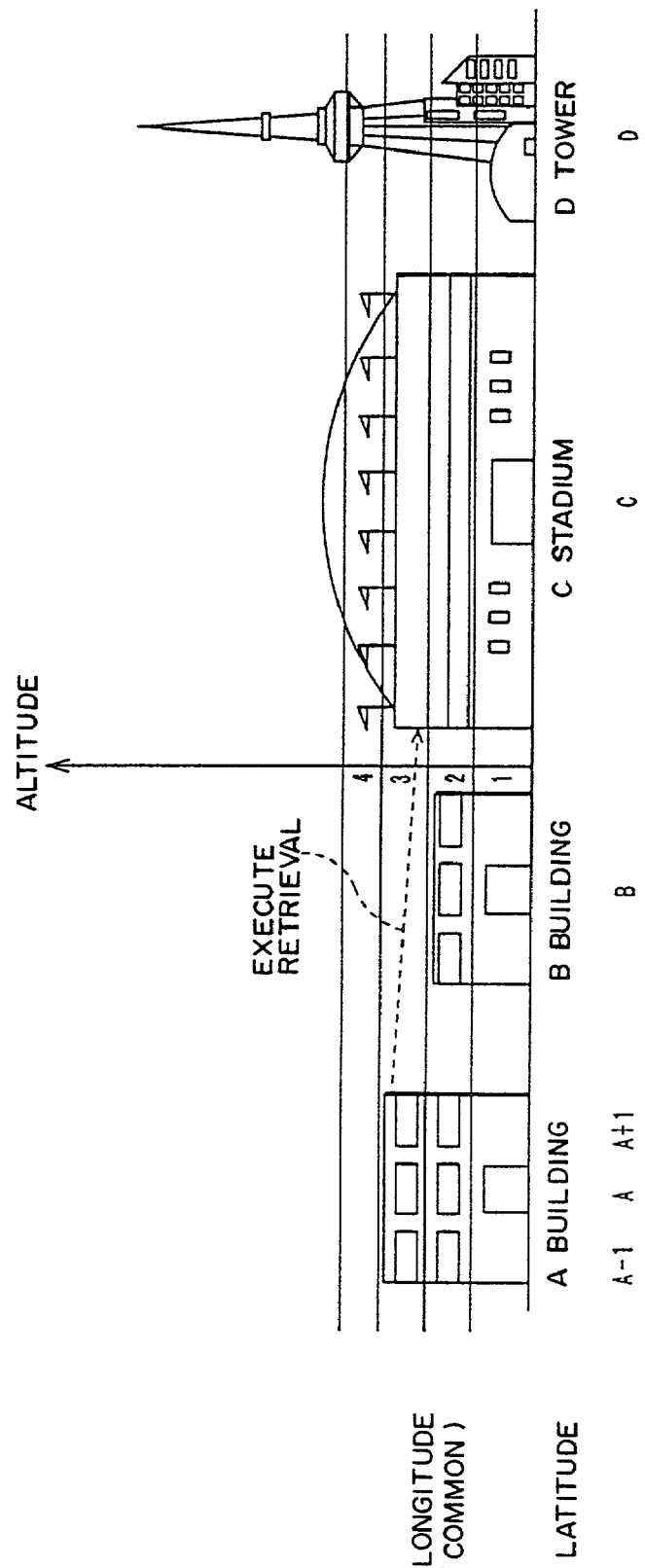
FIG. 5 is a diagram schematically showing an arrangement of buildings according to the first embodiment of this invention.

FIG. 5 is a diagram schematically showing an arrangement of buildings according to the first embodiment of this invention. Positions of four buildings shown in FIG. 5 are at the same longitude but different latitude. For example, A building is located in a latitude range from A−1 to A+1. Center positions of B building, C stadium and D tower are at latitudes B, C and D. Unit of both latitude and longitude is "°" (degree), "'" (minute), and "''" (second). This is the same in the following description.

The user on the third floor of A building obtains position information using the portable terminal 11, and transmits it in order to receive, for example, the service 1.

Figure 6:
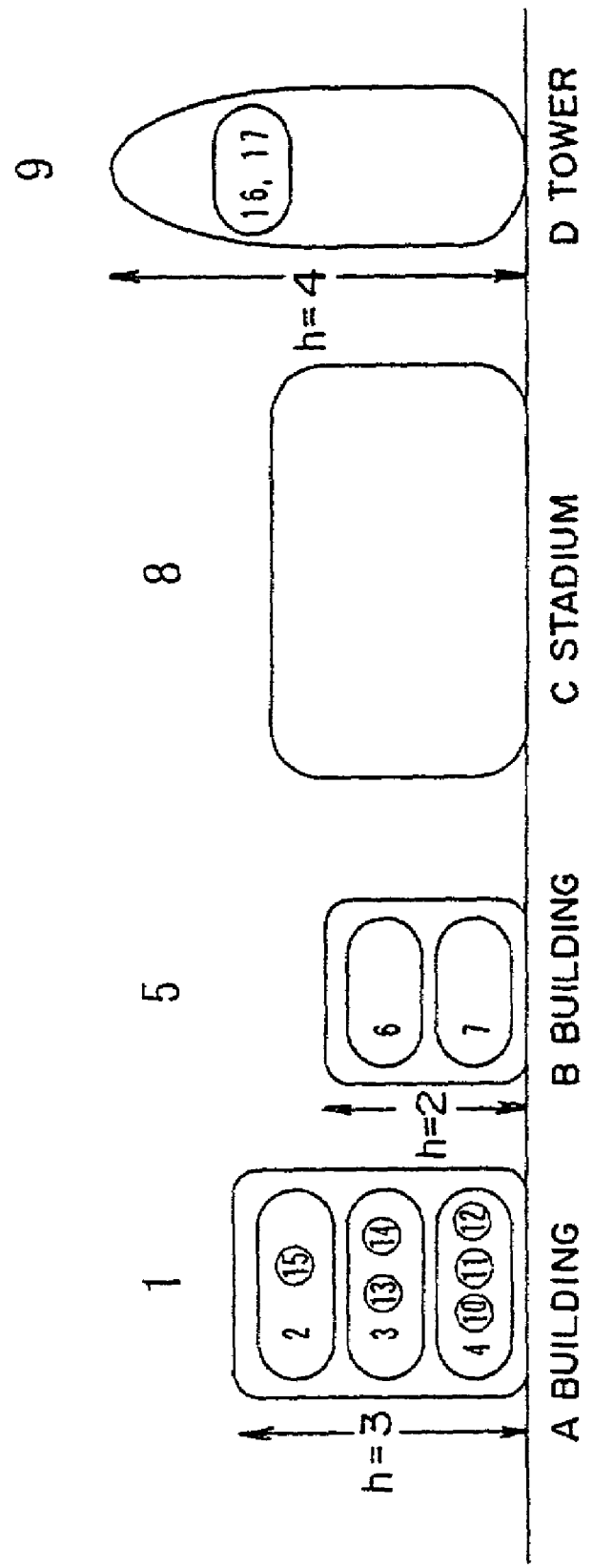
FIG. 6 is a diagram showing an image of spatial occupancy information of bubble data according to the first embodiment of this invention.

FIG. 6 is a diagram showing images (information bubbles) of spatial occupancy information of bubble data according to the first embodiment of this invention. Information bubbles 1 to 17 shown in FIG. 6 represent images corresponding to the buildings A to D shown in FIG. 5. In each of these information bubbles 1 to 17, spatial occupancy information composed of latitude, longitude, altitude and a bubble diameter of an object is associated with various information relating to the object or information on a URL or the like relating to the various information.

The information bubbles 1, 5, 8 and 9 represent A building, B building, C stadium and D tower, respectively. According to spatial occupancy information including a size of the building, the information bubble is generated. The information bubble 1 has information bubbles 2, 3 and 4 inside it. These information bubbles 2, 3 and 4 represent images corresponding to respective floors of A building.

Numbers shown in FIG. 7 are identification numbers given to the information bubbles shown in FIG. 6. Spatial occupancy information composed of latitude, longitude, altitude and a bubble diameter is expressed as A/X/0/3. Here, A to D (degrees) are lattitudes.

Altitude 0 represents that the building contacts with the ground. Altitudes 1, 2 and 3 represent values corresponding to true values (for example, 15 m, 30 m and 45 m). An altitude of a shop in the basement is represented by a minus value.

FIG. 8 is a diagram for illustrating another bubble data according to the first embodiment of this invention. As shown in FIG. 8, spatial occupancy information can be true values. A URL or contents name (for example, A building, C stadium) corresponding to the URL is transmitted to the portable terminal 11. When the user clicks the URL or the content name, the contents are displayed. In order to display the contents name, it is necessary to beforehand associate the contents name with the URL, and register the contents name.

In FIG. 8, each service information can be uniquely identified with a bubble number.

A bubble diameter (refer to FIGS. 7 and 8) represents a diameter when the information bubble is a sphere as mentioned above. When the information bubble is an elliptic sphere, the bubble diameter represents a long axis and a short axis, it is thus necessary to set a value corresponding to each of them. When the information bubble is a quadrangular prism in conformity with a volume of the building, the bubble diameter represents, for example, a width of the quadrangular prism. Incidentally, the bubble radiuses 1, 2 and 3 shown in FIGS. 7 and 8 represent values corresponding to true values. The information bubble may be a circular cylinder.

FIGS. 9(*a*) through 9(*h*) are diagrams showing examples of building data according to the first embodiment of this invention. (A, B, C) shown in these drawings are center positions of respective information bubbles. At which position the center position of an information bubble is set can be arbitrarily determined and set, and uniformly used.

FIG. 9(*a*) is a quadrangular prism, the center position of which is a center on the bottom surface. D, E and F shown in FIG. 9(*a*) represent a latitude width, a longitude width, and an altitude width, which are, for example, 20 m, 20 m and 10 m, respectively. These widths are beforehand held in the database 15, and considered when an information bubble is generated.

A retrieval vector V passing through the origin (0, 0, 0) is represented as (x, y, z)=(0, 0, 0)+($V_1$, $V_2$, $V_3$) in, for example, (x, y, z) coordinates, where $V_1$, $V_2$, $V_3$ are respective x, y and z components of a direction vector. Whether the retrieval vector V intersects within the above width of the solid or not is calculated.

FIG. 9(*b*) shows a sphere, the center position of which is the center of the sphere. When an information bubble is retrieved, presence of an intersection is detected using an equation expressing the sphere and a formula expressing the retrieval vector V with latitude, longitude and altitude of the portable terminal 11 being as an origin of the coordinates.

For example, a sphere having a diameter R with the origin (0, 0, 0) being the center position is expressed as $x^2+y^2+z^2=R^2$. Using the formulae of the retrieval vector V and the expression of the sphere, an intersecting point is calculated.

Figure 9A:
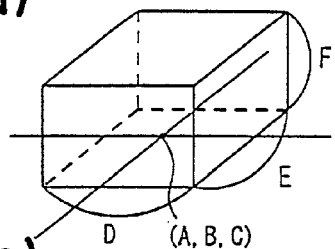
FIGS. 9(a) to 9(h) are diagrams showing an example of building data according to the first embodiment of this invention.
Figure 9B:
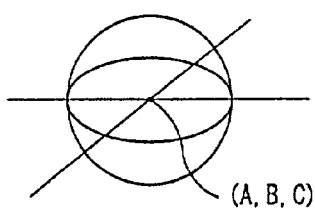
Figure 9C:
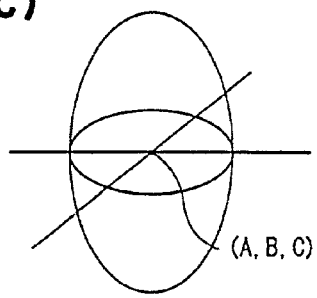

FIG. 9(c) shows an elliptic sphere, the center position of which is the center of the elliptic sphere. The elliptic sphere having a long axis a and a short axis b with the origin (0, 0, 0) being the center position is expressed as $(x/b)^2+(y/b)^2+(z/a)^2=1$.

Figure 9D:
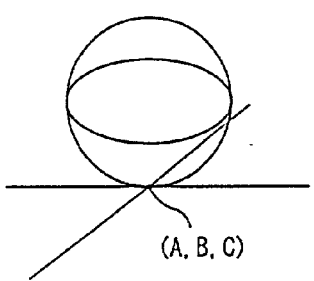
Figure 9E:
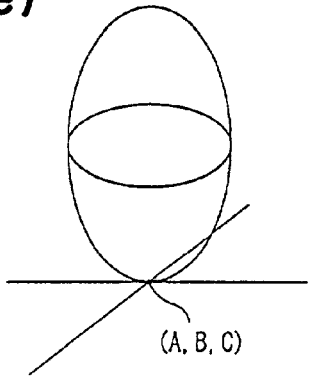
Figure 9F:
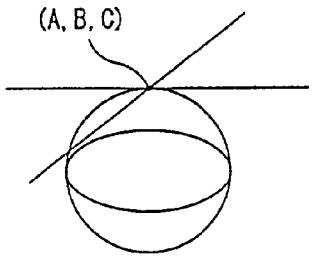
Figure 9G:
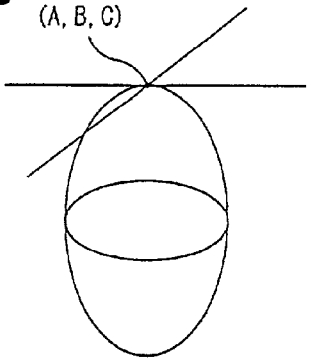

In the example shown in FIG. 9(d), the lowest point of a sphere is the center position. In the example shown in FIG. 9(e), the lowest position of an elliptic sphere is the center position. In the example shown in FIG. 9(f), the highest position of a sphere is the center position. In the example shown in FIG. 9(g), the highest point of an elliptic sphere is the center position.

Figure 9H:
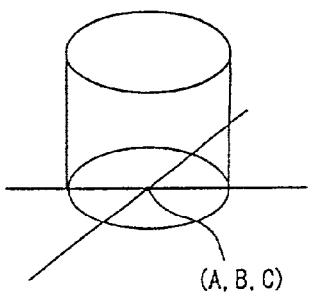

FIG. 9(h) shows a circular cylinder, the center position of which is the center on the bottom surface. The circular cylinder having a diameter R and a height H with the origin (0, 0, 0) being the center position is expressed as $x^2+y^2=R^2$ and $(0 \leq z \leq H)$.

A range of an information bubble to be displayed by the service center 19 can be variously changed according to a contract fee or the like. When an individual makes a contract, the range of an information bubble is basically within a diameter 5 m.

In concrete, a diameter of the sphere, or a long axis and a short axis of the elliptic sphere shown in FIGS. 9(b) to 9(g) are changed. Further, spatial occupancy information of the quadrangular prism shown in FIG. 9(a) may be set to not only a closed region but also a wider region in parallel to a side denoted by latitude E, for example. Additionally, spatial occupancy information of the circular cylinder shown in FIG. 9(h) may be set to an infinite region extending upward from the center position in the z direction.

A company in A building (refer to FIGS. 5 and 6) correlates a URL of its own home page for introducing contents of its service with spatial occupancy information on its own building, for example, and registers it in the bubble data. Namely, the whole A building is registered as an information bubble 1. Three shops on the first floor of A building, two shops on the second floor, and one shop on the third floor are registered as information bubbles 10 to 15.

Accordingly, an advertisement of a company, a menu or reputation of a restaurant, etc., are beforehand registered as bubble data, and the user transmits position information using the portable terminal 11 as a retrieval tag.

The user can thereby readily obtain a menu of a restaurant far away. The user can also readily learn service information on a shop in a building even from the outside of the building.

The user can receive the service 1 and obtain various service information from plural kinds of bubble data only by aiming the portable terminal 11.

In relation with the service 2, the user can obtain service information on a registered restaurant in designated B building.

The user can retrieve in an analogue way based on human sensation without digital processing such as in the retrieval service in the Internet 12. The user can therefore readily obtain information on a shop within a range that he/she can see. Namely, the user can obtain desired service information in an analogue manner such as "in this place" or "in that place".

An owner of a restaurant, for instance, registers spatial occupancy information on and a URL of the shop as bubble data in the service center 19 instead of placing an advertisement on a magazine or the like so as to directly provide service information on his/her own shop to the user.

Since information is opened as this, the user can take out information on an object that the user can see, very easily and quickly.

Next, description will be made of a bubble data registering operation in the information providing service system according to this invention with reference to FIGS. 10 through 13.

Figure 10:
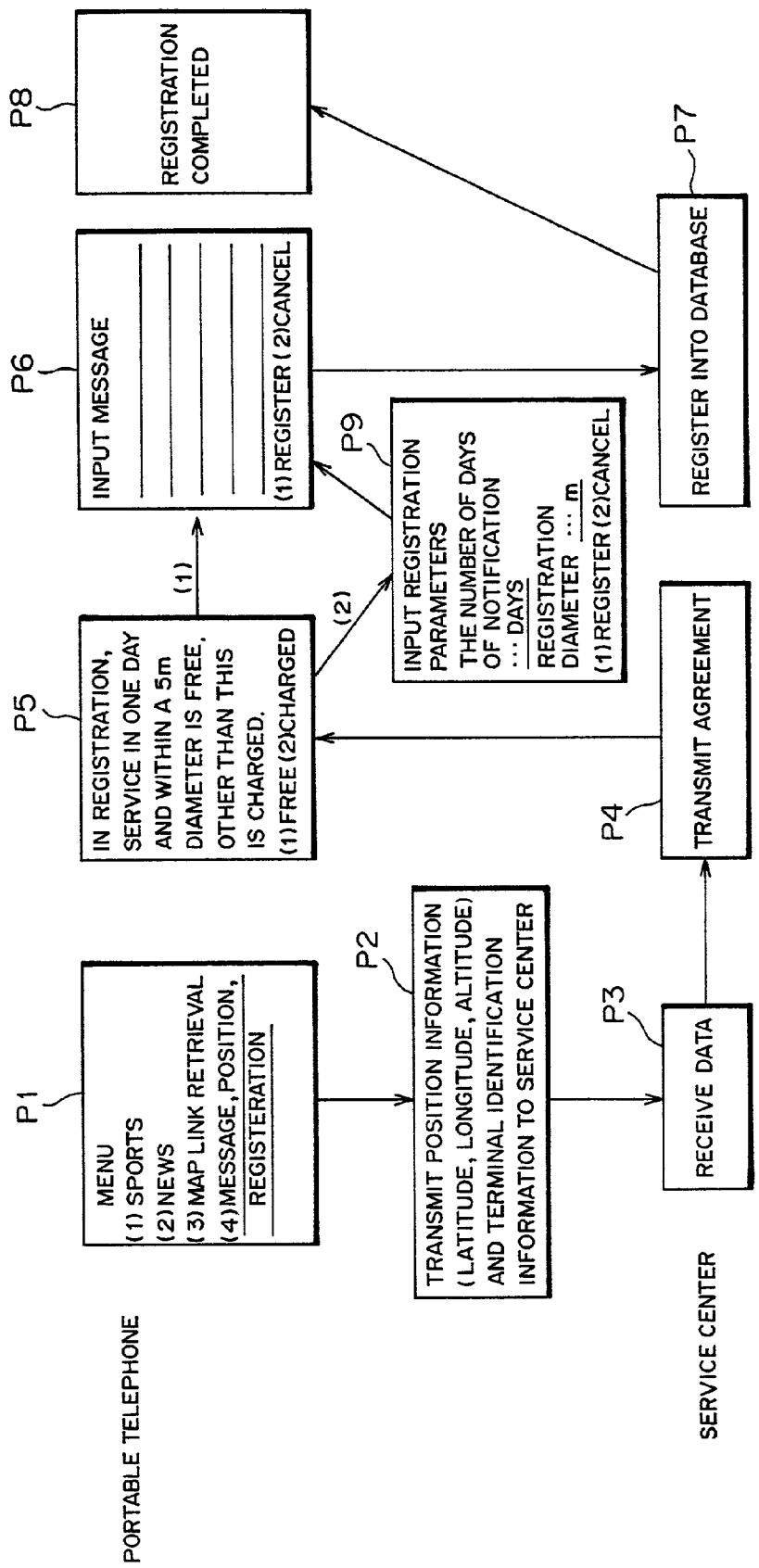
FIG. 10 is a diagram showing a sequence for illustrating registration on the information providing service system according to the first embodiment of this invention.

FIG. 10 is a diagram showing a sequence for illustrating registration in the information providing service system according to the first embodiment of this invention, in which data transmitted and received between the portable terminal 11 and the service center 19 is schematically shown. This is an example where the user registers data using position information on the portable terminal 11.

At step P1 shown in FIG. 10, the user selects (4) in a plurality of menus displayed on the portable terminal 11, and starts position registration (message position registration). The portable terminal 11 measures position information composed of latitude, longitude and altitude of the terminal using the above sensor group.

At step P2, the portable terminal 11 transmits measured position information and terminal identification information to the service center 19.

When receiving the data (step P3), the service center 19 transmits use agreement or the like to the portable terminal 11 (step P4). This agreement is to make the user select whether the user receives a charged service or a free service. For example, the user selects a large bubble diameter (for example, not less than 5 m) or a small bubble diameter (not larger than 5 m).

When the user selects the large bubble in expectation of an effect of advertisement at step P5, the procedure proceeds through a route denoted by (2), so that parameters necessary in actual registration are displayed on the portable terminal 11 (step P9). On the contrary, when the user selects the small bubble, the procedure proceeds through a route denoted by (1), so that the portable terminal 11 is prompted to input a message (step P6).

When the user completes the inputting at step P7, the message is transmitted to the service center 19. The service center 19 writes the transmitted position information and information on an object of retrieval in the database 15. The service center 19 then converts spatial occupancy information composed of latitude, longitude and altitude of the object in the three-dimensional space into a URL, and writes the URL in the URL generating unit 55 of the Web server 13b. The service center 19 also writes a home page URL desired to be linked in the database 15.

Registration termination is then displayed on the portable terminal 11 (step P8). Incidentally, an exclusive application is used for this registration.

By registration by a company or an individual, bubble data is generated.

The user may access to the service center 19 over the Internet 12 using a personal computer (not shown) to register bubble data.

FIG. 11 is a diagram for illustrating a charge system for bubble data according to the first embodiment of this invention. The charge system shown in FIG. 11 is contracted between the system administrator and a person who uses the system to advertise. In concrete, the small bubble diameter (5 m) is set to a lower charge, whereas the large bubble diameter (100 m) is set to a higher charge. Alternatively, the charge may be set according to a term of notification.

When the user desires to register service information on Tokyo tower, for example, registration can be done from not the portable terminal 11 but a personal computer.

With respect to a famous building such as Tokyo tower, or a public facility, the system administrator may beforehand set an information bubble having a size in conformity with a size of the building and basic information, for the sake of user's convenience.

As above, the user can easily retrieve an object that the user has an interest in an analogue manner based on human sensation in relation with buildings that the user can see. The user can therefore obtain information on a building (structure, natural object) locating in a direction designated by the user.

By aiming the portable terminal 11 to a desired direction, the user can obtain information on buildings within a 100 m range from the position of the terminal. By aiming the portable terminal 11 to a building in front, the user can obtain information on goods sold in a shop in the building.

A sponsor can advertise to a user having the portable terminal 11. The administrator of the service center 19 can earn an advertisement fee by providing the service. The user can obtain service information, freely and easily.

As this, every one of the sponsor, service administrator and user can enjoy profit.

Meanwhile, as a modified service of the above information providing service, data may be transmitted and received by mail between the service center 19 and the portable terminal 11 or the personal computer. In such case, each of the mail server 13d (refer to FIG. 3) and the mail transmitting/receiving unit 18d (refer to FIG. 2) has a function (GPS mapping coping function) of correlating latitude, longitude, altitude and a bubble diameter with a mail address.

In other words, a destination of a link represents mail data.

The owner of a restaurant can link service information on, for example, foods to bubble data, and register it, thereby to advertise the restaurant to general users. The company shows a mail address as a destination of opinions and the like to users, so that bubble data corresponding to the mail address is used.

Next, description will be made of an information providing service method using a mail in the system according to the first embodiment of this invention with references to FIGS. 12 and 13.

Figure 12:
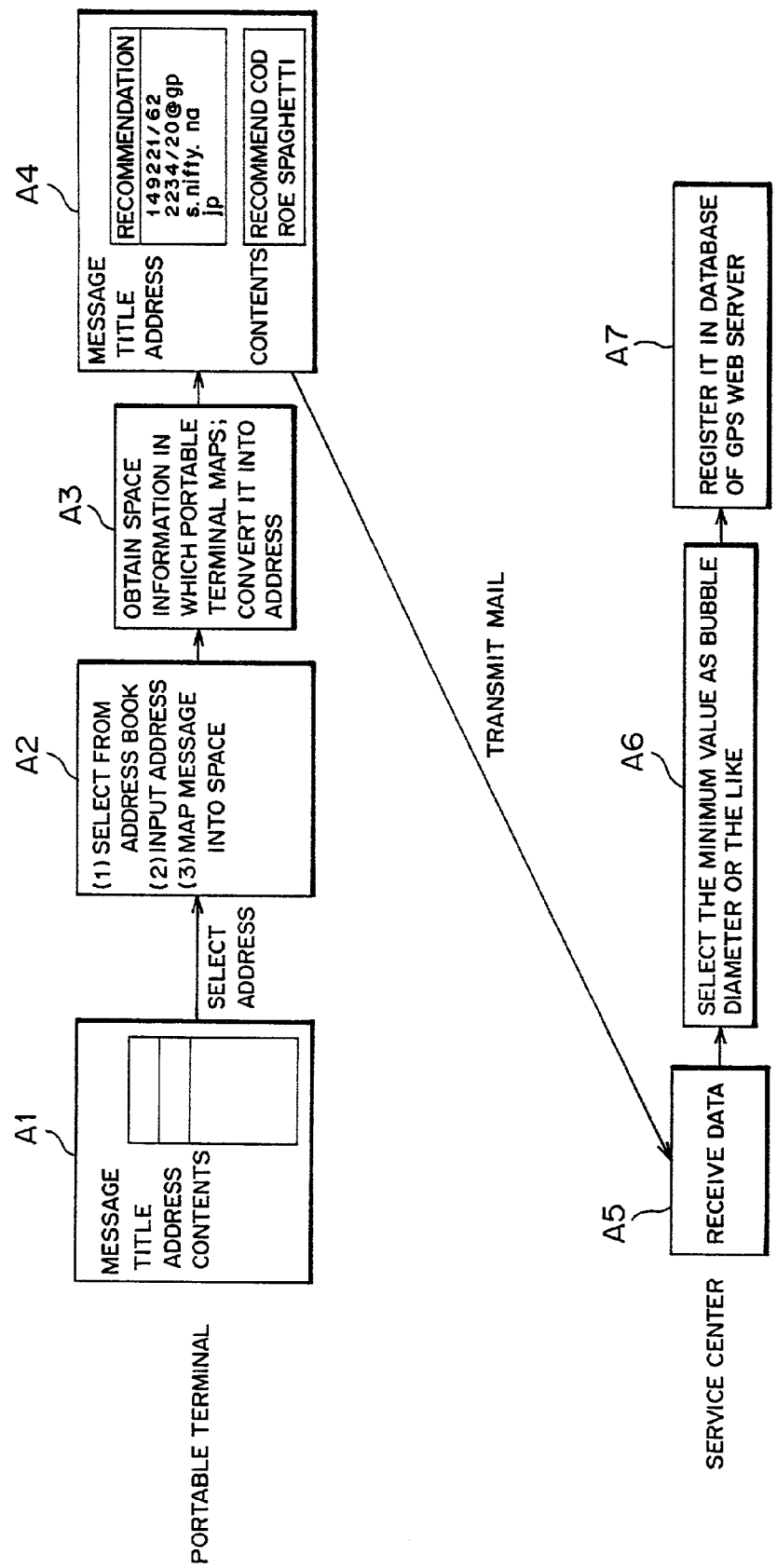
FIG. 12 is a diagram showing a sequence for illustrating registration on the information providing service system using a personal computer according to the first embodiment of this invention.

FIG. 12 is a diagram showing a sequence for illustrating registration in the information providing system according to the first embodiment of this invention, in which an example of registration using a mail is shown.

The portable terminal 11 displays an input screen (step A1). When the user selects "address" on the screen, the screen is changed to an input screen for the address (step A2). When the user selects "map a message in the space" at step A3, the portable terminal 11 obtains position information, and converts it to a mail address.

The user inputs a message (step A4), and transmits the mail to the service center 19. When the service center 19 receives the mail data (step A5), the service center 19 selects a minimum value of the bubble diameter (step A6), and writes it in the database 15 of the Web server (GPSWEB server) 13b or of the Web information outputting unit 18b (step A7).

Figure 13:
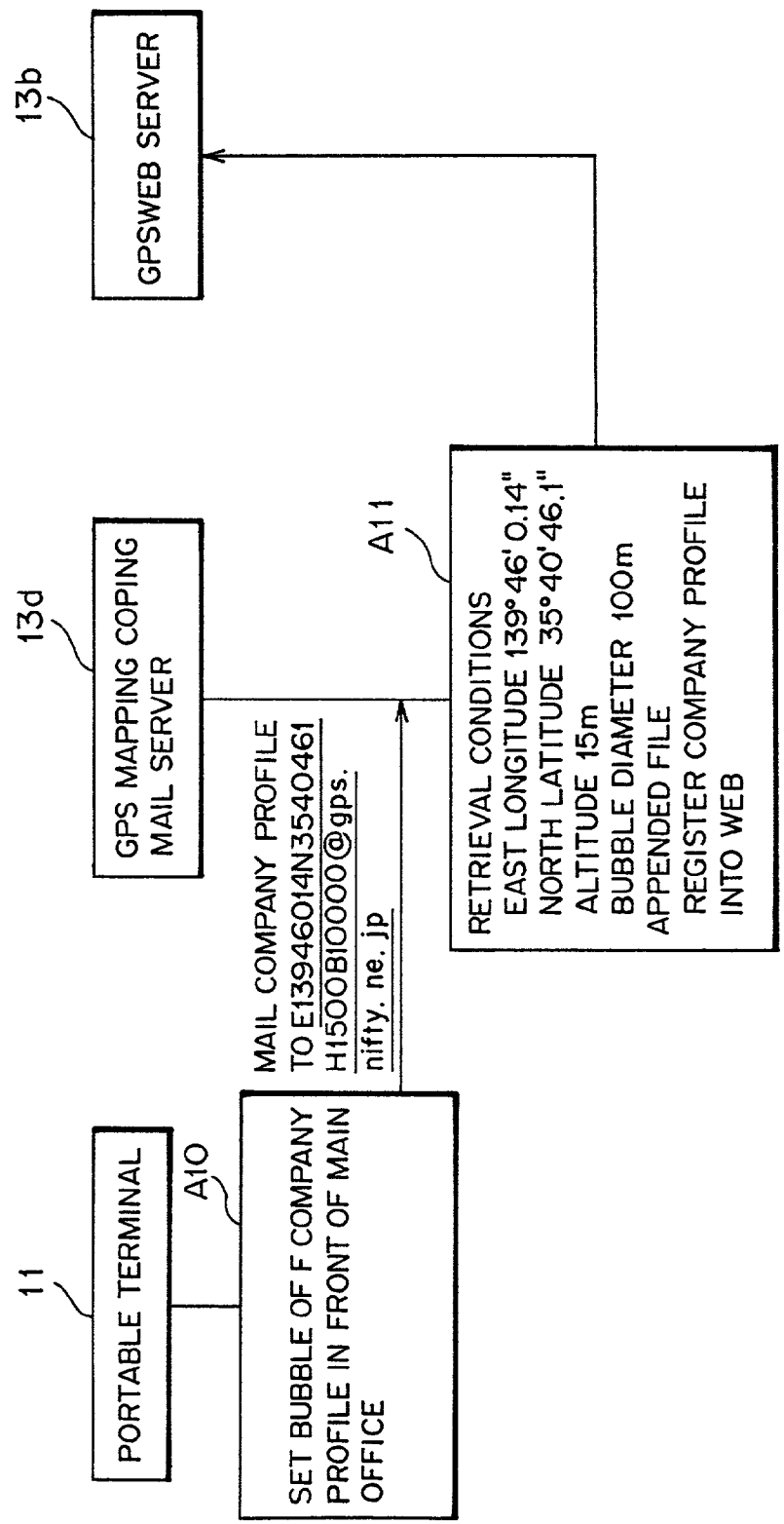
FIG. 13 is a diagram showing a sequence for illustrating registration on the information providing service system using a mail according to the first embodiment of this invention.

FIG. 13 is a diagram showing a sequence for illustrating the information providing service according to the first embodiment of this invention, in which data transmission/reception among the portable terminal 11, the mail server (mail server compatible with GPS mapping) 13d, and the Web server (GPSWEB server) 13b is shown.

At step A10, the user (for example, a person in charge in a company) sets bubble data of a company profile of F company in front of the main office of F company in Tokyo. A position at which this bubble data is set is at 139° 46'01.4" east longitude, 35° 40'46.1" north latitude, an attitude of 15 m, and the bubble diameter is set to 100 m. The user sets a mail address corresponding to the company profile. This address is E13946014N3540461H1500B10000@gps.nifty.ne.jp, for example. The user mails retrieval conditions and the company profile to the address.

At step A11, the mail server 13d receives the above retrieval conditions and the company profile, initiates retrieval, and registers the appended file as a company profile in the Web server 13b (WEB).

Bubble data whose bubble diameter is set large can be easily retrieved, but bubble data whose bubble diameter is set small is difficult to be retrieved. For this, a bubble diameter of bubble data including information desired to be hidden may be set small, whereas a bubble diameter of bubble data including information desired to be advertised to as many users as possible as a company profile or the like may be set large.

The user transmits a value showing a predetermined range as a mail address, so that bubble data including spatial occupancy information within the range is retrieved.

The user can obtain information easily and quickly using a retrieval tag that is a position.

(B) Description of Second Embodiment of the Invention

The first embodiment is in a mode that the user retrieves bubble data while moving, using mainly the portable terminal 11, to obtain information on a building. The second embodiment is in a mode that the user receives a (overlapping, mapping) service of overlapping an information bubble on a map of a layout of buildings and the like in a town displayed on a personal computer of a user using the personal computer while moving or at home.

Figure 14:
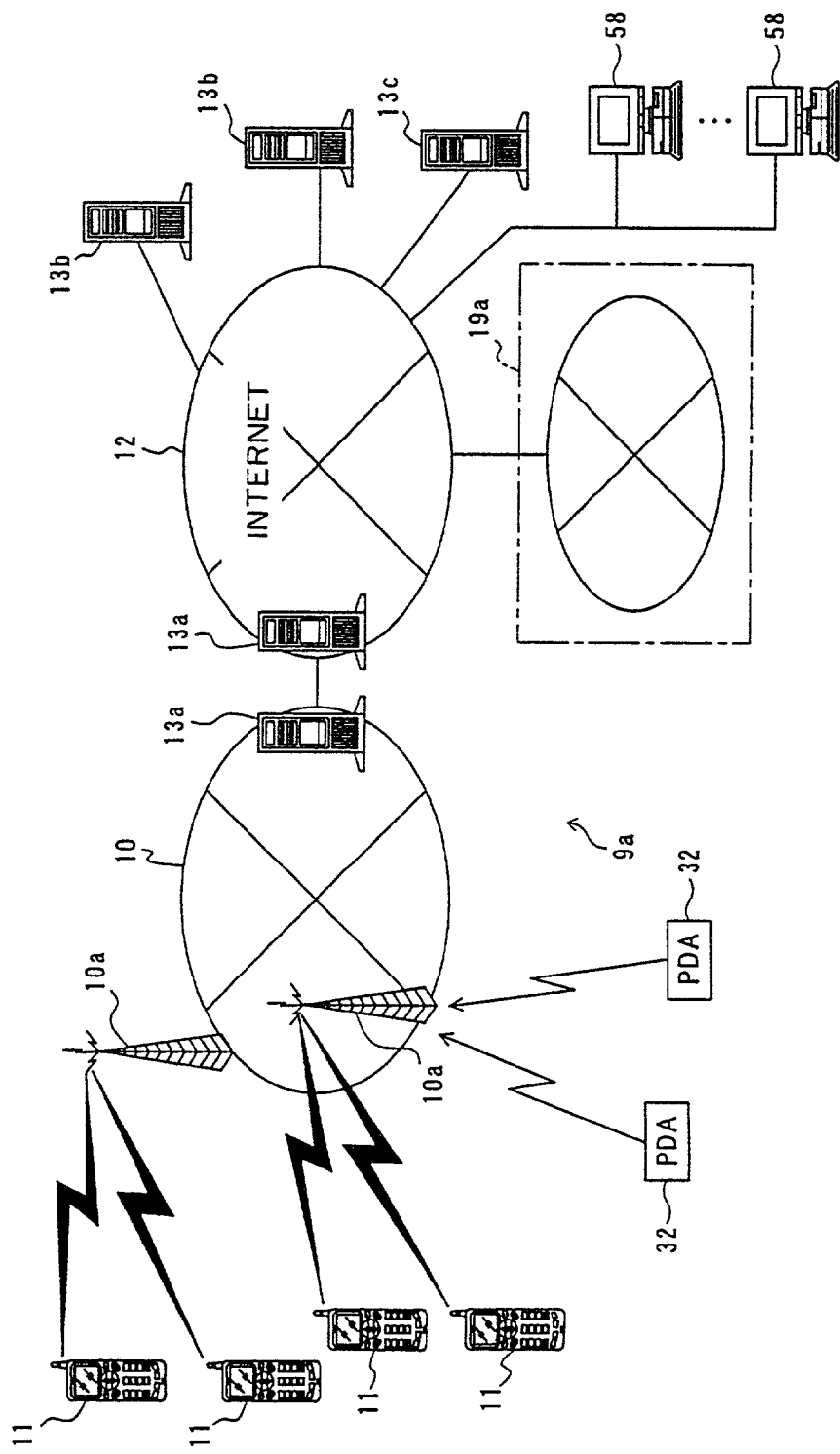
FIG. 14 is a diagram showing a structure of an information providing service system according to a second embodiment of this invention.

FIG. 14 is a diagram showing a structure of an information providing system according to the second embodiment of this invention. The system 9a shown in FIG. 14 is a system providing information to a user terminal such as the personal computer 58, the portable terminal 11 or the PDA 32, which can display a map. The information providing system 9a comprises a service center (server) 19a, a plurality of portable terminals 11, a plurality of PDAs 32, a plurality of personal computers (PCs) 58. To the information providing system 9a, a radio station 10a, a radio network 10, a gateway server 13a, the Internet 12, a Web server 13b, a DNS server 13c, etc. are connected. The same reference characters as those described above have the same or similar functions, further descriptions of which are thus omitted.

The service center 19a holds a home page described in SGML or XML having DTD information out of home pages (information documents) having attribute information representing attributes of various information relating to objects or service information relating to the various information and DTD information composed of a plurality of tags, as bubble data in which spatial occupancy information (space region information or space area information composed of latitude, longitude, altitude and a bubble diameter of an object) in the three-dimensional space is associated with retrieval information (address information, a URL) for obtaining service information.

An object is an object that actually exists such as a building, each floor of the building, a signboard, etc., or an object that moves in the space. DTD (document type definition) information corresponds to a tag described in a home page file when described in SGML, which functions as an index to make the Web server 13b recognize that the home page is contents as bubble data. Retrieval information is address information used by a user when the user retrieves desired bubble data. The retrieval information is practically a URL.

Each of the portable terminal 11, the PDA 32 and the personal computer 58 is connected to the service center 19*a* over the Internet 12 to display various information retrieved using bubble data. These function as user terminals.

The system 9*a* can provide the following services (3) to (7) as services accompanying the mapping service.

(3) Service that dynamically changes a bubble diameter of an information bubble displayed on the personal computer of a user according to the number of accesses to the bubble data, a time or a season to provide a dynamic bubble diameter (similar bubble diameter) having a diameter according to a scale of the map to the user terminal.

(4) Service that deletes a home page of specific bubble data or limit (inhibit, for example) access to the home page when the bubble data is accessed predetermined times.

(5) Service that activates an application such as JAVA program (trade name) instead of URL. Namely, a service that the service center 19*a* filters position information on the user and attribute information accompanying it to retrieve.

(6) Service that sets such limitation that only the first one hundred arrivals accessing to the home page are permitted to access to bubble data of a company, for example.

(7) Service that a user beforehand registers conditions of a partner whom the user desires to communicate with such as "female," "under age of . . . ," etc., and when the service center 19 detects that bubble data in conformity with the conditions set to each other approaches, the service center 19 notifies of it the user of the bubble data.

The services (3) to (7) will be hereinafter referred to as services 3 to 7, occasionally. In providing these services, the service center 19*a* may make the user designate a specific bubble number (refer to FIGS. 7 and 8), and display it.

The personal computer 58 is equipped with a keyboard and a mouse (not shown). The personal computer 58 has a communication function in the Internet 12 and a map displaying function of displaying a map, along with a function of executing various application programs (hereinafter abbreviated as applications, occasionally) for word processing, chart creation and the like. The personal computer 58 is of a desktop type or a note type, for example, which can be used in both a fixed environment and a mobile environment.

If the communication function is used as a fixed equipment, the personal computer 58 is connected to the Internet 12 over LAN when the personal computer 58 is disposed in, for example, a company. When the personal computer 58 is disposed in a private place such as home, the personal computer is dial-up-connected to an Internet provider using a modem or a DSU not shown to be able to transmit and receive data to and from the Internet 12.

Figure 15:
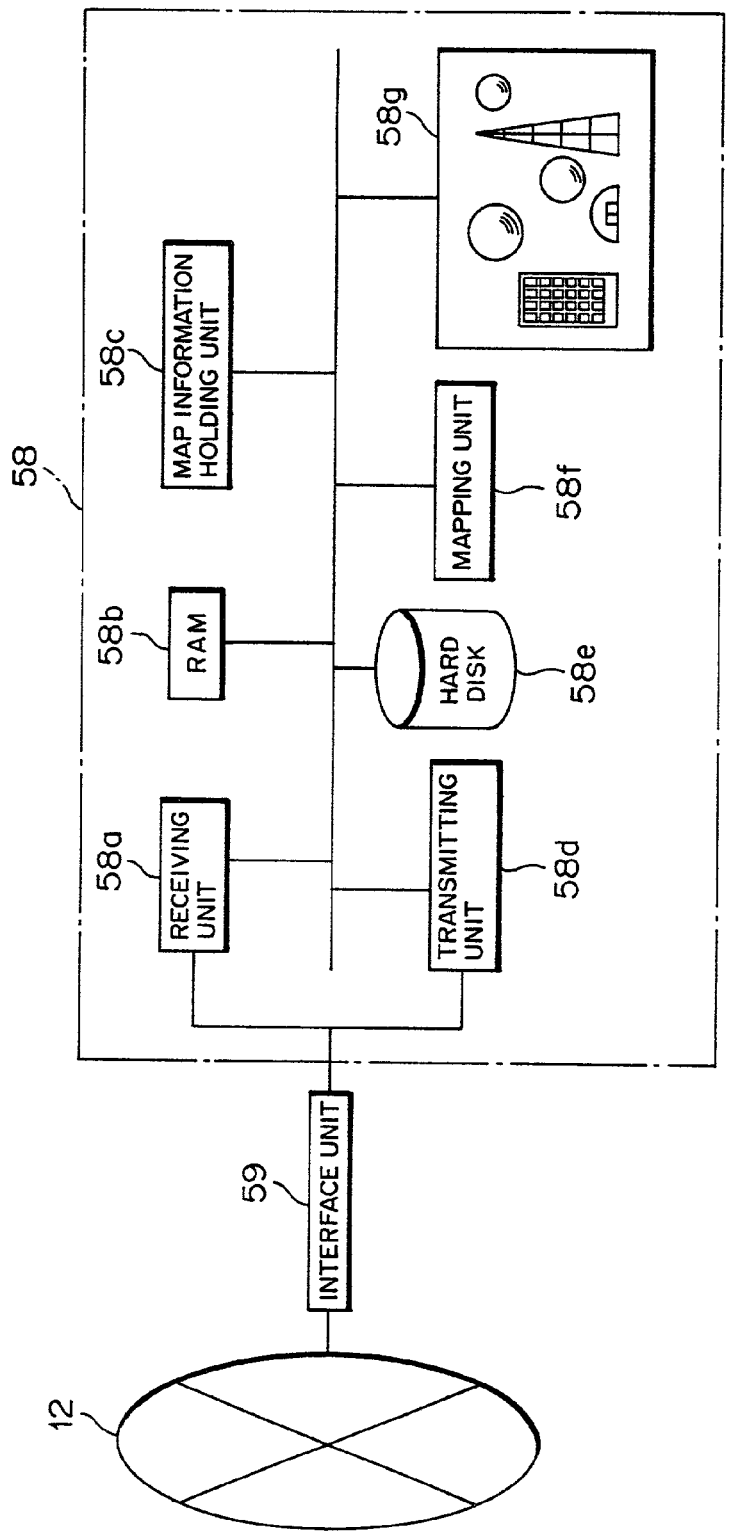
FIG. 15 is a block diagram of a personal computer according to the second embodiment of this invention.

FIG. 15 is a block diagram of the personal computer 58 according to the second embodiment of this invention. The personal computer 58 shown in FIG. 15 is used in the system 9*a* providing information to user terminals that can display maps. The personal computer 58 comprises a receiving unit 58*a*, a RAM 58*b*, a map information holding unit (map information outputting unit) 58*c*, a transmitting unit 58*d*, a hard disk (mapping data holding unit) 58*e*, a mapping unit 58*f*, and a display unit 58*g*. The personal computer 58 is connected to an interface unit 59 to be able to transmit and receive data to and from the Internet 12.

The interface unit 59 is a modem or LAN. An individual user at home connects the personal computer 58 to an access provider (not shown) through the interface unit 59 (modem) using a dial-up connection to connect it to the Internet 12. A user in, for example, a company connects the personal computer 58 to the Internet 12 through the interface unit 59 (LAN) and a proxy server (not shown) disposed in the company.

The map information holding unit 58*c* outputs map information. This function is accomplished by a hard disk. This map information is about objects (buildings and natural objects such as mountains and the like) in the three-dimensional space, which shows buildings in three dimensions, or shows simplified buildings. The map information includes characters, signs and the like representing information on the buildings. The map information is read from a library (in concrete, digital data for displaying a map), which is stored in a hard disk or the like by installing a map application. The user uses bubble data with a map application beforehand installed in the personal computer 58.

The map information holding unit 58*c* can output image files, vector files in various forms as image data. For example, the map information holding unit 58*c* can output a file in GIF (Graphics Interchange Format) form. The system 9*a* can thus map visual data supported by GIF on a map to visualize an information bubble.

Accordingly, the user can map bubble data received from the service center 59 on map information displayed by him/her, as the above mapping service. Additionally, a shortage of the portable terminal 11 that display thereof is limited when the user uses the portable terminal 11 is overcome, so that the user can see the image on a fine screen. With respect to the communication function at the time that the personal computer 58 is used as a mobile equipment, a portable telephone, a PHS (Personal Handy-phone System) telephone or the like is connected to the personal computer 58 to be able to transmit and receive in radio.

The map application can display or reproduce an arrangement of building and the like in the three-dimensional space on the display unit 58*g*. The user inputs an address, a range and the like desired to be displayed according to instructions displayed on the display unit 58*g*. The user can also input an altitude, an angle and the like of a viewpoint.

The system administrator can appropriately display an information bubble even when the user uses any map application, thereby prompting the user to subscribe for the communication carrier. The service center 19*a* can such hold bubble data having the same URL as the spatial occupancy information as to identify the bubble data with a bubble number, and transmit the data to the user by designating the identified specific bubble number. The user can display data by designating a specific bubble number on the personal computer 58.

Instead of using the map information holding unit 58*c*, it is possible to display map information held in another database connected to the Internet 12. In such case, the map information is once held in the RAM 58*b*, then outputted. Instead of connecting the map information holding unit 58*c* to the personal computer 58, the user can down-load data corresponding to the map information from the Internet 12, and hold the down-loaded data in a hard disk, a floppy disk, a CD-R, a CD-RW, an MO or the like to use it.

The display unit 58*g* displays an image of an object on the screen on the basis of the map information outputted from the map information holding unit 58*c*. This function is accomplished by a display. The object image is an image of an object. Other than buildings, images of natural objects are also displayed. Namely, the display unit 58*g* displays information bubbles on the screen other than various objects such as a building, a gymnasium, a tower, etc.

The transmitting unit 58*d* transmits a mapping request including coordinate information in the three-dimensional space on an object displayed on the display unit 58*g* and display object attribute information representing attributes of service information to be provided by the object to the service center (server) 19*a* connected to the personal computer 58 over the Internet 12. This function is accomplished by a CPU, a ROM, a RAM, a modem, a LAN card, LAN, etc. Coordinate information in the three-dimensional space on an object is composed of latitude, longitude, altitude and a bubble diameter in the three dimensional space of the object (building, natural object, or the like). Display object attribute information is information representing attributes of facility information relating to the object (building, natural object) or service information on the facility information.

The receiving unit 58*a* receives a mapping response including spatial occupancy information in the three-dimensional space (spatial range information or space area information composed of latitude, longitude, altitude and a bubble diameter of a building or a natural object) corresponding to the coordinate information and a URL for obtaining service information notified from the service center 19*a* in response to the mapping request. The functions of the receiving unit 58*a* and the transmitting unit 58*b* are accomplished by a CPU, a ROM, a RAM, a modem, a LAN card, LAN, etc.

The receiving unit 58*a* also receives a mapping response having spatial occupancy information including a dynamic bubble diameter having a diameter according to a scale of the map displayed by the display unit 58*g* and a URL on the basis of the coordinate information included in the mapping request. Namely, the receiving unit 58*a* can obtain information from the Internet 12.

An occupancy area of the information bubble to be displayed on the display unit 58*g* of the personal computer 58 is determined on the basis of a bubble diameter and a scale of the map. The user can therefore obtain bubble data in a visualized state.

The mapping unit 58*g* reads an image geometry held in the hard disk 58*e* and a URL included in the mapping response, and displays the contents thereof on the display unit 58*g*. This function is accomplished by a display driver along with a CPU, a ROM, a RAM.

The hard disk 58*e* correlates the image geometry (image geometry of the information bubble) displayed by the mapping unit 58 with the URL included in the mapping response, and holds them, which functions as a mapping data holding unit.

The information bubble is displayed on the display unit 58*g* by the mapping unit 58*f* and the map information holding unit 58*c*. Since a quantity of data necessary for transmission/reception between the service center 19*a* and the portable terminal 11 or the personal computer 58 is decreased owing to the map information holding unit 58*c*, the user can see the map without stress. The system administrator can continue the business without decreasing the number of subscribers.

Figure 19:
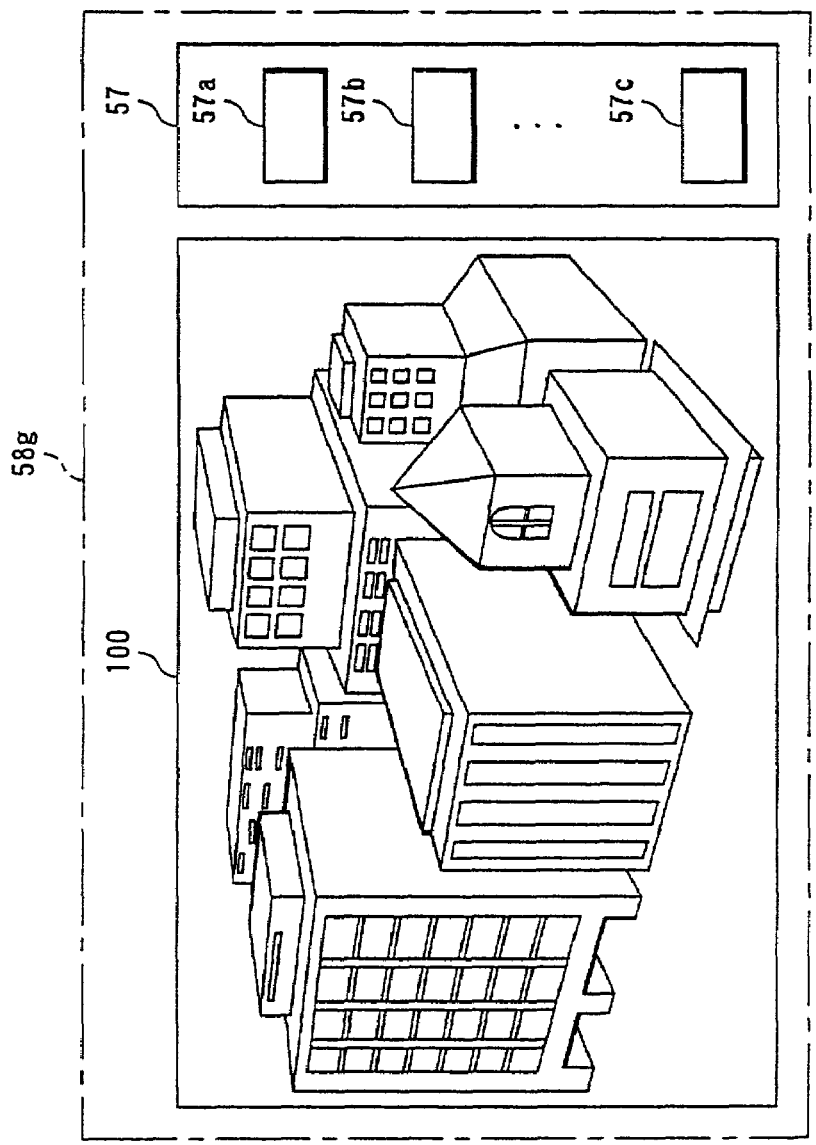
FIG. 19 is a diagram showing an example of an image according to the second embodiment of this invention.

FIG. 19 is a diagram showing an example of image according to the second embodiment of this invention. In concrete, the diagram shows an image immediately after the user starts the map application. In this initial screen, there is displayed a map of buildings in the vicinity of the user's home, or a map of buildings in the vicinity of the user's office, which can be changed according to a setting. The display unit 58*g* shown in FIG. 19 displays an image 100 and an icon group 57. The image 100 represents buildings in the three dimension, which is displayed by reading graphic data (map data) beforehand registered in the map application by the personal computer 58.

The icon group 57 are icons for operation on a display of the image 100, which comprises a plurality of icons 57*a* to 57*c*. The icon 57*a* is used by the user to transmit a retrieval request to a search robot (search engine) connected to the Internet 12 from the personal computer 58. The icons 57*b* and 57*c* are used by the user to input concrete conditions relating to a retrieval region. For example, the icon 57*b* is for a region of retrieval, whereas the icon 57*c* is for inputting conditions other than the above. These cons are assigned to input a bubble number (refer to FIGS. 7 and 8).

When a predetermined region in the image is displayed, the user designates a region in the vertical direction and a region in the horizontal direction on the screen using the icon group 57 on the basis of a reference point (refer to FIG. 25 to be described later) in the predetermined region. The designated image region (a region along the latitude and a region along the longitude) is calculated on the basis of a scale and a size of the screen by the map application, and the calculated data is transmitted to the service center 59*a* from the personal computer 58.

The service center 19*a* retrieves a home page file in which a tag <bubble>representing bubble data is described as DTD information among a number of home page files held in the database 15*a* on the basis of the data relating to the transmitted image region. Only a home page file hit in the retrieval is selected, and a URL of the selected home page is transmitted to the user.

Whereby, an information bubble is overlapped on the arrangement of the buildings, and displayed. Namely, the information bubble is mapped on the map of only the buildings, and a link is created among the buildings on the map. The user can obtain present contents by clicking the linked portion. Therefore, the user can obtain information on what kinds of shops/facilities are accommodated in the building displayed on the map.

Figure 20:
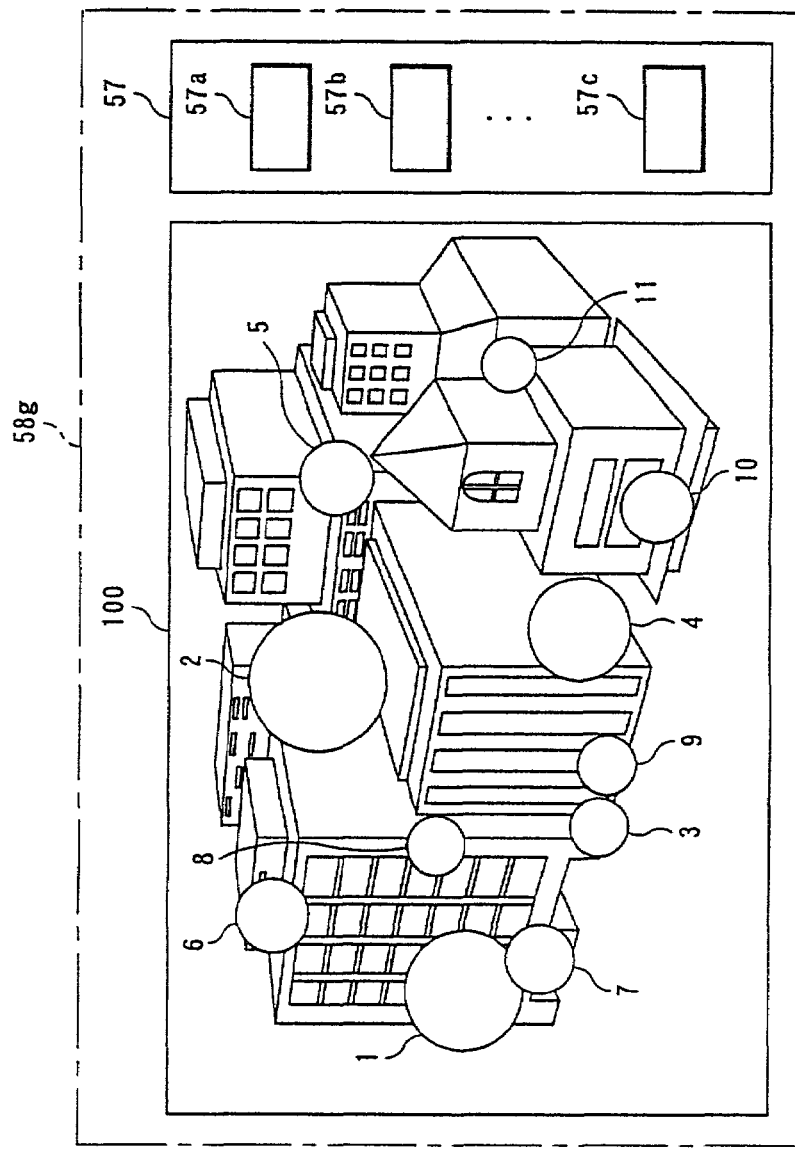
FIG. 20 is a diagram showing an example of a mapped image according to the second embodiment of this invention.

FIG. 20 is a diagram showing an example of the mapped image according to the second embodiment of this invention. The image 100 shown in FIG. 20 shows information bubbles (spheres) 1 to 11 along with the buildings displayed by the map application. The information bubbles 1 to 11 are displayed, overlapped on the display of the buildings originally displayed. The system administrator can therefore provide service information in a form that service information is linked with map information to the user.

The size of the display of the image 100 can be freely changed according to a setting by the user. Each of the information bubbles 1 to 11 is obtained by correlating spatial occupancy information composed of latitude, longitude, altitude and a bubble diameter of an object with various information relating to the object or a URL relating to the various information. In concrete, each of the information bubbles 1 to 11 represents a bubble image corresponding to a building mapped by the map application. The user can designate a specific bubble number to display its image on the personal computer 58.

Whereby, an owner of a restaurant, for example, can register a home page describing contents of his/her own shop on the Web server 13*b*, whereas a user can see all bubble data hit in retrieval as information bubbles. The bubble data having the contents is equally displayed on the screen, so that the user can obtain all the bubble data.

Data transmitted from the service center 19*a* is created by a Web robot 61*a* (refer to FIG. 16), but not created by the system administrator by linking the bubble data with map information. Namely, each of the information bubbles 1 to 11 is created from bubble data extracted by retrieving a tag <bubble> among tags described in home page files in the database 15*a* (refer to FIG. 16).

The size of the information bubble is changed on the basis of the size on the screen and position information succeeded from bubble data. When the user increases the size of display of the image 100 using, for example, the icon 57*a*, the bubble diameter of the information bubble is increased according to that scale, and is set such that the information bubble is of an appropriate size when the information bubble is overlapped on the image of the building.

A shape of the information bubble can be not only a circle, but also an ellipse. The scale is realized by a state file to be described later.

When the user clicks any one of the information bubbles 1 to 11 using a mouse (not shown) or the like, a browser program is activated on the basis of a URL simultaneously received from the service center 19*a* by the personal computer 58, and a home page of the information bubble 1, 2, . . . or 11 is displayed. The user can obtain various information and the like only by clicking an information bubble displayed in an image in which a size or an arrangement of the building is reproduced, thereby obtaining desired service information.

In FIGS. 19 and 20, each of the information bubbles is overlapped on the building. However, it is alternatively possible to display the information bubble such that the information bubble is not overlapped on another information bubble or the building. Namely, the information bubble may be displayed outside the building, and connected to a shop in the building by a balloon. Accordingly, the information bubble can be displayed, as not concealing a shape of the building. When the user down-loads desired information from the service center 19*a*, the user can change the designated image 100 according to the bubble diameter, and display the image 100 instead of displaying it using the bubble diameter.

When an information bubble is overlapped on a shape of a building, it is possible to display a bubble behind a balloon or the like when the upper bubble is selected. It is also possible to dynamically display the bubble by GIF animation or the like.

Figure 21:
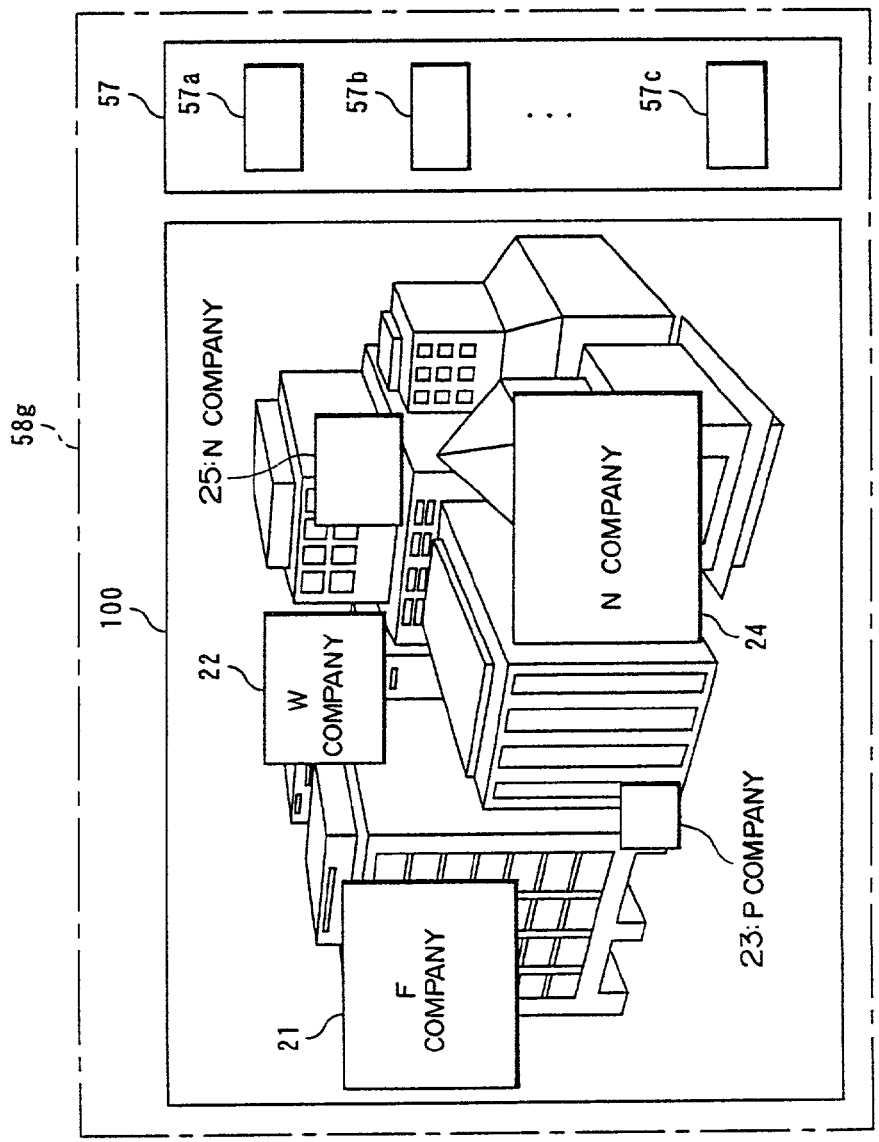
FIG. 21 is a diagram showing another example of a display of bubble data according to the second embodiment of this invention.

FIG. 21 is a diagram showing another example of display of the bubble data according to the second embodiment of this invention. In the image 100 displayed in FIG. 21, information bubbles 21 to 25 are shown. Each of these information bubbles 21 to 25 is displayed with a logotype or trademark that can specify a company. As the logotype, it is possible to use moving animation.

Incidentally, like reference characters in FIG. 21 have the same or similar functions of those in FIG. 20, descriptions of which are thus omitted.

Spatial occupancy information including a size of a building is represented by a bubble diameter of an information bubble. Since a size of the bubble diameter is associated with a scale of the map, the user can obtain an image display in an appropriate size.

The company can provide a visually excellent service to users. In other words, bubble data is visually displayed to the users. Additionally, the company can advertise more efficiently.

With respect to fees, a company providing only map information can charge against a user only if service information of the user is displayed in the image 100, for example. Namely, the system administrator can collect fees for notifying service information of a user in the image 100.

In consequence, the system administrator overlaps all information hit in retrieval by the Web robot 61*a* on the image 100, so that the user can display the service information in the image 100 at free.

As above, the user can visually obtain map information. In consequence, the user does not need to purchase, for example, a magazine to search for information on shops in each shopping area, or retrieve the information using the Internet 12.

This mapping method will be next described with reference to FIG. 18.

Figure 18:
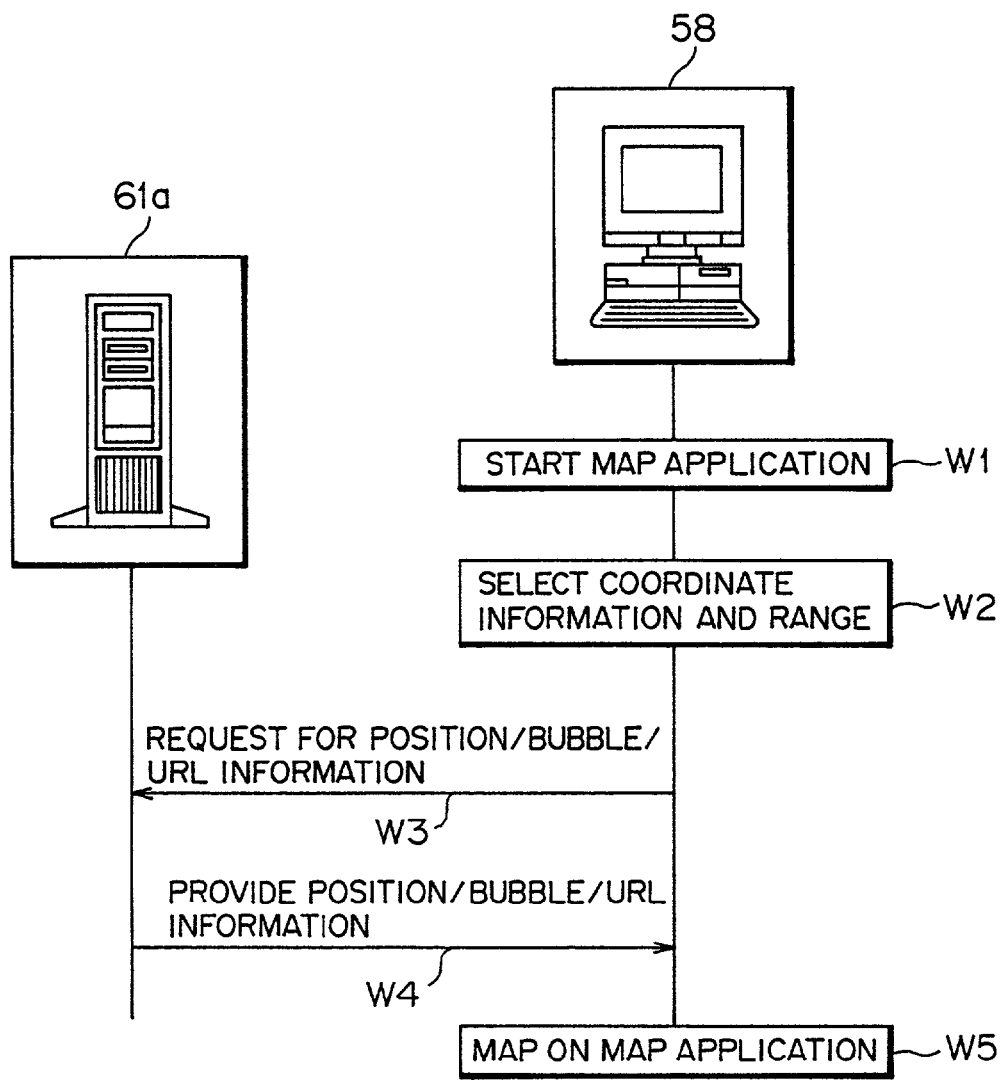
FIG. 18 is a diagram showing an example of a transmit/receive sequence for illustrating a map information mapping method according to the second embodiment of this invention.

FIG. 18 is a diagram showing an example of transmit/receive sequence for illustrating a map information mapping method according to the second embodiment of this invention. The information providing service method according to this invention is performed in the system 9*a* providing information to the personal computer 58 that can display a map.

First, a map application starts to run in the personal computer 58 (step W1). A map of buildings and the like in the vicinity of the user's home, for instance, is displayed on the initial screen. On the screen, the icon group 57 and a dialogue box (not shown) for inputting numeral values are also displayed. The user inputs a specific bubble number, which represents an area that the user desires to retrieve, to the icon group 57 and the like. The user can thereby see an information bubble of service information on the desired area or the building.

The user then clicks a predetermined icon or the like for an area that the user desires to display. At step W2, the personal computer 58 selects an object from the displayed map information (selecting step). In concrete, the personal computer 58 extracts coordinate information and region information on an object selected by the user.

As a mapping request (denoted by W3), the personal computer 58 transmits the coordinate information on the object selected at the selecting step and display object attribute information representing attributes of service information to be provided by the object to a server connected to the personal computer 58 over the Internet 12 (user terminal transmitting step).

The retrieval server 61*a* retrieves a <bubble> tag on the basis of the transmitted data, and extracts plural kinds of bubble data.

As a mapping response (denoted by W4), the service center 19*a* transmits spatial occupancy information, attribute information and a URL based on the coordinate information and the display object attribute information transmitted at the user terminal transmitting step to the personal computer 58 (server transmitting step).

Following that, the personal computer 58 displays an information bubble (image shape) along with the object at a position indicated by the spatial occupancy information transmitted at the service center transmitting step on the display unit 58*g* (mapping step).

Finally, the image geometry displayed at the mapping step and the map are provided to the personal computer 58 (providing step). Namely, the personal computer 58 maps the information bubble on the map information (step W5).

Accordingly, the user can obtain the latest information, and obtain the information in a visually excellent state, using the map application. The system administrator (communication carrier) can provide a high-quality service to the users, besides providing a great effectiveness of advertising profitable to the customer such as a company.

The user can overlap bubble data held in the service center 19*a* on a map beforehand displayed on the personal computer 58 using the database 15a holding position information and URLs linked to each other.

The system 9a according to the second embodiment has a server structure similar to that of the system 9 according to the first embodiment to provide the service using additional data. Namely, the system 9a displays bubble data on a map on the personal computer 58 of a user, besides providing the telephone service and the services 1 and 2.

Figure 16:
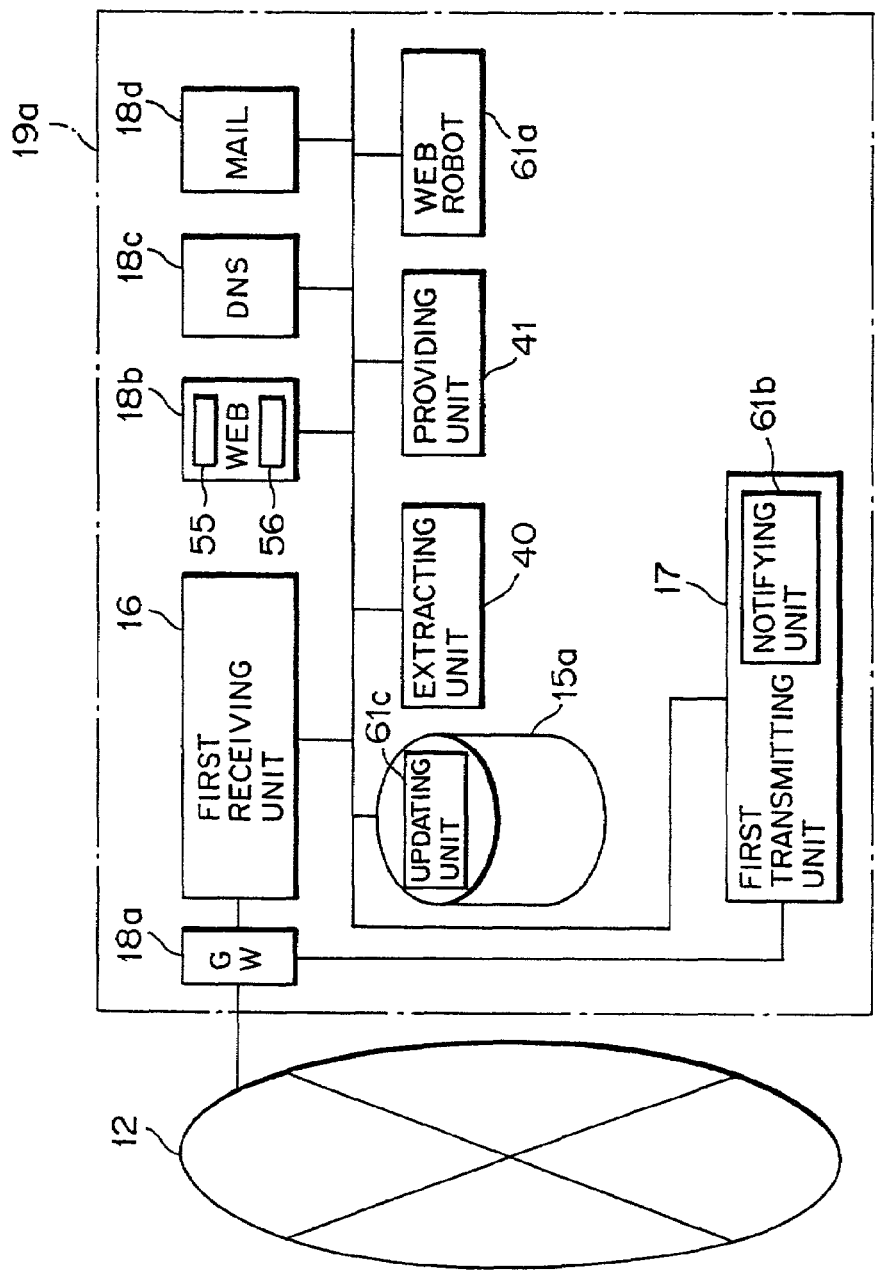
FIG. 16 is a block diagram of a service center according to the second embodiment of this invention.

FIG. 16 is a block diagram of a service center according to the second embodiment of this invention. The service center 19a shown in FIG. 16 is disposed in the system 9a providing information to the personal computer 58 that can display a map. The service center 19a comprises a database 15a, a Web robot (retrieving unit) 61a, a notifying unit 61b (first transmitting unit 17), and an updating unit 61c. In FIG. 16, like reference characters have the same or similar functions to those described above, further descriptions of which are thus omitted.

The database 15a holds a specific home page having DTD information composed of a plurality of tags relating to attribute information out of home pages having attribute information representing attributes of facility information relating to buildings and service information of the facility information, as bubble data in which spatial occupancy information composed of latitude, longitude, altitude and a bubble diameter of a building in the three-dimensional space is associated with a URL for obtaining service information.

The database 15a can provide the above service 1 and service 2 in cooperation with the Web robot 61a and the notifying unit 61b. Since bubbled at a is held, the user can easily obtain information on an object of retrieval such as a building, each floor of the building, a signboard, etc., and can obtain service information without investing his/her money in a costly equipment.

The database 15a is equipped with the updating unit 61c. The updating unit 61c updates bubble data held in the database 15a. The updating unit 61c records a tag relating with one tag included in a plurality of tags as a rewritable file in the database 15a.

The database 15a holds monitoring bubble data for detecting a moving object and a bubble diameter of the monitoring bubble data based on position information of the moving object. In a state file held in the database 15a, a moving object element that can specify the moving object is recorded.

Namely, the database 15a holds bubble data, and functions as a position/URL converting database 15a (database server). This function is accomplished by a personal computer or a workstation (both not shown). This function may be accomplished by a hard disk, solely. Whereby, new information is updated on demand, so that both the user and the owner of a restaurant, for example, can obtain and provide visualized information.

In response to a mapping request including coordinate information composed of latitude, longitude, altitude and a bubble diameter of an object (building, natural object) displayed on a map, and display object attribute information representing attributes of various information relating to the object displayed on the map or service information relating to the various information transmitted from the personal computer 58, the Web robot 61a retrieves specific bubble data including the coordinate information and the display object attribute information in bubble data. Namely, the retrieval robot 61 retrieves bubble data (refer to FIGS. 7 and 8) having a <bubble> tag on the basis of data from the personal computer 58, and outputs specific bubble data.

Further, the Web robot 61a retrieves specific bubble data in another database (for example, another Web server) connected to the Internet 12 on the basis of the mapping request. Accordingly, the user can retrieve in the database 15a created in each area or country according to information that the user requires, and receive a higher service.

The Web robot 61a is a search engine of a robot type, having a high speed and being able to periodically collect contents. The user can thereby collect the latest and a large amount of information. This function is accomplished by a CPU, a ROM, a RAM, etc. in cooperation.

A number of Web servers are connected to the Internet 12. In order to search for only necessary contents in the contents held in the number of Web servers, the user accesses to a home page of a company providing a retrieval service to retrieve a home page in which the contents are described. When the user inputs a key word of contents that the user desires to retrieve, a list of links of home pages including the key word is displayed by the search engine.

The contents (information page) are often written in HTML. In HTML, kinds of tags are relatively limited. For this, the user can write contents in a higher degree by increasing the kinds of tags. The user may write the contents in SGML or XML, instead of HTML.

HTML is a kind of tag sets defined in SGML which is a higher concept of HTML. SGML signifies a rule to determine names of tags and a document structure, which is composed of DTD information, SGML declaration to designate a character code system to be used in the document, and a document instance described according to a tag set defined by the DTD information using the character code set.

The DTD information is practically tags (elements) appearing in a home page. The user describes the DTD information in the home page file, and registers the home page file on the database 15a. The Web robot 61a extracts only a home page in which the DTD information is described out of a plurality of home pages held in the database 15a.

The DTD information enables the Web robot 61a to recognize that the contents are bubble data.

XML has a simplified rule of SGML to describe a document. In other words, unnecessary functions of SGML are removed in XML to improve the processing performance.

The user describes a home page file in SGML or XML. The Web robot 61a reads the home page file, extracts a key word appearing in the document according to a tag therein, and creates a database. Since an index file is created on the basis of a character string in the home page, it is possible to retrieve detailed information in the home page.

The notifying unit 61b shown in FIG. 16 notifies the personal computer 58 of a mapping response having spatial occupancy information, attribute information and a URL about specific bubble data. The function of the notifying unit is accomplished by a CPU, a ROM, a RAM, etc. in cooperation. The notifying unit 61b is disposed in a part of the first transmitting unit 17. However, the notifying unit 61b may be disposed separately from the first transmitting unit 17.

The notifying unit 61b notifies of a mapping response having spatial occupancy information including a dynamic bubble diameter having a diameter according to a scale of a map displayed on the personal computer 58 and a URL based on coordinate information included in the mapping request. Additionally, the database 15a holds bubble data in which contents of service information on bubble data are correlated with a unique number that can identify the contents.

The user can thereby display the map on the screen according to a volume of the bubble data to be displayed by him/her. The user can thus improve the user interface for obtaining service information.

The system administrator can visually map in registration as a premise of service information.

Next, description will be made of a practical retrieving method using DTD information with reference to FIGS. 22, 23(a) and 23(b).

FIG. 22 is a diagram for illustrating DTD information according to the second embodiment of this invention. An image of DTD information (hereinafter abbreviated as an image, occasionally) shown in FIG. 22 is composed of a plurality of tags with respect to attribute information. <bubble>, <latitude>, etc. are tags. A tag <bubble> functions as a tag for retrieval. Namely, the Web robot 61a extracts a title described at the head of each home page, extracts about 300 bytes at the head of information described between the tags <body> and </body>, then extracts <bubble>. Incidentally, <body> and </body> are tags described at the head and the tail of a home page, respectively.

The image 63 shown in FIG. 22 contains a plurality of child elements nested between <bubble> and </bubble>. Each of <latitude>, <longitude> <altitude> and <size> functions as a location tag to determine a position at which an information bubble, as shown in FIGS. 20 and 21, is to be displayed. On the right side of the image 63, meanings of these tags are shown.

Each user creates a home page of his/her own, or a company by himself/herself, or using a commercially available application, and registers the created home page on the Web server 13b. When the user creates a home page file, the user adds a "bubble" tag along with a part corresponding to contents, and describes the information shown in FIG. 22. When the user creates a home page file using the personal computer 58, the user may click the right button of the mouse on the map displayed on the display unit 58g to transmit it to the provider.

The system administrator beforehand sets the Web robot 61a such that the Web robot 61a recognizes that the "bubble" tag is a retrieval tag.

The Web robot 61a reads a number of home pages, retrieves the <bubble> tag, registers a home page file attached the <bubble> tag on an index for retrieval, and displays it as a result of retrieval. Namely, only home pages attached the <bubble> tag are collected from a number of home pages, and a database is separately created on the basis of attribute information therein. In concrete, the Web robot 61a retrieves a location tag, extracts position information (latitude, longitude, altitude), a bubble diameter and parameters other than these of child elements, links them to a URL, and registers them on the database 15a.

Since creation of a database is executed by the Web robot 61a, a quantity of information that can be collected is large. Additionally, since the collection of information is frequent, the system administrator can provide fine (detailed) information to the users.

The searching Web robot 61a and the searched Web information outputting unit 18b may be possessed by the same system administrator, or by different system administrators.

As this, an owner of a restaurant or a company can register information on his/her shop or own company on the Web server 13b in the service center 19a such that the information can be found as bubble data.

FIG. 23(a) is a diagram for illustrating DTD information according to the second embodiment of this invention. An image 63 shown in FIG. 23(a) has seven kinds of child elements, that is, tags of latitude, longitude, altitude and bubble diameter, display animation, attribute information, startup application, state file name, URL, etc. A method of dynamically updating the bubble diameter will be described in the third embodiment to be described later.

The latitude, longitude, altitude and bubble diameter require accuracy in such a degree that an image can be displayed on the display unit 58g of the personal computer 58. The user can thereby notify the Web robot 61a of his/her own spatial occupancy information.

The display animation is moving animation appearing on the screen of a browser program. The display animation represents a name of a file in which a character such as a vehicle or an airplane moves from left to right in a page of a home page, for example. The database 15a holds an animation tag (display animation) to be displayed on the personal computer 58 in the DTD information. The user can obtain bubble data in a more visualized state.

The attribute information represents attributes (for example, a kind of business) of service information such as a restaurant, a hospital, a gasoline station, a school, etc. The attribute information is managed in a plurality of layers corresponding to respective kinds of business. In other words, the database 15a classifies the DTD information according to a plurality of tags, and holds the DTD information. Namely, when attribute information transmitted from the user is on a restaurant or a hospital, the Web robot 61a extracts only restaurants or hospitals to create a restaurant layer or a hospital layer, and displays the contents. The Web robot 61a may designate a specific bubble number, and transmit a result of it to the user.

In consequence, the service center 19a can transmit, to the user, attribute information corresponding to attribute information included in an access from the user. The service center 19a does not need to retrieve each of all files held in each directory in the database 15a in order to retrieve a restaurant, thereby extracting desired information efficiently and at high speed.

In this method, the Web robot 61a extracts data described in DTD information out of data temporarily held in the Web information outputting unit 18b when creating the database 15a. Alternatively, the system administrator may make the user directly describe a home page file with DTD information being attached, and makes the user transfer the home page file, when creating the database 15a.

When a home page file attached DTD information thereto is transferred from the user, the Web robot 61a reads the DTD information, as standard specification. It is thereby possible to change display contents according to a case of an access from the portable terminal 11 or a case of an access from the personal computer 58. When the user registers a home page file from the portable terminal 11, an unnecessary display character and the like is omitted and a database is created, whereby a quantity of data is decreased. In consequence, a person who has an access from the portable terminal 11 or the PDA 32 can comfortably change a page of the home page.

As a method for creating bubble data (refer to FIGS. 7 and 8) in the database 15a, there are two kinds of methods; a method in which the Web robot 61a retrieves in the Web information outputting unit 18*b*, and extracts only home page files attached DTD information thereto, and a method in which the user describes a home page file with DTD information attached thereto and transfers it, and the Web robot 61*a* reads the DTD information from the home page file and creates the database 15*a*.

As above, a number of home page files are filtered according to DTD information, and bubble data shown in FIGS. 7 and 8 is created.

The service center 19*a* correlates the bubble data 15*a* shown in FIG. 7 with a unique number (bubble number) by which contents of service information on the bubble data 15*a* can be identified, and holds them. For example, a home electric equipment shop has a plurality of floors.

If a user has purchased a product on a certain floor of the shop, the user can give information on the floor to the others. The user can also designate a specific bubble number to display the information on the personal computer 58.

The startup application shown in FIG. 23(*a*) is a name of an application program for displaying map information on the personal computer 58, which is used by a user when the map is displayed. The database 15*a* holds, in a state file, data relating to the application program for displaying a map on the personal computer 58. The startup application is activated by JAVA (trade name) program received by the portable terminal 11. Namely, the startup application is translated such as to adapt to the personal computer 58 possessed by the user, and executed displaying process suitably to the user terminal, so that the user can obtain visualized data.

The user often moves display animation visually effective or acoustically effective on the other's screen when the other accesses to his home page. Accordingly, the database 15*a* is such configured as to hold an application program tag for displaying the map in DTD information. The user can thereby obtain contents using the visualized map.

The URL represents an address shown in FIGS. 7 and 8. In the image 63, contents relating to a signature may be held. Additionally, the image 63 can contain information about a size of characters, a font, or emphasized characters. Therefore, the image 63 contains control information on display of a home page.

In the database 15*a* of the service center 19*a*, home page information and control information are held in a related state.

In the database 15*a*, there is set a tag showing conditions of communication that the user desires. For example, in order that only a person that the user desires can access to DTD information, the user inputs "female" as a partner that the user desires, inputs a telephone number or the like of the user, inputs "ten minutes" as time intervals at which retrieval is performed, the user then transmits the above conditions to the service center 19*a*. Whereby, the database 15*a* holds a communication partner information tag about a specific communication partner in the DTD information. For example, a certain user A registers "female" as a partner that the user desires, whereas another user B registers "male" as a partner that the user desires, so that the Web server 13*b* sets partners in agreement with profile tags set to each other. Each user can thereby communicate with a desired partner.

The DTD information is written by the user, which cannot be rewritten. For this, there is set a rewritable state file in order to complement the DTD information. The state file is a file for holding preservative parameters and the like, in which data relating to access management or access limitation of the user is held. The state file may be set for each user, or may be generated at each access. Functions of the state file are accomplished by what is described in, for example, script language. Namely, DTD information to be managed or desired tags among tags contained in the DTD information are selected in the state file.

FIG. 23(*b*) is a diagram for illustrating the state file according to the second embodiment of this invention. An image 64 of the state file shown in FIG. 23(*b*) is rewritten by, for example, UNIX (representing one kind of operation systems), in which a counter (life counter), an accessible term (life date), a startup file name, a dynamic bubble diameter, an access history (access log), etc. are described.

The counter is, for example a down counter. When anyone accesses to the DTD information after the program of the service center 19*a* sets "100" to the initial value, the count value of the counter is subtracted each time an access occurs. When the counter value becomes zero, the count is nullified. Thus, the database 15*a* holds data relating to a counter whose count value can be changed in the state file. The database 15*a* therefore holds data relating to an accessible term in the state file.

This counter function is accomplished by CGI (Common Gateway interface) program (hereinafter abbreviated as CGI, occasionally) and a counter file in cooperation with each other. The CGI program is a main body for operating a home page, which devotes (accompanies) to the home page file, which is a program of UNIX, for example. The counter file is a file performing a counting operation each time of access, which is provided separately from the state file. The counter file is used as a counter file showing how many times the home page is accessed, or as a notice board to which contents are added by writing from the user, for example. The counter file is provided in a directory in which the top file of the home page exists.

When the home page is accessed from the outside, the CGI starts and reads the counter file. When the CGI hands an argument showing a count value, an argument containing the count value is sent back. The CGI sends back the count value as a UNIX response to the user having had an access, thereby changing the counter value.

In the case of a service that a company or the like presents premiums to the first one hundred customers accessing to the home page, the company describes new information contents of "one hundreds customers" in the home page file, and registers the source file on the Web information outputting unit 18*b*.

Next, the Web robot 61*a*, the Web information outputting unit 18*b* or the updating unit 61*c* retrieves in the home page file to extract the information about "one hundred customers", and writes the information in the state file. After "one hundred customers" is written as an initial value in the state file, the count value is subtracted each time the customer accesses. When the number of accesses exceeds one hundred, the CGI receives an argument "0" from the counter file, sends back "access inhibited" to the user or delete the counter file, for instance, to stop the operation, thereby limiting the access.

The counter is processed on the basis of data sent back from the user or the like, so that accesses can be limited according to a result of the process.

The counter can be accomplished in another counting method. For example, the Web server 13*b* sets twenty as the number of users who can concurrently access, and always monitors the number of entering users and the number of leaving users to monitor that the number of present users is not more than twenty.

The accessible term is data for limiting a term during which the user can access. As the accessible term, March to May, June to August, September to November, or December to February is set correspondingly to spring, summer, autumn and winter, for example. The accessible term may be used when charged news is distributed only in a predetermined term. Namely, the Web server 13b monitors the accessible term to prevent a user past his/her term from accessing.

The startup file name represents a file name corresponding to a startup application for the DTD information. The user writes the startup application included in the DTD information as a JAVA program, for example. When the file name of the JAVA program is updated due to version-up of the JAVA program, the written JAVA program is not displayed on the personal computer 58 or the like of the user.

Therefore, the user does not at all need to change it to a new name of the JAVA program whose version has been updated, so that the startup application is dynamically changed to an accurate startup file.

The dynamic bubble diameter is a bubble diameter of an information bubble to be displayed on the personal computer 58 of the user. The database 15a stores data relating to a dynamic bubble diameter having a diameter according to a scale of the map displayed on the personal computer 58 in the state file. The bubble diameter to be displayed on the personal computer 58 is managed by the server. The service center 19a can adaptively change the bubble diameter on the basis of coordinates in displayed map information and spatial occupancy information transmitted from the user. The user thereby can visualize information mapped on the map so as to obtain an information bubble of a size according to a scale of the map displayed by him/her.

The access history is information for identifying a person accessing to the home page. An IP address of a specific proxy server (not shown) is described in the URL in the image 63 shown in FIG. 23(*a*), whereas an identification (ID; hereinafter referred to as an ID, occasionally) of a person having accessed to the home page is recorded in the access history shown in FIG. 23(*b*).

The ID is used to identify each user, stacked in the state file. The service center 19a can identify each user using the IP address and the ID. The database 15a holds, in the state file, history information on an IP address caused by an access by the personal computer 58, and ID information by which the personal computer 58 can be identified.

The system administrator sets an information bubble at an intersection or on a road in a town, for example. When a walking user or a vehicle passes through the information bubble, a history of a time or the like when the user or the vehicle passes is recorded. Since a transit history of even a moving object can be appropriately tracked, the user can receive accurate guidance. Similarly, a transit history of a vehicle or the like can be recorded. This will be described later in the third embodiment.

Meanwhile, it is necessary to change the state file (preservative parameters) shown in FIG. 23(*b*) or give expandability thereto. The user may describe a holding place for animation data of displayed animation as a child element, or attribute information on bubble data. In such case, a lot of services become possible.

As above, DTD information beforehand written by the user and whose contents cannot be changed and a state file whose contents can be changed by CGI cooperate with each other to transmit an image of bubble data that the user requires.

All tag information is linked to a bubble diameter and displayed. Since the information is mapped on a map in the initial screen displayed on the display unit 58g, the information is visualized to the user, so that the visuality is improved. In visualization, an occupied area of bubble data on the display unit 58g is determined on the basis of a bubble diameter and a scale of the map.

The personal computer 58 activates a map displaying application program (hereinafter abbreviated as a map application) of its own, and displays a map thereon. The user can then overlap bubble data held in the position information/URL link database 15a on the map.

The user may use the portable terminal 11 or the PDA 32 as a user terminal.

Figure 17:
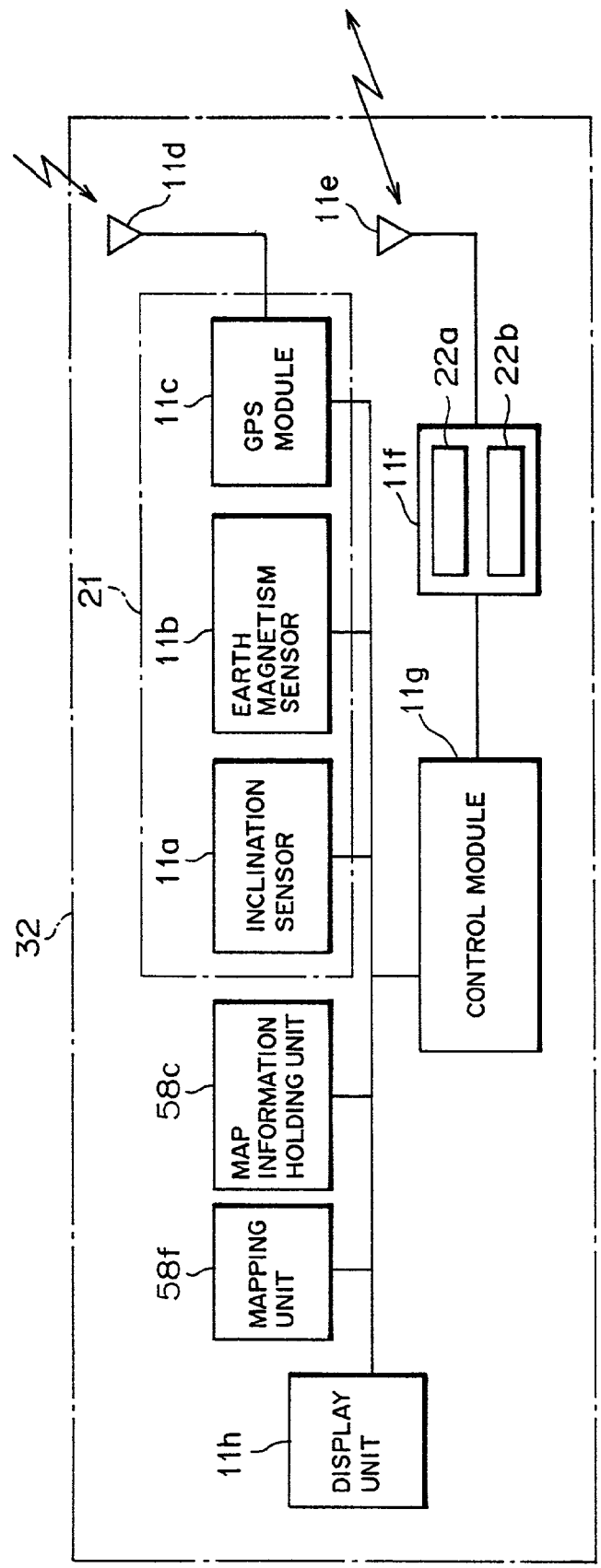
FIG. 17 is a schematic block diagram of a PDA according to the second embodiment of this invention.

FIG. 17 is a schematic block diagram of the PDA 32 according to the second embodiment of this invention. In FIG. 17, like reference characters have the same or similar functions of those described above, further descriptions of which are thus omitted.

The PDA 32 shown in FIG. 17 comprises a detecting unit 21 for detecting position information composed of latitude, longitude, altitude, direction and an inclination angle of an object in the three dimension. The detecting unit 21 comprises an earth magnetism sensor 11b that can measure a direction, a satellite information receiving unit (GPS module) 11c that can receive satellite information using the global positioning system, and an inclination sensor that can measure an inclination angle to the horizon of the personal computer 58.

The user obtains a latitude A, a longitude B and an altitude 0, a direction measured by the geomagnetism sensor 11b, and an inclination angle θ, and transmits these pieces of position information to the service center 19a. The service center 19a extracts a URL corresponding to specific spatial occupancy information including the position information out of spatial occupancy information held in the database 15a, and transmits contents corresponding to the URL to the PDA 32.

The user can obtain bubble data using the PDA 32, map the bubble data on a map using a map application beforehand installed in the PDA 32, thereby obtaining visualized information.

In the PDA 32, the second transmitting unit 22a transmits a mapping request using an electronic mail address generated on the basis of coordinate information. The coordinate information is composed of latitude, longitude and altitude in the three-dimensional space.

The portable terminal 11 additionally comprises the mapping unit 58f and the map information holding unit 58c (refer to FIG. 17), as shown in FIG. 4.

In considering a small data transmission rate in a radio line, the data transmission rate is decreased as compared with that of the personal computer 58. It is therefore possible to decrease the power consumption in total.

When the user searches for an Italian restaurant using the portable terminal 11, the user inputs a diameter 10 m as the bubble diameter to the child element of DTD information in order to select a restaurant within a 10 m diameter around him/her, inputs an Italian restaurant as the attribute information, and transmits them to the service center 19a. The portable terminal 11 keeps transmitting periodically position information on the portable terminal 11 to the service center 19a. When the service center 19a finds an Italian restaurant within a 10 m diameter around the user, the service center 19a notifies the user of the search result by incoming tone or the like.

According to the second embodiment, the functions of the service center 19a accomplished by one server (refer to FIG.

1) may be distributed to a plurality of servers, as shown in FIG. 2. Namely, the functions may be distributed in different places on the Internet 12.

The service information providing system 9a according to this invention is the system 9a providing information to the personal computer 58 that can display a map. The system 9a comprises a database 15a holding a home page described in SGML or XML having DTD information out of home pages having attribute information representing attributes of various information on objects or service information relating to the various information and DTD information composed of a plurality of tags, as bubble data in which spatial occupancy information composed of latitude, longitude, altitude and a bubble diameter of the object in the three-dimensional space is associated with a URL for obtaining the service information, the personal computer 58 connected to the database 15a over the Internet 12 to display the various information retrieved using the bubble data, the Web robot 61a retrieving specific bubble data including coordinate information and display object attribute information in the bubble data on the basis of a mapping request transmitted from the personal computer 58 having the coordinate information in the three-dimensional space composed of latitude, longitude and altitude of an object displayed on a map and display object attribute information representing attributes of various information on the object or service information relating to the various information, and the notifying unit 61b notifying the personal computer 58 of a mapping response having spatial occupancy information, attribute information and a URL of the specific bubble data.

The personal computer 58 comprises the map information holding unit 58c outputting map information on an object in the three-dimensional space, the displaying unit 58g displaying an image of the object on the screen on the basis of the map information outputted from the map information holding unit 58c, the transmitting unit 58d transmitting a mapping request having coordinate information composed of latitude, longitude, altitude and a bubble diameter in the three-dimensional space of the object displayed on the display unit 58g and attribute information representing attributes of various information on the object or service information relating to the various information to a server connected to the personal computer 58 over the Internet 12, the receiving unit 58a receiving a mapping response having spatial occupancy information composed of latitude, longitude, altitude and a bubble diameter in the three-dimensional space of the object corresponding to the spatial occupancy information and a URL for obtaining service information notified from the service center 19a in response to the mapping request, the mapping unit 58f displaying an image geometry along with an image of the object at a position indicated by the spatial occupancy information included in the mapping response on the display unit 58g, and the mapping data holding unit 58e correlating the image geometry displayed by the mapping unit 58g with the URL included in the mapping response and holding them.

According to the second embodiment, data can be transmitted by mail between the service center 19a and the portable terminal 11, the PDA 32 or the personal computer 58, just like the service according to the first embodiment. Namely, the database 15a sets a URL based on spatial occupancy information as a mail address, and holds the spatial occupancy information correspondingly to the mail address. In other words, a destination of a link shown by the URL represents mail data.

For example, an owner of a restaurant can link service information on foods and drinks and the like to bubble data, and register them. The owner can thereby advertise his/her shop to the users. Additionally, registration can be done very easily, which promote use of the service. A company can show its mail address as a destination of opinions and the like to the users, so that bubble data corresponding to the mail address is used.

The service center 19a in the above structure provides the service 1 and the service 2 according to the first embodiment to the users. The service center 19a also provides a mapping service of bubble data to users installing the map application, along with the services 3 to 7. mapping of bubble data will be first described with reference to FIG. 24, then the services 3 to 7 will be secondary described with reference to FIGS. 25 to 29.

Figure 24:
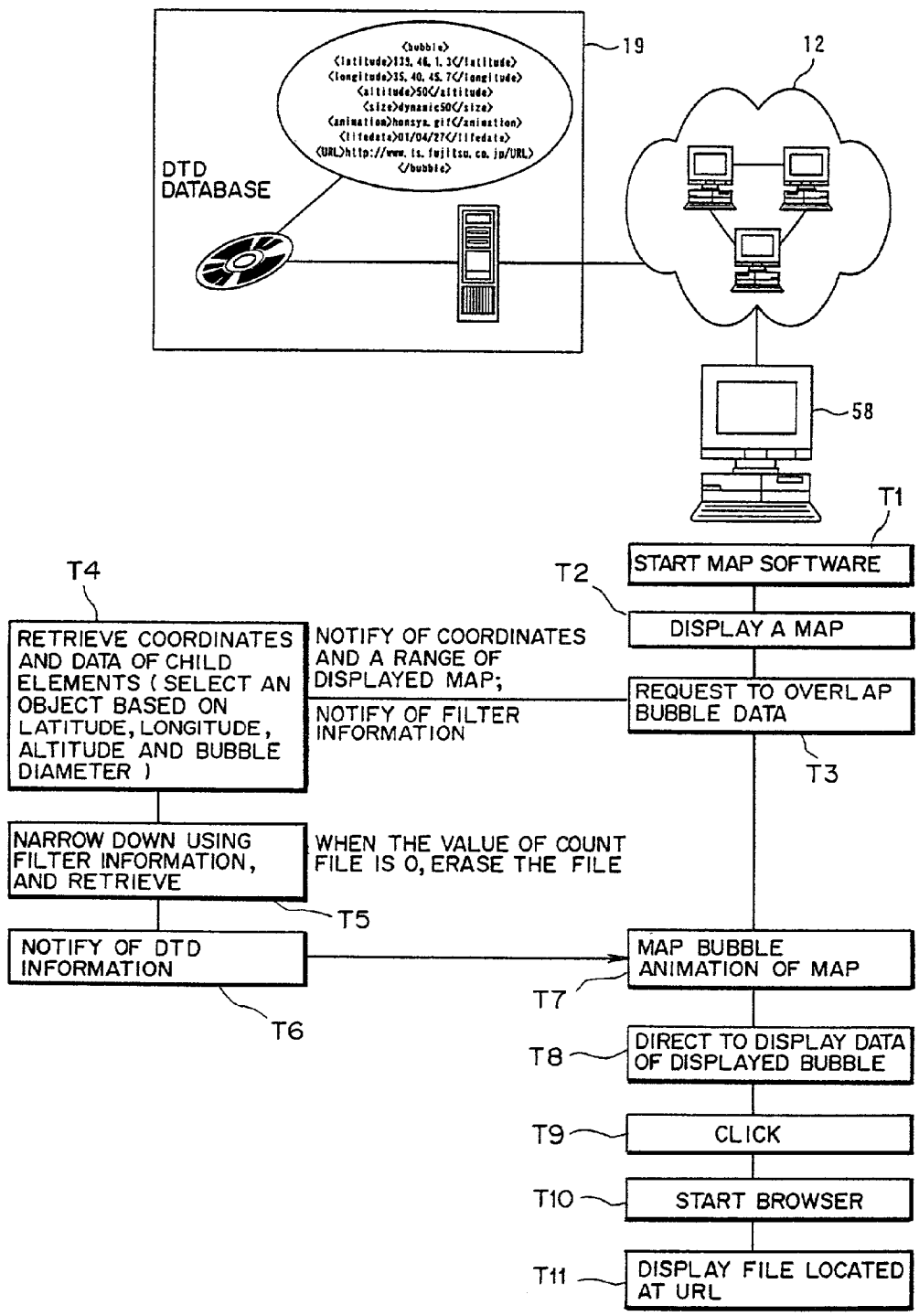
FIG. 24 is a diagram for illustrating a mapping method according to the first embodiment of this invention.

FIG. 24 is a diagram for illustrating a mapping method according to the second embodiment of this invention. The information providing method according to this invention is used in the system 9a providing information to the personal computer 58 that can display a map.

The personal computer 58 displays a map on the display unit 58g displaying an image (map displaying step). When receiving the service 1, the user starts the map application of the personal computer 58 (step T1) to display a map (step T2). When displaying the map (map displaying step), the personal computer 58 displays the map on the screen on the basis of the obtained latitude or longitude. Therefore, the user can obtain an information bubble in any place.

The personal computer 58 selects an object in the map information displayed at the map displaying step (selecting step).

Following that, the personal computer 58 transmits a mapping request having coordinate information in the three-dimensional space on the object selected at the selecting step and display object attribute information representing an attributes of service information to be provided to the service center (server) 19a connected to the personal computer 58 over the Internet 12 (transmitting step).

In more detail, the personal computer 58 transmits a mapping request having coordinate information composed of latitude, longitude, altitude and a bubble diameter in the three-dimensional space of the object selected at the selecting step, and display object attribute information representing attributes of various information relating to the object or service information relating to the various information to the service center (server) 19a connected to the personal computer 58 over the Internet 12 (transmitting step). Namely, the personal computer 58 requests the service center 19a to overlap (overlapping) bubble data (overlapping), and transmits spatial occupancy information composed of latitude, longitude, altitude and a bubble diameter, and attribute information (step T3).

When receiving this notification, the service center 19a retrieves specific bubble data including the coordinate information and the display object attribute information in bubble data in which spatial occupancy information composed of latitude, longitude, altitude and a bubble diameter of an object in the three-dimensional space is associated with a URL for obtaining various information relating to an object or service information relating to the various information on the basis of the mapping request at the transmitting step (retrieving step). Namely, the service center 19a retrieves tags of coordinates and data at step T4, and selects an object that the user desires to map on the basis of the latitude, longitude, altitude and the bubble diameter.

In retrieving (retrieving step), the service center 19a retrieves using a counter whose count value is changed according to the number of accesses. When the count is stopped, a predetermined file is nullified.

In retrieving (retrieving step), the service center 19a may retrieve on the basis of the number of accesses that the users can simultaneously access to the server, or retrieve on the basis of communication partner information on a specific communication partner.

In retrieving (retrieving step), the service center 19a reads bubble data of a communication partner in agreement with the information on a communication partner beforehand set (reading step), receives present position information on the personal computer 58 (present position information receiving step), detects that the personal computer 58 and the communication partner approach to each other (approach detecting step), and notifies the personal computer 58 of the approach (approach notifying step).

As this, the service center 19a can readily provide various visualized services.

The service center 19a notifies the personal computer 58 of a mapping response having spatial occupancy information and a URL of the specific bubble data retrieved at the retrieving step (notifying step). Namely, the service center 19a narrows down the retrieval using filter information (step T5), and notifies of DTD information (step T6). The service center 19a transmits it to the personal computer 58.

In notifying (notifying step), the service center 19a outputs a dynamic bubble diameter having a diameter according to a scale of the map displayed on the display unit 58g of the personal computer 58 on the basis of the coordinate information included in the mapping request transmitted at the transmitting step (changing step), and inserts the dynamic bubble diameter outputted at the changing step into the mapping response (inserting step). The user can obtain an information bubble of an accurate size.

In outputting a diameter according to a scale of the map (changing step), the service center 19a changes the dynamic bubble diameter on the basis of the number of accesses, an accessible time or an accessible season. When the counter indicates zero at step T5, the service center 19a deletes a home page whose counter indicates zero. The service center 19a can limit the access, thereby providing various services.

In notifying (notifying step), the service center 19a notifies of information (startup application name) on an application program for displaying a map on the personal computer 58 [refer to FIG. 23(a) and the like]. The personal computer 58 displays an image geometry along with the object at a position indicated by the spatial occupancy information in the mapping response on the display unit 58g on the basis of the specific bubble data notified at the notifying step (mapping step). Namely, the personal computer 58 maps an information bubble on the map on the basis of notified DTD information, and displays bubble animation or an moving image (step T7), further displays attribute information such as a menu of Italian dishes, for example (step T8).

When the user clicks the menu portion (step T9), a browser program is activated (step T10). The user jumps to a URL accompanying an icon of the information bubble or the bubble animation to obtain contents (a file of the URL) of a home page held at the URL (step T11).

The user can receive the mapping service by not only the personal computer 58 but also a mobile terminal such as the portable terminal 11, the PDA 32 or the like. Namely, when the service center 19a provides the mapping service, the service center 19a receives information on a position of the portable terminal 11 and the south direction (position information), a 50 m range therefrom (retrieval distance range), and a restaurant (attribute information). The Web robot 61a retrieves DTD information having a "bubble" tag on the basis of the position information, the retrieval distance range and the attribute information, extracts a hit information, and transmits the hit information to the portable terminal 11.

The service center 19a can provide service information of a registered advertiser within a range that the user desires, which promotes the use.

Next, the bubble data mapping method according to the second embodiment of this invention will be described with reference to FIGS. 25 to 29.

Figure 25:
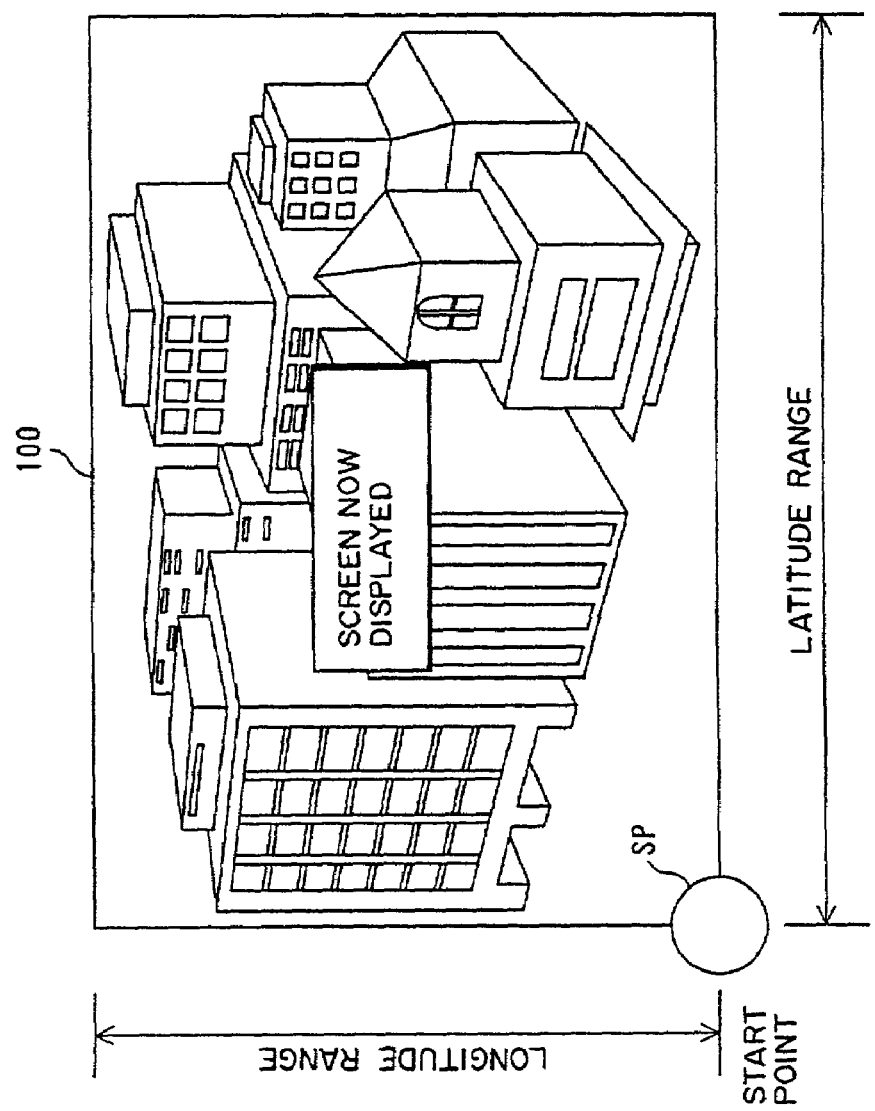
FIG. 25 is a diagram for illustrating a map display according to the second embodiment of this invention.

FIG. 25 is a diagram for illustrating map display according to the second embodiment of this invention. An image 100 shown in FIG. 25 is a range that can be displayed, with a start point (denoted as SP) being a reference. The map application calculates a latitude range and a longitude range on the basis of scale information and a size of the screen. Here, the longitude range is set in the vertical direction, whereas the latitude range is set in the horizontal direction.

The personal computer 58 notifies the service center 19a of the retrieval range information. The service center 19a retrieves information bubbles within the retrieval range.

Figure 26:
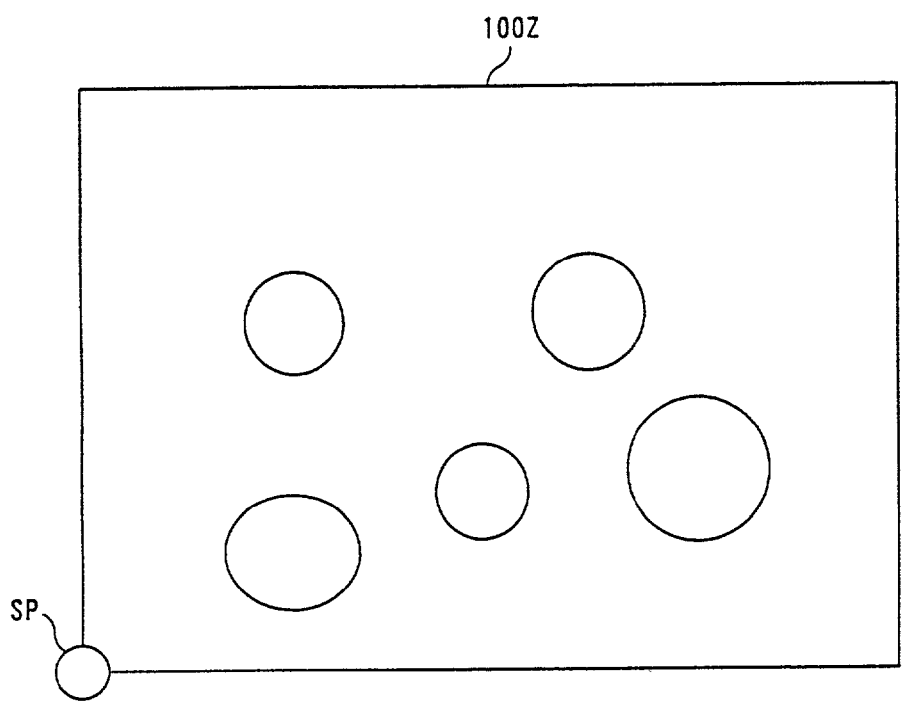
FIG. 26 is a diagram for illustrating retrieval of an information bubble according to the second embodiment of this invention.

FIG. 26 is a diagram for illustrating retrieval of information bubbles according to the second embodiment of this invention. In a retrieval range 100Z shown in FIG. 26, five sphere information bubbles (image of spatial occupancy information of bubble data) are hit. The service center 19a transmits a result of this retrieval to the personal computer 58.

Figure 27:
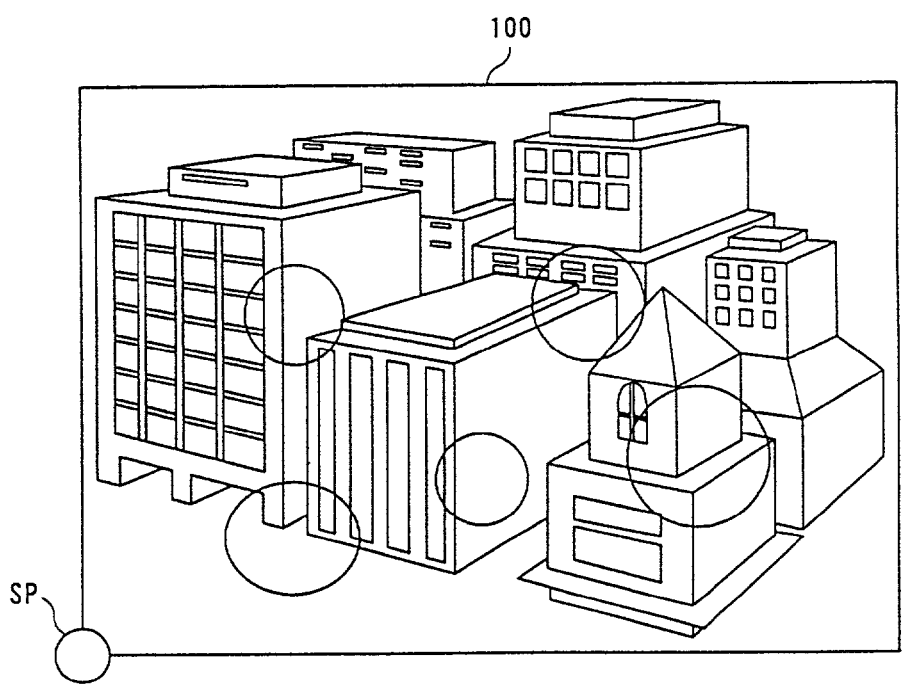
FIG. 27 is a diagram showing an image display at the time of overlapping according to the second embodiment of this invention.

FIG. 27 is a diagram showing image display at the time of overlapping according to the second embodiment of this invention. In an image 100, information bubbles are overlapped on the map.

In this manner, the user can readily obtain information and the information bubbles visualized and displayed in an appropriate scale.

The service center 19a can dynamically change a bubble diameter according to the number of accesses to the bubble data, time, season, etc.

Next, the service 4 will be described with reference to FIG. 28.

Figure 28:
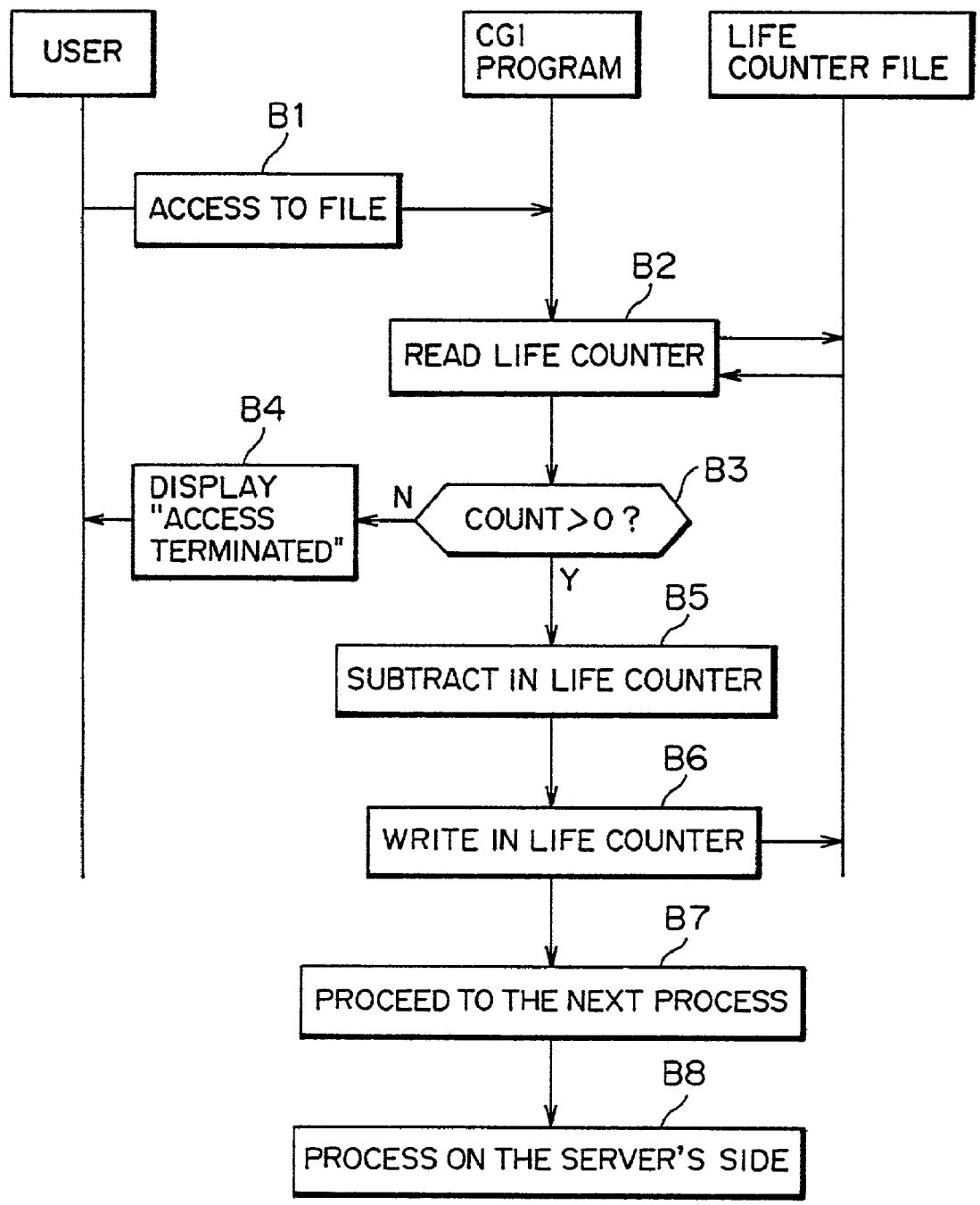
FIG. 28 is a diagram for illustrating access limitation to a home page according to the second embodiment of this invention.

FIG. 28 is a diagram for illustrating access limitation to a home page according to the second embodiment of this invention, showing a sequence among the user, the CGI (CGI program) and the counter file (life counter file).

When the user accesses to a file such as a home page (step B1), the CGI hands an argument to the counter file, thereby reading the count value (step B2). The CGI then determines whether the counter value is greater than zero or not (step B3). When the counter value is smaller than zero, the procedure proceeds through N route, and the CGI notifies the user that access is terminated, thus this notice is displayed (step B4).

When the count value is greater than zero at step B3, the procedure proceeds through Y route, then the CGI subtracts the count value (step B5), puts the subtracted count value into the argument, and hands it to the counter file to write the count value therein (step B6). The CGI proceeds to the next process (step B7), and the control returns to the server (step B8).

When the service 4 is executed as above and the bubble data is accessed one hundred times, for example, the home page of the bubble data disappears or an access to the home page is inhibited.

In the case of the service 5, an application such as JAVA is activated, instead of a URL, as stated above. The service center 19a filters position information on the user and an attribute accompanying thereto, and notifies the user of results thereof to the user.

The service 6 is accomplished by a counting function of the CGI and the counter file, similarly to the service 4. Namely, the service center 19a sets the number of accesses to bubble data of a company or the like, and monitors the number of accesses. When the number of access to a specific home page exceeds one hundred, after "100" is set to the number of persons who can access to the specific home page, for example, the service center 19a can inhibit the access from the user.

The service 7 will be next described with reference to FIG. 29. The contents of the service 7 is that when bubble data agreeing with conditions set to each other approaches, the service center 19a notifies the user of approach of the bubble data agreeing with the conditions. The user carries the portable terminal 11 or the PDA 32 as a user terminal, and the service 7 is executed on the basis of position information on the terminal.

Figure 29:
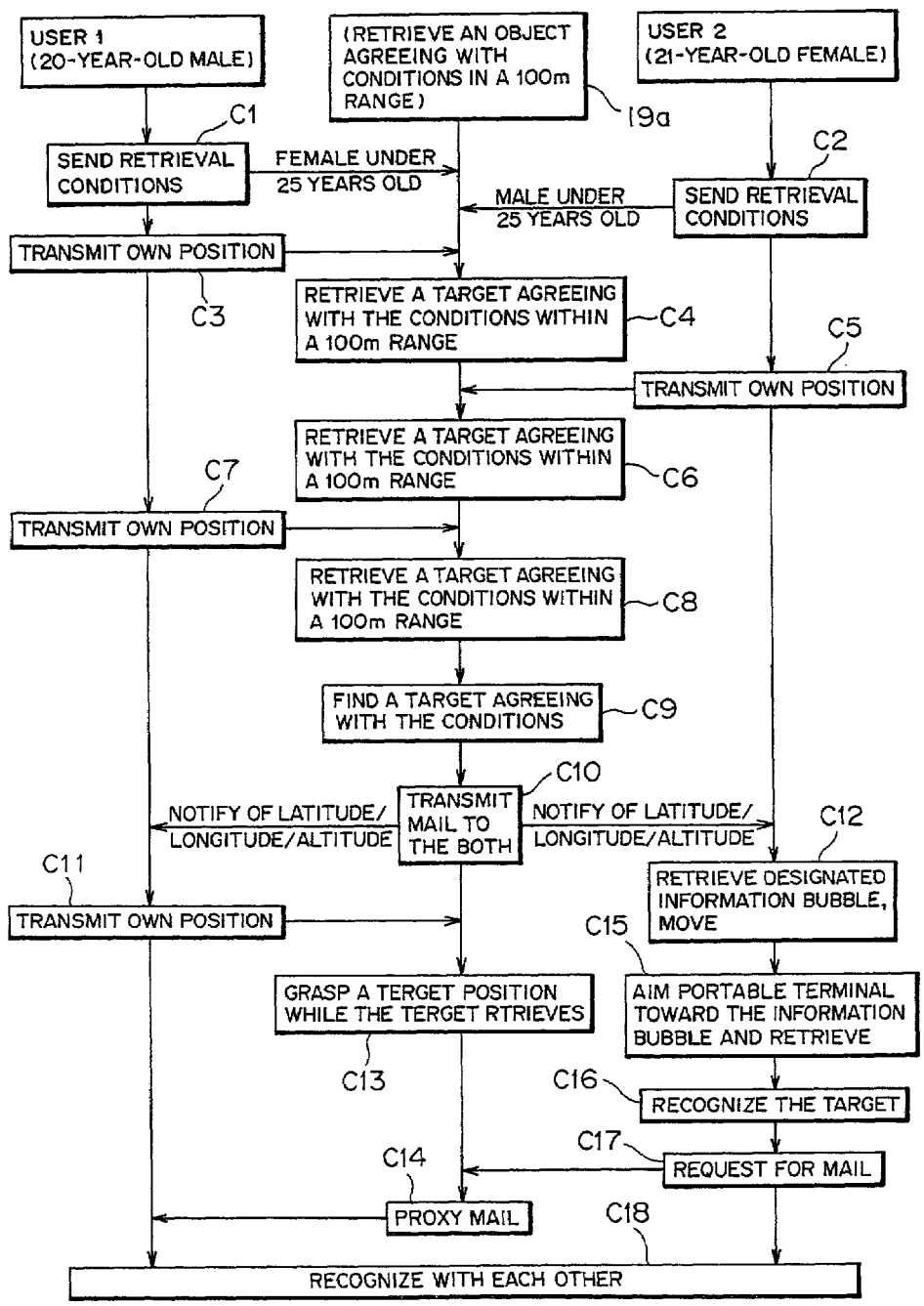
FIG. 29 is a diagram for illustrating a service at the time that two kinds of bubble data approach to each other according to the second embodiment of this invention.

FIG. 29 is a diagram for illustrating the service executed when two sorts of bubble data approach to each other according to the second embodiment of this invention. FIG. 29 shows a sequence among a user 1 (20-year-old male), the service center 19a, and a user 2 (21-year-old female). Incidentally, "user 1" represents not only "a 20 year-old male" but also "the portable terminal 11 or the PDA 32" used by the user 1. Similarly, "user 2" represents not only "a 21-year-old female" but also "the portable terminal 11 or the PDA 32" used by the user 2.

First, the user 1 transmits retrieval conditions to the service center 19a (step C1). At this time, the user 1 transmits "a female under 25 years old" as retrieval conditions. Similarly, the user 2 transmits "a male under 25 years old" as the retrieval conditions to the service center 19a (step C2). The service center 19a beforehand sets such conditions that when a distance between the user 1 and the user 2 is equal to or smaller than 100 m, the retrieval is hit, as determination on agreement of the retrieval conditions.

Meanwhile, the service center 19a receives retrieval conditions from a number of users, although not shown, other than the user 1 or the user 2, and processes them.

Next, the user 1 keeps transmitting his/her position (information on his position) to the service center 19a (steps C3, C5, C7 and C11). When the service center 19a receives his/her own position data from the user 1 or the user 2, the service center 19a retrieves whether there is a user (target) in agreement with the conditions transmitted from the user within a 100 m range around the user having transmitted his/her own position (steps C4, C6 and C8).

When the user 1 transmits his position (step C7) and the service center 19a retrieves (step C8) and finds a target in agreement with the conditions (step C9), the service center 19a transmits mails to both of the user 1 and the user 2 (step C10). Namely, the service center 19a notifies the user 1 and the user 2 of latitudes, longitudes and altitudes of the user 1 and the user 2.

The user 1 again transmits his position to the service center 19a (step C11). On the other hand, the user 2 moves while retrieving an information bubble designated by the service center 19a (step C12), and retrieves with the portable terminal 11 (or the PDA 32) aimed toward the information bubble (step C15). The service center 19a grasps a position of the target even while the target is conducting retrieving (step C13).

When the user 2 recognizes the target (step C16), the user 2 requests the service center 19a to transmits a proxy mail (step C17). When the service center 19a transmits a proxy mail to the user 1 (step C14), the user 1and the user 2 can recognize each other (step C18).

When two sorts of bubble data in agreement with conditions set to each other approach to each other, the service center 19a can notify the owner of the bubble data.

Another method of the service 7 is that the user inputs desired information in the attribute information as retrieval conditions, and transmits it to the service center 19a.

For instance, the user inputs "an Italian restaurant" as the retrieval conditions, "one minute" as the retrieval interval, and "50 m" as the retrieval region, and transmits (registers) them to the service center 19a. The user keeps detecting position information using the portable terminal 11, and transmits at random the position information to the service center 19a.

The service center 19a retrieves bubble data whose attribute information is an Italian restaurant in a 50 m region around the bubble data representing the user at intervals of one minute. When the service center 19a finds an Italian restaurant, the service center 19a transmits information on a name, a location, a menu, etc. of the restaurant to the user. The user thus knows the presence of the Italian restaurant by beep of the portable terminal 11 or the PDA 32.

According to the information providing service method of this invention, the personal computer 58 records a home page (specific information page) in which DTD information composed of a plurality of tags with respect to attribute information is described among home pages (information pages) having attribute information representing attributes of facility information relating to a building (object) or service information relating to the facility information (various information or various information) in the database 15a (information page recording step).

The service center 19a registers bubble data in which spatial occupancy information composed of latitude, longitude, altitude and a bubble diameter of the object in the three-dimensional space is associated with a URL for obtaining service information on the basis of the information page recorded at the information page recording step (bubble data registering step). In registering the bubble data (bubble data registering step), the service center 19a records contents recorded at the information page recording step in another database 15a (recording step). The server registers the contents recorded at the recording step, as bubble data in which spatial occupancy information composed of latitude, longitude, altitude and a bubble diameter of an object in the three-dimensional space is associated with a URL for obtaining service information, in the database 15a (second registering step).

The service center 19a provides information generated from the bubble data registered at the bubble data registering step to the personal computer 58 (providing step).

When the server registers the bubble data (bubble data registering step), the service center 19a extracts plural pieces of DTD information (specific DTD information) having a "bubble" tag out of DTD information having contents recorded at the information recording step (specific DTD information extracting step).

The service center 19a registers the plural pieces of DTD information (specific DTD information) as bubble data (first registering step).

When the system 9a provides the information providing service, it is possible to improve the user interface by which the user obtains service information. Namely, the system administrator can visualize mapping when service information is registered.

As above, the system 9a can display service information to users in a form that the service information is linked with map information, and display the map information according to a size of bubble data to be displayed by the user.

(C) Description of Third Embodiment

In the third embodiment, there will be described a method using bubble data in a car navigation system.

Figure 30:
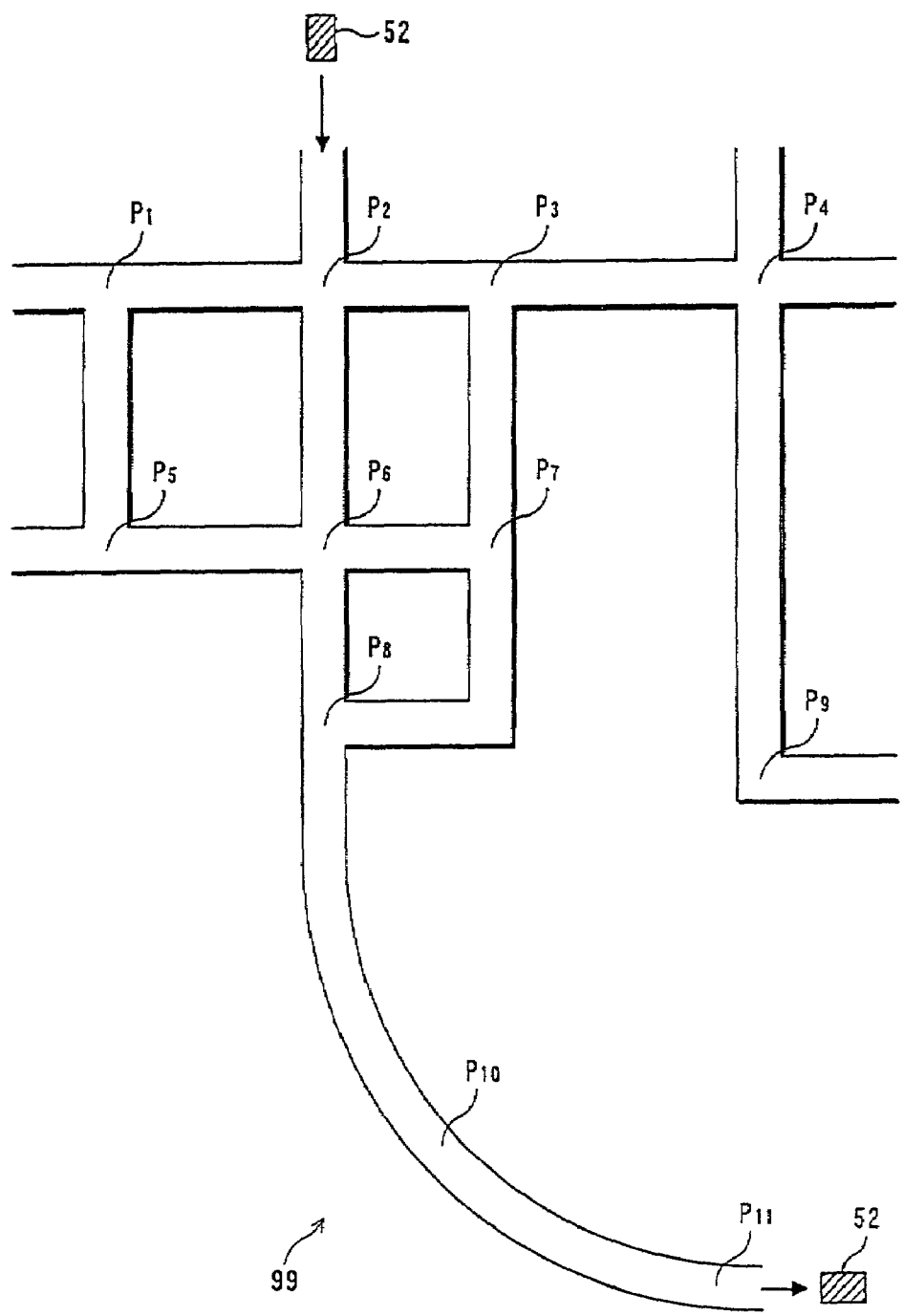
FIG. 30 is a diagram for illustrating a car navigation system according to a third embodiment of this invention.

FIG. 30 is a diagram for illustrating a car navigation system according to the third embodiment of this invention. A car navigation system 99 shown in FIG. 30 is a system for providing a guidance service to a driver of a vehicle 52. The car navigation system 99 provides a service guiding the driver (signifying a user) being driving a car in real time so that the driver can reach a destination. According to the third embodiment, the service center 19a disposes a number of information bubbles for monitoring at intersections or the like on the roads, thereby detecting the vehicle 52.

The DTD information shown in FIG. 23(a) includes a bubble diameter. The updating unit 61c holds monitoring bubble data for detecting a moving object, and updates a bubble diameter of the monitoring bubble data on the basis of position information of the moving object. The updating unit 61c records a state file held in the database 15a and a moving object tag that can specify the moving object. The bubble diameter can be adjusted with a precision sufficient to map. The service center 19a can thereby track the vehicle 52 with a good precision so as to accurately guide the driver.

The car navigation system 99 provides information bubbles at intersections P1 to P11 on the road so that the service center 19a can detect in which direction the vehicle 52 heads after entering from the intersection P2 The service center 19a keeps notifying the driver of information necessary for the driver to reach the destination. The vehicle 52 receives notification from the service center 19a using the portable terminal 11 or the PDA 32, and the driver obtains the information using a hand-free apparatus (not shown) or the like.

For this purpose, the database 15a of the service center 19a holds an ID in the state file. The database 15a holds a state file, history information on a URL caused by an access from the personal computer 58, and identifier information by which the personal computer can be identified.

In concrete, the service center 19a records an IP address of the vehicle 52 passing through an information bubble disposed at the intersection P1 as a person who has an access. The service center 19a records not only an IP address but also an ID for identifying each user. With both the access history and the ID, the vehicle 52 can be specified. The information bubbles disposed at respective intersections record an access history of the vehicle 52 or the like, and the recorded information is collected in the service center 19a.

Whereby, guidance becomes possible without disposing a number of sensors or the like for detecting the vehicle 52 on the road or buildings, and without a large amount of investment. The car navigation system 99 can monitor a moving state of each vehicle.

The others are similar to those described in the first and second embodiments, further descriptions of which are thus omitted.

In such structure, the service center 19a manages movement of the vehicle 52 using information bubbles.

Figure 31:
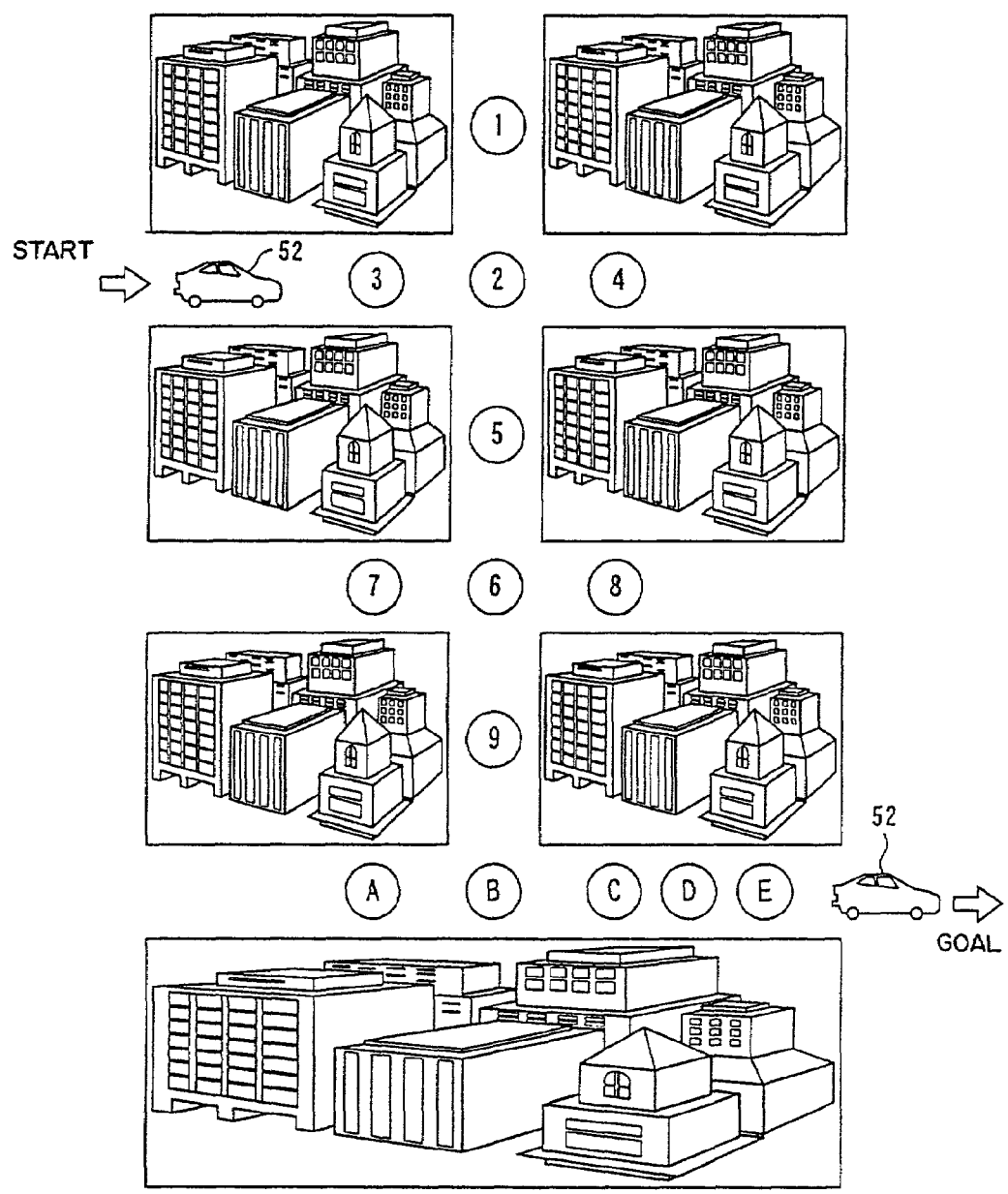
FIG. 31 is a diagram for illustrating the car navigation system according to the third embodiment.

FIG. 31 is a diagram for illustrating the car navigation system 99 according to the third embodiment of this invention. Seven rectangles shown in FIG. 31 represent city blocks. The vehicle 52 enters from the left side in FIG. 31 is guided until the vehicle 52 leaves from the right side. Encircled numbers 1 to 9, and characters A to E represent information bubbles, which show a management history of the vehicle 52 from when the vehicle 52 enters the city area to when the vehicle 52 leaves from the city area by receiving the guidance.

When the vehicle 52 at the start point requests for guidance to the goal point, the server (service center 19a) arranges information bubbles up to the goal point. The vehicle 52 successively transmits its position to the server. The server retrieves an information bubble at that position. When there is an information bubble in agreement with a position of the vehicle 52, the server notifies the vehicle 52 of information.

The information bubble 3 notifies of "turn right at the next intersection." The information bubble 2 notifies of "identify the vehicle 52 entering the intersection." The information bubble 5 notifies of "go straight on." The information bubbles 1 and 4 notify of "the course is changed, retrieve again." The information bubble 6 notifies of "identifying the vehicle entering the intersection." The information bubble 9 notifies of "turn left at the next intersection." The information bubbles 7 and 8 notify of "the course is changed, retrieve again." The information Bubble C, D and E notify of "go straight on." The information bubble A notifies of "the course changed, retrieve again."

In this manner, the user can be appropriately guided to the destination. The system administrator can grasp movement of the vehicle 52 without disposing an expensive vehicle detector, and can easily track each of the vehicles even if the vehicles move to different places.

(D) Others

Note that this invention is not limited to the above examples, but may be modified in various ways without departing from the scope of the invention.

For example, the system administrator can conduct a questionnaire on users using SGML or XML, totalize a result thereof, thereby conducting a market research.

The Web robot 61a can extract only useful contents according to use of the users from an enormous number of home pages to obtain a useful trend of the users. As the index (index information), there have been shown a several kinds of indexes such as <bubble>and the like in the above examples. Alternatively, it is possible to create a customized index tag other than the above. Items of the index tag are a type of business, a type of occupancy, a duty place along with an age, a sex, an occupancy, a family make-up, etc. of a person who makes a document.

In the second embodiment, the information documents include documents specialized to a specific purpose or business such as user manuals, internal documents, etc. Namely, it is possible to define a tag set that can be readily retrieved to these specialized documents, and use the tag set.

The above spatial occupancy information may be used in two dimension or in one dimension. Namely, the above database 15a may hold two-dimensional bubble data in which plane range information in the two-dimensional space is associated with retrieval information for obtaining service information. Alternatively, the above database 15a may hold one-dimensional bubble data in which line distance information is associated with retrieval information for obtaining service information. The database 15a records the two-dimensional or one-dimensional information, whereby a quantity of data to be held is decreased, which leads to speed-up of retrieval.

With respect to the above bubble numbers, the service center 19, 19a selects a specific bubble number. Alternatively, the user may transmit data relating to a bubble number to the service center 19, 19*a*.

In a service such as i-mode (trade name), contents of a home page are simplified to be displayed in order to decrease a data quantity to be transmitted and received.

In the first embodiment, the system administrator has both the Web robot 61*a* and bubble data. However, relationship between the system administrator of the Web robot 61*a* and a user who registers bubble data is not limited to the above example. This invention may be executed in another relationship.

In the second embodiment, a form of a file for displaying a map may be another file such as BMP, JPG (Exit JPEG 24), TIF (Tagged Interchange Format) or the like other than GIF.

The image 64 of the state file shown in FIG. 23(*b*) may hold data relating to a signature key along with the above.

The personal computer 58, the portable terminal 11 or the PDA 32 in the second embodiment may not only map an image but also generate voice appropriately and effectively.

A geometry of an information bubble displayed on the personal computer 58 may be any of various kinds of geometry other than a sphere or an ellipse. Instead of the information bubble, it is possible to display an icon created by the user.

In the third embodiment, the service may be provided to not only the vehicle 52 on the road but also a moving object such as a ship, an airplane or the like. Namely, the moving object transmits position information at that time at predetermined time intervals or at predetermined spaces. The database 15*a* successively updates a bubble diameter in the spatial occupancy information of bubble data on the basis of the position information transmitted from the moving object. The user can thereby obtain information (for example, an advertisement) that the moving object has by directly aiming the portable terminal 11 or the PDA 32 toward the moving object. Since the contents are updated very frequently, the user can obtain detailed information.

In the third embodiment, this invention may be applied to management of users who enter a building (facility), instead of the vehicle 52. Here, the facility information signifies shop information or the like on a building or a shop in the building, as stated above.

For instance, a temple or shrine manages an access history of a user who has entered a building in which exhibits are displayed. The temple or shrine may charge on a user when the user obtains information such as historical explanation or the like.

In FIGS. 22 and 24, <latitude>, <longitude>, <altitude>, <size>, <animation> and <life date> represent latitude, longitude, altitude, bubble diameter, display animation and life date, respectively. For example, the longitude is 139° 46'1.3" east, the latitude is 35° 40'45.7" north, the latitude is 50 m, the bubble diameter is 50 m and dynamic, the display character (character to be displayed as display animation) is "honsha.gif", and the displayable date is up to Apr. 27, 2001.

In FIG. 24, steps T1 to T3 and steps T7 to T11 are processed by the personal computer 58. Steps T4 to T6 are processed by the service center 19*a*. The bubble animation at step T7 represents display animation. A displayed bubble at step T8 represents an information bubble displayed on the screen.

In FIG. 31, the display of buildings does not represent a display of map information, but signifies buildings in a town.

What is claimed is:

1. A server in a system providing information to a user terminal being able to display a map comprising:

a database for holding a specific information document as bubble data, being able to (i) change a size or a shape of itself, (ii) operate a generation, a disappearance and limit times of access, and (iii) detect a moving object, the specific information document
  (a) having index information composed of a plurality of elements,
  (b) being from out of information documents having attribute information representing attributes of service information to be provided,
  (c) in which spatial range information in three-dimensional space is associated with retrieval information for obtaining said service information;

a retrieving unit for retrieving, by using the index information of the specific information document,
  (d) specific bubble data including
    (d1) coordinate information, and
    (d2) display object attribute information
  (e) on the basis of a mapping request including an address, a range desired to be displayed, an altitude, an angle of a viewpoint,
    (e1) having said coordinate information on an object displayed on said map and said display object attribute information representing attributes of service information to be provided by said object,
    (e2) said mapping request being transmitted from said user terminal, said user terminal being able to display an information bubble which represents an image of spatial range information of the bubble data, overlapped on said map which represents the object in the three-dimensional space; and a notifying unit for notifying said user terminal of a mapping response having
  (f) said spatial range information,
  (g) said attribute information, and
  (h) said retrieval information, wherein (f) said spatial range information, (g) said attribute information and (h) said retrieval information being included in said specific bubble data which is retrieved in said retrieving unit.

2. The server according to claim 1, wherein said notifying unit notifies of said mapping response having spatial range information including a similar bubble diameter having a diameter according to a scale of a map displayed on said user terminal and address information.

3. The server according to claim 1, wherein said database correlates said bubble data with a unique number by which contents of service information of said bubble data can be identified, and holds said bubble data and said unique number.

4. A server in a system providing information to a user terminal being able to display a map comprising:

a database for holding a specific information page as bubble data, the bubble data being able to (i) change a size or a shape of itself, (ii) operate a generation, a disappearance and limit times of access, and (iii) detect a moving object.

the specific information page
  (a) having index information, as a DTD (Document Type Definition) information for robot retrieving, which includes a complement data that holds data relating to an access management or an access limitation of the user who complements the index information, which is written with a markup language, composed of a plurality of elements relating to attribute information, (b) being from out of information pages having attribute information representing attributes of various information relating to an object or service information relating to said various information, and (c) in which spatial range information composed of latitude, longitude, altitude and a bubble diameter of said object in a three-dimensional space is associated with address information for obtaining said service information;

a retrieving unit for retrieving, by using the index information of the specific home page, (d) specific bubble data including
   (d1) coordinate information, and
   (d2) display object attribute information (e) on the basis of a mapping request including an address, a range desired to be displayed, an altitude, an angle of a viewpoint,
   (e1) having said coordinate information in the three-dimensional spare composed of latitude, longitude and altitude of an object displayed on said map and said display object attribute information representing attributes of various information relating to said object,
   (e2) said mapping request being transmitted from said user terminal, said user terminal being able to display an information bubble which represents an image of spatial range information of the bubble data, overlapped on said map which represents the object in the three-dimensional space; and a notifying unit for notifying said user terminal of a mapping response having
   (f) said spatial range information,
   (g) said attribute information and
   (h) said address information, wherein (f) said spatial range information, (g) said attribute information and (h) said retrieval information being included in said specific bubble data which is retrieved in said retrieving unit.

5. The server according to claim 4, wherein said notifying unit notifies of said mapping response having spatial range information including a similar bubble diameter having a diameter according to a scale of a map displayed on said user terminal and address information.

6. The server according to claim 4, wherein said retrieving unit retrieves said specific bubble data in another database connected to a network on the basis of said mapping request.

7. The server according to claim 4 further comprising:
a Web information outputting unit for holding user information; and
an address generating unit for generating an address at which said user information held in said Web information outputting unit is held.

8. The server according to claim 4, wherein said database holds an animation element to be displayed on said user terminal in document type definition information.

9. The server according to claim 4, wherein said database holds an application program element for displaying said map in document type definition information.

10. The server according to claim 4, wherein said database holds a communication partner information element relating to a specific communication partner in document type definition information.

11. The server according to claim 4, wherein said database classifies document type definition information according to a plurality of elements, and holds said document type definition information.

12. The server according to claim 4, wherein said database correlates said bubble data with a unique number by which contents of service information of said bubble data can be identified, and holds said bubble data and said unique number.

13. The server according to claim 12, wherein said database holds monitoring bubble data for detecting a moving object and a bubble diameter of said monitoring bubble data based on position information on said moving object, and records a moving object element by which said moving object can be specified in a file held in said database.

14. The server according to claim 4, wherein said database records data relating to a similar bubble diameter having a diameter according to a scale of a map displayed on said user terminal in a file.

15. The server according to claim 4, wherein said database holds at least either one of history information of address information caused by an access of said user terminal and identifier information by which said user terminal can be identified in a file.

16. The server according to claim 4, wherein said database holds data relating to a counter whose count value can be changed in a file.

17. The server according to claim 4, wherein said database holds data relating to an accessible time in a file.

18. The server according to claim 4, wherein said database holds data relating to an application program for displaying a map on said user terminal in a file.

19. The server according to claim 4, wherein said database handles address information based on said spatial range information as an electronic mail address, and holds said spatial range information correspondingly to said electronic mail address.

20. A server in a system providing information to a user terminal being able to display a map comprising:
a database for holding a specific home page as bubble data, the bubble data being able to (i) change a size or a shape of itself, (ii) operate a generation, a disappearance and limit times of access, and (iii) detect a moving object, the specific home page
   (a) having DTD (document type definition) information, for robot retrieving, which includes a complement data that holds data relating to an access management or an access limitation of the user who complements the DTD information, which is written with a markup language, composed of a plurality of tags relating to attribute information.
   (b) being from out of home pages having said attribute information representing attributes of facility information relating to a building or service information of said facility information, and
   (c) in which spatial range information composed of latitude, longitude, and altitude and a bubble diameter of said building in a three-dimensional space is associated with a uniform resource locator for obtaining said service information;

a retrieving unit for retrieving, by using the index information of the specific information document.
   (d) specific bubble data including
      (d1) coordinate information, and
      (d2) display object attribute information
   (e) on the basis of a mapping request including an address, a range desired to be displayed, an altitude, an angle of a viewpoint,
      (e1) having said coordinate information in the three-dimensional space composed of latitude, longitude and altitude of a building displayed on said map and said display object attribute information representing attributes of facility information relating to a building displayed on said map or service information of said facility information, (e2) said mapping request being transmitted from said user terminal, said user terminal being able to display an information bubble which represents an image of spatial range information of the bubble data, overlapped on said map which represents the building in the three-dimensional space; and a notifying unit for notifying said user terminal of a mapping response having (f) said spatial range information, (g) said attribute information and (h) said uniform resource locator of said specific bubble data.

21. The server according to claim 20, wherein said notifying unit notifies of said mapping response having spatial range information including a similar bubble diameter having a diameter according to a scale of a map displayed on said user terminal and address information based on said coordinate information included in said mapping request.

22. The server according to claim 20, wherein said database correlates said bubble data with a unique number by which contents of service information of said bubble data can be identified, and holds said bubble data and said unique number.

23. A user terminal in a system providing information to said user terminal, said user terminal being able to display a map, said user terminal comprising:

a map information outputting unit for outputting map information installed beforehand;

a display unit for displaying an image of an object on the basis of said map information outputted from said map information outputting unit;

a transmitting unit for transmitting (i) a mapping request to a server connected to said user terminal over a network, said mapping request having (a) coordinate information in the three-dimensional space on said object displayed on said display unit, and (b) display object attribute information representing attributes of service information to be provided by said object; and (ii) data including an address, a range, an altitude of a viewpoint or an angle of the viewpoint, which is desired to be displayed on said display unit according to instructions;

a receiving unit for receiving a mapping response having (c1) spatial range information in the three-dimensional space corresponding to said coordinate information, (c2) attribute information representing attribute information of service information to be provided by said object, and (c3) retrieval information for obtaining said service information notified from said server in response to said mapping request;

a mapping unit for displaying (d1) an image geometry and (d2) said map, said image geometry overlapped on said map at a position indicated by said spatial range information included in said mapping response on said display unit, said mapping unit representing the object in the three-dimensional space and displaying service information on said displaying unit, the service information being linked with the object; and a mapping data holding unit for holding (e1) said image geometry and (e2) said retrieval information, said image geometry displayed by said mapping unit being correlated with said retrieval information included in said mapping response, wherein said server holding a bubble data, being able to (i) change a size or a shape of itself, (ii) operate a generation, a disappearance and limit times of access, and (iii) detect a moving object.

24. A user terminal in a system providing information to said user terminal, said user terminal being able to display a map, said user terminal comprising:

a map information outputting unit for outputting map information on an object in the three-dimensional space installed beforehand;

a display unit for displaying an image of said object on a screen on the basis of said map information outputted from said map information outputting unit;

a transmitting unit for transmitting (i) a mapping request to a server connected to said user terminal over a network, said server holding a bubble data being able to (i) change a size or a shape of itself, (ii) operate a generation, a disappearance and limit times of access, and (iii) detect a moving object, said mapping request having (a) coordinate information in the three-dimensional space composed of latitude, longitude and altitude of said object displayed on said display unit, and (b) display object attribute information representing attributes of various information relating to said object or service information relating to said various information; and, (ii) data including an address, a range, an altitude of a viewpoint or an angle of the viewpoint, which is desired to be displayed on said display unit according to instructions to the server connected to said user terminal over a network;

a receiving unit for receiving a mapping response having (c1) spatial range information composed of latitude, longitude, (c2) altitude and a bubble diameter of said object in the three-dimensional space corresponding to said coordinate information, and (c3) address information for obtaining said service information notified from said server in response to said mapping request;

a mapping unit for displaying (d1) an image geometry and (d2) an image of said object, at a position indicated by said spatial range information included in said mapping response on said display unit, on said map which represents the object in the three-dimensional space, and displaying service information on said displaying unit, the service information being linked to the object; and a mapping data holding unit for holding (e1) said image geometry and (e2) said address information said image geometry displayed by said mapping unit being correlated with said address information included in said mapping response.

25. A user terminal in a system providing information to said user terminal, said user terminal being able to display a map, said user terminal comprising:

a map information outputting unit for outputting map information on a building in the three-dimensional space installed beforehand;

a display unit for displaying an image of said building on a screen on the basis of said map information outputted from said map information outputting unit;

a transmitting unit for transmitting a mapping request to a server over a network, said server including bubble data being able to (i) change a size or a shape of itself, (ii) operate a generation, a disappearance and limit times of access, and (iii) detect a moving object, said mapping request having (a) coordinate information composed of latitude, longitude, altitude and a bubble diameter in the three-dimensional space of said building displayed on said display unit, and (b) display object attribute information representing attributes of facility information relating to said building or service information of said facility information;

(ii) data including an address, a range, an altitude of a viewpoint or an angle of the viewpoint, which is desired to be displayed on said display unit according to instructions to the server;

a receiving unit for receiving a mapping response having (c1) spatial range information composed of latitude, longitude, altitude and a bubble diameter of said building in the three-dimensional space corresponding to said coordinate information, and (c2) a uniform resource locator for obtaining said service information notified from said server in response to said mapping request;

a mapping unit for displaying (d1) an image geometry and an image of said building, at a position indicated by said spatial range information included in said mapping response, on said displaying unit, on said map which represents the object in three-dimensional space, and displaying service information, the service information being linked to the building on said display unit; and a mapping data holding unit for holding (e1) said image geometry and (e2) said uniform resource locator, said image geometry displayed by said mapping unit being correlated with said uniform resource locator included in said mapping response.

26. The user terminal according to claim 25, wherein said receiving unit receives said mapping response having spatial range information including a similar bubble diameter having a diameter according to a scale of said map displayed on said display unit and address information based on said coordinate information included in said mapping request.

27. The user terminal according to claim 25 further comprising a detecting unit for detecting position information including a latitude of an object, a longitude thereof, an altitude thereof, a direction thereof, and an inclination angle thereof in the three dimensional space.

28. The user terminal according to claim 27, wherein said detecting unit comprises at least any one of a direction sensor being able to measure the direction, a satellite information receiving unit being able to receive satellite information through the use of a global positioning system, and an inclination sensor being able to measure an inclination angle of said user terminal with respect to the horizontal line.

29. The user terminal according to claim 25, wherein said transmitting unit transmits said mapping request using an electronic mail address generated on the basis of said coordinate information.

30. An information providing service system providing information to a user terminal being able to display a map comprising:

a server for holding a specific information page as bubble data, the specific information page (a) having document type definition information, (b) being from out of information pages having attribute information representing attributes of various information relating to an object or service information relating to said various information and said document type definition information composed of a plurality of elements, and (c) in which spatial range information composed of a latitude of said object a longitude thereof, an altitude thereof and a bubble diameter thereof in three-dimensional space is associated with address information far obtaining said service information, said bubble data being able to (i) change size or shape of itself, (ii) operate a generation, a disappearance and limit times of access, and (iii) detect a moving object;

said user terminal connected to said server over a network to display said various information retrieved using said bubble data;

said server comprising:

a database for holding said bubble data;

a retrieving unit for retrieving, by using the index information of the specific information document, specific bubble data including coordinate information, and display object attribute information wherein said retrieving is performed on the basis of a mapping request transmitted from said user terminal, said mapping request having said coordinate information in the three-dimensional space composed of a latitude of said object, a longitude thereof, and an altitude thereof displayed on said map and having said display object attribute information representing attributes of various information relating to said object or service information relating to said various information, said user terminal being able to display an information bubble which represents an image of spatial range information of the bubble data, overlapped on said map which represents the object in the three-dimensional space, viewpoint; and a notifying unit for notifying said user terminal of a mapping response, said mapping response having said space region information, said attribute information, and said address information, wherein said space region information, said attribute information, and said address information included in said specific bubble data which is retrieved by said retrieving unit;

said user terminal comprising:

a map information outputting unit for outputting map information on an object in the three-dimensional space;

a display unit for displaying an image of an object on a screen on the basis of said map information outputted from said map information outputting unit;

a transmitting unit for transmitting a mapping request to said server connected to said user terminal over a network, said mapping request having space region information composed of a latitude of said object, a longitude thereof, an altitude thereof, and a bubble diameter thereof in the three-dimensional space of an image of said object displayed on said display unit, and attribute information representing attributes of various information relating to said object or service information relating to said various information;

a receiving unit for receiving a mapping response having
spatial range information composed of a latitude of said object, a longitude thereof, an altitude thereof, and a bubble diameter thereof in the three-dimensional space corresponding to said space region information, and
address information for obtaining said service information notified from said server in response to said mapping request;

a mapping unit for displaying an image geometry and an image of said object at a position indicated by said space region information included in said mapping response, on said map which represents the object in the three-dimensional space, and displaying service information on said displaying unit, the service information being linked to the object of said map; and a mapping data holding unit for holding said image geometry and said retrieval information, said image geometry displayed by said mapping unit being correlated with said address information included in said mapping response.

31. An information providing service system providing information to a user terminal being able to display a map comprising:

a database for holding a specific information page as bubble data, the specific information page
  (a) having document type definition information,
  (b) being from out of information pages having attribute information representing attributes of various information relating to an object or service information relating to said various information and said document type definition information composed of a plurality of elements, and
  (c) in which spatial range information composed of a latitude of said object, a longitude thereof, an altitude thereof and a bubble diameter thereof in three-dimensional space is associated with address information for obtaining said service information, said bubble data being able to (i) change size or shape of itself, (ii) operate a generation, a disappearance and limit times of access, and (iii) detect a moving object;

a user terminal connected to said database over a network to display said various information retrieved using said bubble data;

a retrieving unit for retrieving by using the index information of the specific information document, specific bubble data including
coordinate information, and
display object attribute information
said retrieving performed on the basis of a mapping request, said mapping request having said coordinate information in the three-dimensional space composed of a latitude of said object, a longitude thereof and an altitude thereof displayed on said map, and having said display object attribute information representing attributes of various information relating to said object or service information relating to said various information transmitted from said user terminal, said user terminal being able to display an information bubble which represents an image of spatial range information of the bubble data, overlapped on said map which represents the object in the three-dimensional space, viewpoint; and a notifying unit for notifying said user terminal of a mapping response having said spatial range information, said attribute information and said address information of said specific bubble data;

said user terminal comprising:

a map information outputting unit for outputting map information on an object in the three-dimensional space;

a display unit for displaying an image of said object on a screen on the basis of said map information outputted from said map information outputting unit;

a transmitting unit for transmitting a mapping request to a server connected to said user terminal over a network, said mapping request having coordinate information composed of a latitude of said object, a longitude thereof, an altitude thereof and a bubble diameter thereof in the three-dimensional space displayed on said display unit and attribute information representing attributes of various information relating to said object or service information relating to said various information to said server;

a receiving unit for receiving a mapping response notified from said server in response to said mapping requests, said mapping response having spatial range information composed of a latitude of said object, a longitude thereof, an altitude thereof and a bubble diameter thereof in the three-dimensional space corresponding to said spatial range information, and having address information for obtaining said service information;

a mapping unit for displaying an image geometry along with an image of said object at a position indicated by said spatial range information included in said mapping response on said display unit, on said map which represents the object in the three-dimensional space, and displaying service information on said displaying unit, the service information being linked to the object of said map and said mapping request being transmitted from said user terminal; and a mapping data holding unit for holding said image geometry and said retrieval information, said image geometry displayed by said mapping unit being correlated with said address information included in said mapping response.

32. An information providing service method in a system providing information to a user terminal being able to display a map comprising the steps of:

selecting an object displayed on a map, said map displayed by said user terminal;

transmitting from said user terminal to a server connected to said user terminal over a network coordinate information relating to said selected object and display object attribute information representing attributes of service information to be provided by said object, said user terminal being able to display an information bubble which represents an image of spatial range information of the bubble data, overlapped on said map which represents the object in three-dimensional space, the bubble data being able to (i) change a size or a shape of itself, (ii) operate a generation, a disappearance and limit times of access, and (iii) detect a moving object;

transmitting spatial range information, attribute information, and address information to said user terminal from said server on the basis of said transmitted coordinate information and display object attribute information; and displaying, on a display unit of said user terminal, an image geometry along with said object at a position indicated by said transmitted spatial range information.

33. An information providing service method in a system providing information to a user terminal being able to display a map comprising the steps of:

displaying a map on a display unit displaying an image in said user terminal;

selecting an object from map information displayed at said displaying step in said user terminal;

transmitting a mapping request to a server connected to said user terminal over a network, said mapping request having coordinate information in three-dimensional space relating to said selected object, and display object attribute information representing attributes of service information to be provided from said user terminal, said mapping request including an address, a range desired to be displayed, an altitude, an angle of a viewpoint;

retrieving by said server specific bubble data including coordinate information and display object attribute information, by using the index information of the specific information document, in which spatial range information composed of a latitude of said selected object, a longitude thereof, an altitude thereof and a bubble diameter thereof in three-dimensional space is associated with address information for obtaining service information provided by said abject on the basis of said transmitted mapping request, the bubble data being able to (i) change a size or a shape of itself, (ii) operate a generation, a disappearance and limit times of access, and (iii) detect a moving object;

notifying to said user terminal from said server a mapping response having said spatial range information and said address information of said retrieved specific bubble data;

displaying an image geometry along with said object at a position indicated by said spatial range information included in said mapping response on said display unit in said user terminal; and providing said image geometry and said map displayed to said user terminal.

34. The information providing service method according to claim 33, wherein at said map displaying step, said user terminal displays said map on said screen on the basis of at least either one of the latitude or the longitude obtained.

35. The information providing service method according to claim 33, wherein said notifying step comprises the steps of:

a changing step of outputting a similar bubble diameter having a diameter according to a scale of said map displayed on said display unit of said user terminal from said server an the basis of said coordinate information included in said mapping request transmitted at said transmitting step; and an inserting step of inserting said similar bubble diameter outputted at said changing step into said mapping response in said user terminal.

36. The information providing service method according to claim 35, wherein at said changing step, said server changes said similar bubble diameter on the basis of at least any one of the number of accesses, an accessible time and an accessible season.

37. The information providing service method according to claim 33, wherein at said notifying step, said server notifies of information relating to an application program for displaying a map on said user terminal.

38. The information providing service method according to claim 33, wherein at said retrieving step, said server retrieves using a counter whose count value can be changed by an access.

39. The information providing service method according to claim 38, wherein at said retrieving step, said server nullifies a predetermined file when said count is stopped.

40. The information providing service method according to claim 33, wherein at said retrieving step, retrieval is performed on the basis of the number of accesses that said server can receive concurrently.

41. The information providing service method according to claim 33, wherein at said retrieving step, retrieval is performed on the basis of communication partner information relating to a specific communication partner.

42. The information service providing method according to claim 33, wherein said retrieving step comprises the steps of:

a reading step of reading communication partner bubble data agreeing with information set beforehand relating to said communication partner in said server;

a present position information receiving step of receiving present position information on said user terminal by said server; and an approach detecting step of detecting approach of said user terminal and said communication partner to each other by said server on the basis of said communication partner bubble data and said present position information.

43. An information service providing method in a system providing information to a user terminal being able to display a map comprising the steps of:

displaying a map on a display unit displaying an image in said user terminal;

selecting an object from map information displayed at said displaying step in said user terminal;

transmitting a mapping request to a server connected to said user terminal over a network, said mapping request, including an address, a range desired to be displayed, an altitude, an angle of a viewpoint having (a) coordinate information of said selected object composed of a latitude, a longitude, an altitude and a bubble diameter in three-dimensional space, and (b) display object attribute information representing attributes of various information relating to said selected object or service information relating to said various information from said user terminal, said user terminal being able to display an information bubble which represents an image of spatial range information of the bubble data, overlapped on said map which represents the object in the three-dimensional space;

retrieving by said server specific bubble data including said coordinate information and said display object attribute information, by using the index information of the specific information document, in which spatial range information composed of a latitude of said selected object, a longitude thereof, an altitude thereof and a bubble diameter thereof in the three-dimensional space is associated with address information for obtaining various information relating to said object or service information relating to said various information on the basis of said transmitted mapping request, the babble data being able to (i) change a size or a shape of itself, (ii) operate a generation, a disappearance and limit times of access, and (iii) detect a moving object;

notifying to said user terminal from said server a mapping response having said spatial range information and said address information of said retrieved specific bubble data; and displaying an image geometry along with said object at a position indicated by said spatial range information included in said mapping response on said display unit of said user terminal on the basis of said notified specific bubble data.

44. An information providing service method in a system providing information to a user terminal being able to display a map comprising the steps of:

recording a specific information page composed of a plurality of elements relating to attribute information, said specific information page from information pages having said attribute information representing attributes of various information relating to an object or service information relating to said various information in a database by said user terminal, said user terminal being able to display an information bubble which represents an image of spatial range information of the bubble data, overlapped on said map which represents the object in three-dimensional space, said bubble data being able to (i) change a size or a shape of itself, (ii) operate a generation, a disappearance and limit times of access, and (iii) detect a moving object;

registering by a server, bubble data in which spatial range information composed of a latitude of said object, a longitude thereof, an altitude thereof and a bubble diameter thereof in the three-dimensional space is associated with address information for obtaining said service information on the basis of said information page recorded at said information page recording step; and providing information generated from said registered bubble data from said server to said user terminal.

45. The information providing service method according to claim 44, wherein said bubble data registering step comprises the steps of;

a specific document type definition information extracting step of extracting by said server plural pieces of specific document type definition information having a predetermined element out of said document type definition information of said information pages recorded at said information page recording step; and a first registering step of registering by said server said plural pieces of specific document type definition information as said bubble data.

46. The information providing service method according to claim 44, wherein said bubble data registering step comprises the steps of:

a recording step of recording by said server said information page recorded at said information page recording step in another database; and a second registering step of registering by said server said information page recorded at said recording step as bubble data in which spatial range information composed of a latitude of said object, a longitude thereof, an altitude thereof and a bubble diameter thereof in the three-dimensional space is associated with address information for obtaining said service information on said database.

* * * * *